United States Patent
Hasebe et al.

(10) Patent No.: US 9,708,535 B2
(45) Date of Patent: Jul. 18, 2017

(54) LIQUID CRYSTAL ALIGNMENT LAYER
(71) Applicant: DIC CORPORATION, Tokyo (JP)
(72) Inventors: Hiroshi Hasebe, Kita-adachi-gun (JP); Fumiaki Kodera, Kita-adachi-gun (JP); Masanao Takashima, Kita-adachi-gun (JP); Isa Nishiyama, Kita-adachi-gun (JP); Hiroyuki Itou, Kita-adachi-gun (JP); Yutaka Kadomoto, Kita-adachi-gun (JP); Kazuki Obi, Kita-adachi-gun (JP); Yoshitaka Saitou, Kita-adachi-gun (JP); Yuuichirou Tani, Sakura (JP); Keisuke Fujisawa, Sakura (JP)
(73) Assignee: DIC CORPORATION, Tokyo (JP)
( * ) Notice: Subject to any disclaimer, the term of this patent is extended or adjusted under 35 U.S.C. 154(b) by 0 days.
(21) Appl. No.: 15/316,022
(22) PCT Filed: May 26, 2015
(86) PCT No.: PCT/JP2015/065039
§ 371 (c)(1),
(2) Date: Dec. 2, 2016
(87) PCT Pub. No.: WO2015/186562
PCT Pub. Date: Dec. 10, 2015
(65) Prior Publication Data
US 2017/0088777 A1    Mar. 30, 2017
(30) Foreign Application Priority Data Jun. 2, 2014 (JP) .................................. 2014-113986
Nov. 28, 2014 (JP) .................................. 2014-241403

(51) Int. Cl.
*C08F 12/20* (2006.01)
*C08F 20/00* (2006.01)
(Continued)
(52) U.S. Cl.
CPC .............. *C09K 19/56* (2013.01); *C08F 20/36* (2013.01); *G02F 1/133711* (2013.01); *G02F 1/133788* (2013.01)

(58) Field of Classification Search
CPC ... G02F 1/133711; G02F 2001/133726; G02F 2001/133742; G02F 2001/133738;
(Continued)

(56) References Cited

U.S. PATENT DOCUMENTS 6,335,409 B1 *   1/2002   Herr .................... C07C 69/92
                                                      526/319
2013/0116396 A1   5/2013   Nose et al.

FOREIGN PATENT DOCUMENTS

| WO | 2011/122598 A1 | 10/2011 |
| WO | 2013/050120 A1 | 4/2013 |
| WO | 2013/081066 A1 | 6/2013 |

OTHER PUBLICATIONS

International Search Report dated Aug. 25, 2015, issued in counterpart International Application No. PCT/JP2015/065039 (2 pages).

(Continued)

*Primary Examiner* — William Cheung
(74) *Attorney, Agent, or Firm* — Westerman, Hattori, Daniels & Adrian, LLP

(57) ABSTRACT

An object of the present invention is to provide a photoalignment layer with a more reliable absorption anisotropy parameter as a photoalignment layer that allows for reduced AC image-sticking. Specifically, provided is a photoalignment layer, obtained by exposure to polarized UV radiation, that has a maximum ΔA (=A1–A2, where A1 is the absorbance in a direction parallel to a vibration direction of the polarized UV radiation, and A2 is the absorbance in a direction parallel to the vibration direction of the polarized UV radiation) of 0.35 or more per micrometer of layer thickness in a range of 230 to 380 nm.

32 Claims, 4 Drawing Sheets

(51) Int. Cl.
*C08F 12/24* (2006.01)
*C08F 12/26* (2006.01)
*C09K 19/56* (2006.01)
*C08F 20/36* (2006.01)
*G02F 1/1337* (2006.01)

(58) Field of Classification Search
CPC .... C09K 19/56; C09K 19/586; C09K 19/322; C09K 19/062; C09K 2019/448; C09K 2019/2035; C07C 255/16; C08F 122/30; C08F 2222/102
USPC .............................. 526/299, 303.1, 313, 242
See application file for complete search history.

(56) References Cited

OTHER PUBLICATIONS

Decision to Grant a Patent dated Aug. 4, 2016, issued in counterpart Japanese Patent Application No. 2015-559064, w/English translation (6 pages).
Notification of Reason for Refusal dated Apr. 21, 2016, issued in counterpart Japanese Patent Application No. 2015-559064, w/English translation (3 pages).

* cited by examiner

LIQUID CRYSTAL ALIGNMENT LAYER

This application is a National Stage Entry of International Application No. PCT/JP2015/065039, filed May 26, 2015, and claims the benefit of and priority to Japan 2014-241403, filed Nov. 28, 2014, and Japan 2014-113986, filed Jun. 2, 2014, all of which are incorporated herein by reference in their entirety for all purposes as if fully set forth herein.

TECHNICAL FIELD

The present invention relates to liquid crystal alignment layers and to liquid crystal display devices and optically anisotropic elements including liquid crystal alignment layers.

BACKGROUND ART

Considerable research has been directed toward the application of photoalignment layers to various liquid crystal displays because of their advantages, including no extremely small scratches due to rubbing, no mechanical contact and thus no dust and little risk of damage to TFTs, easy patterning, and high resolution. In particular, there is a strong demand for photoalignment layers for horizontal alignment (planar alignment) in IPS/FFS displays. However, photoalignment layers for IPS/FFS have a problem in that image-sticking known as AC image-sticking occurs in display devices unless the photoalignment layers have sufficient anchoring force. AC image-sticking is a defect mode in which a liquid crystal does not completely return to the orientation defined during the manufacture of photoalignment layers when no voltage is applied to the liquid crystal after continued application of voltage. This defect mode also involves a serious decrease in contrast. Accordingly, there is a strong need for a solution to this problem.

As one solution to this problem, there is disclosed a photoalignment layer with an absorption anisotropy parameter defined by taking into account the relationship between the anchoring force and the anisotropy of the alignment layer (PTL 1). This absorption anisotropy parameter is useful for the screening of photoalignment layers for reduced AC image-sticking and is also useful for process condition management during the manufacture of photoalignment layers. However, there are cases where this method cannot sufficiently reduce AC image-sticking.

CITATION LIST

Patent Literature

PTL 1: the pamphlet of International Publication No. 2013/050120

SUMMARY OF INVENTION

Technical Problem

An object of the present invention is to provide a photoalignment layer with a more reliable absorption anisotropy parameter as a photoalignment layer that allows for reduced AC image-sticking.

Solution to Problem

To achieve the foregoing object, the inventors have conducted extensive research on the relationship between AC image-sticking and the absorption anisotropy of photoalignment layers and have found that a photoalignment layer with a particular absorption anisotropy parameter allows for significantly reduced AC image-sticking, which has led to the completion of the present invention.

Specifically, the present invention provides a photoalignment layer, obtained by exposure to polarized UV radiation, that has a maximum $\Delta A$ ($=A1-A2$, where $A1$ is the absorbance in a direction parallel to a vibration direction of the polarized UV radiation, and $A2$ is the absorbance in a direction perpendicular to the vibration direction of the polarized UV radiation) of 0.35 or more per micrometer of layer thickness in a range of 230 to 380 nm.

The present invention also provides a photoalignment layer, obtained by exposure to polarized UV radiation, that has a $\Delta A$ ($=A1-A2$, where $A1$ is the absorbance in a direction parallel to the vibration direction of the polarized UV radiation, and $A2$ is the absorbance in a direction perpendicular to the vibration direction of the polarized UV radiation) of 0.03 or more per micrometer of layer thickness at 360 nm based on a photochemically isomerizable, photochemically uncrosslinkable segment.

Advantageous Effects of Invention

The use of a photoalignment layer according to the present invention provides sufficient anchoring force and thus avoids image-sticking known as AC image-sticking in display devices.

DESCRIPTION OF EMBODIMENTS

Figure 1:
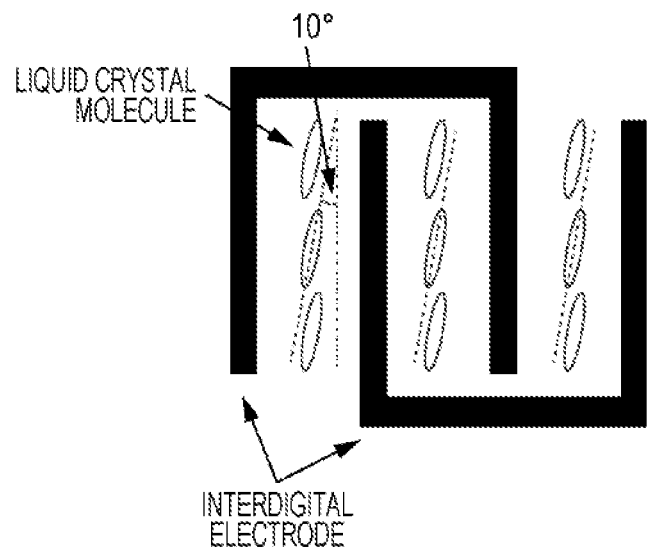
FIG. 1 is a schematic diagram illustrating liquid crystal molecules oriented at an angle of 10° with respect to interdigital electrodes having a partial structure when no voltage is applied.

Preferred embodiments of the present invention will now be described in detail.

A preferred photoalignment layer has, before heating, a minimum $\Delta A$ ($=A1-A2$, where $A1$ is the absorbance in a direction parallel to the vibration direction of the polarized UV radiation, and $A2$ is the absorbance in a direction perpendicular to the vibration direction of the polarized UV radiation) of 0 or less per micrometer of layer thickness in a range of 280 to 340 nm.

A photoalignment layer according to the present invention is a photoalignment layer, obtained by exposure to polarized UV radiation, that has a $\Delta A$ ($=A1-A2$, where $A1$ is the absorbance in a direction parallel to the vibration direction of the polarized UV radiation, and $A2$ is the absorbance in a direction perpendicular to the vibration direction of the polarized UV radiation) of 0.03 or more per micrometer of layer thickness at a wavelength of 360 nm based on a photochemically isomerizable, photochemically uncrosslinkable segment. Preferably, ΔA is 0.05 or more, more preferably 0.07 or more. A larger ΔA tends to result in reduced AC image-sticking. However, an excessive ΔA tends to result in a colored alignment layer; therefore, ΔA is preferably 0.5 or less, more preferably 0.4 or less, even more preferably 0.2 or less.

A photoalignment layer, obtained by exposure to polarized UV radiation, that has a ΔA (=A1−A2, where A1 is the absorbance in a direction parallel to the vibration direction of the polarized UV radiation, and A2 is the absorbance in a direction perpendicular to the vibration direction of the polarized UV radiation) of 0.03 or more per micrometer of layer thickness at a wavelength of 360 nm based on a photochemically isomerizable, photochemically uncrosslinkable segment has its photochemically isomerizable, photochemically uncrosslinkable segment aligned in the direction parallel to the vibration direction of the polarized UV radiation. It has been found that this state provides strong anchoring force and thus allows for reduced AC image-sticking, probably because of the strong anchoring force of the photochemically isomerizable, photochemically uncrosslinkable segment. It has also been found that azobenzene backbones are particularly preferred as the photochemically isomerizable, photochemically uncrosslinkable segment. It is known that a typical photochemically isomerizable, photochemically uncrosslinkable segment aligns in a direction perpendicular to the vibration direction of polarized UV radiation. In contrast, a photoaligning material that aligns in a different state has been found to be useful for reduced AC image-sticking. Accordingly, the present invention provides a material that can align in such a state. To achieve this, the present invention also provides the introduction of a particular photochemically crosslinkable segment and heat treatment after exposure to polarized UV radiation. It has been found that cinnamate backbones are particularly useful as the particular photochemically crosslinkable segment.

A preferred photoalignment layer has an absorption anisotropy parameter that falls within the above range after the photoalignment layer is exposed to polarized UV radiation and is then heated at a temperature of 80° C. or higher. The temperature is preferably 100° C. or higher, more preferably 120 or higher. The temperature is preferably up to 250° C., more preferably up to 230° C. The heating time is preferably 1 minute or more, more preferably 10 minutes or more, even more preferably 20 minutes or more. The heating time is preferably up to 2 hours, more preferably up to 1 hour.

A preferred photoalignment layer has, before heating, a ΔA (=A1−A2, where A1 is the absorbance in a direction parallel to the vibration direction of the polarized UV radiation, and A2 is the absorbance in a direction perpendicular to the vibration direction of the polarized UV) of 0 or less per micrometer of layer thickness at a wavelength of 360 nm. To reduce AC image-sticking, a ΔA of less than −0.01 is preferred, and a ΔA of less than −0.02 is more preferred. That is, the photochemically isomerizable, photochemically uncrosslinkable segment need not be aligned in the direction parallel to the vibration direction of the polarized UV radiation after exposure to the polarized UV radiation; it may be aligned in the direction parallel to the vibration direction of the polarized UV radiation after the subsequent heat treatment.

The photochemically crosslinkable segment may also have different orientations before and after heating. Before heating, any photochemically crosslinkable segment that remains uncrosslinked after exposure to the polarized UV radiation may be aligned in the direction perpendicular to the vibration direction of the polarized UV radiation. Preferably, such a photoalignment layer has a ΔA (=A1−A2, where A1 is the absorbance in a direction parallel to the vibration direction of the polarized UV radiation, and A2 is the absorbance in a direction perpendicular to the vibration direction of the polarized UV radiation) of −0.02 or less, more preferably −0.03 or less, even more preferably −0.04 or less, per micrometer of layer thickness at a wavelength of 317 nm based on the photochemically crosslinkable segment. After heating, any photochemically crosslinkable segment that remains uncrosslinked after exposure to the polarized UV radiation is preferably aligned in the direction parallel to the vibration direction of the polarized UV radiation to reduce AC image-sticking. Preferably, such a photoalignment layer has a ΔA (=A1−A2, where A1 is the absorbance in a direction parallel to the vibration direction of the polarized UV radiation, and A2 is the absorbance in a direction perpendicular to the vibration direction of the polarized UV radiation) of 0.04 or more, more preferably 0.05 or more, even more preferably 0.06 or more, per micrometer of layer thickness at a wavelength of 317 nm.

The dose of the polarized UV radiation is preferably 700 mJ/cm$^2$ or less, more preferably 500 mJ/cm$^2$, even more preferably 200 mJ/cm$^2$, most preferably 150 mJ/cm$^2$ or less.

A preferred photoalignment layer according to the present invention satisfies x=x/(x+y)=0.02 to 0.35, more preferably 0.05 to 0.3, even more preferably 0.07 to 0.2, where x is the molar concentration of the photochemically isomerizable, photochemically uncrosslinkable segment, and y is the molar concentration of the photochemically crosslinkable segment.

A preferred photoalignment layer according to the present invention is made of a polymer containing (a) a photochemically isomerizable, photochemically uncrosslinkable segment and (b) a photochemically crosslinkable segment. The polymer preferably contains a structure represented by general formula (I), which is preferred as (b) the photochemically crosslinkable segment.

[Chem. 1]

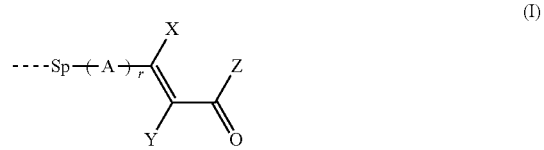

(I)

In general formula (I),

Sp is a spacer unit linked to A and L (not shown in this formula), where L is a polymerizable group;

A is a group selected from the group consisting of:

(a) a trans-1,4-cyclohexylene group (where one or more non-adjacent methylene groups present in this group are optionally replaced with —O—, —NH—, or —S—), (b) a 1,4-phenylene group (where one or more —CH= groups in this group are optionally replaced with —N=), and (c) 1,4-cyclohexenylene, 2,5-thiophenylene, 2,5-furanylene, 1,4-bicyclo(2.2.2)octylene, naphthalene-1,4-diyl, naphthalene-2,6-diyl, decahydronaphthalene-2,6-diyl, and 1,2,3,4-tetrahydronaphthalene-2,6-diyl groups, where groups (a), (b), and (c) may each be unsubstituted or have one or more hydrogen atoms replaced with a fluorine atom, a chlorine atom, a cyano group, a methyl group, or a methoxy group;

r is 0, 1, or 2, where if r is 2, each occurrence of A may be the same or different;

X and Y are each independently a hydrogen atom, a fluorine atom, a chlorine atom, a cyano group, or an alkyl group of 1 to 20 carbon atoms, where any hydrogen atom in the alkyl group is optionally replaced with a fluorine atom, and one or more non-adjacent $CH_2$ groups in the alkyl group are optionally replaced with —O—, —CO—O—, —O—CO—, and/or —CH=CH—; and Z is represented by general formula (IIa) or (IIb).

[Chem. 2]

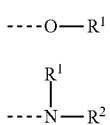

In general formula (IIa) or (IIb), the dashed line is a linkage to the carbon atom to which Z is linked; and $R^1$ and $R^2$ are each independently a hydrogen atom or a linear or branched alkyl group of 1 to 30 carbon atoms, where one or more non-adjacent —$CH_2$— groups in $R^1$ and $R^2$ are optionally replaced with —O—, —CO—, —CO—O—, —O—CO—, —CO—NH—, —NH—CO—, —$NCH_3$—, —CH=CH—, —CF=CF—, and/or —C≡C—, one or more —$CH_2$— groups in $R^1$ and $R^2$ are each independently optionally replaced with a cycloalkyl group of 3 to 8 members, and any hydrogen atom in $R^1$ and $R^2$ is optionally replaced with an alkyl group of 1 to 20 carbon atoms, a cyano group, or a halogen atom).

Description of Z

In general formula (IIa) or (IIb), $R^1$ is preferably a linear or branched alkyl group of 1 to 30 carbon atoms (where one or more non-adjacent —$CH_2$— groups in the alkyl group are replaced with —O—, —CO—, —CO—O—, —O—CO—, —CO—NH—, —NH—CO—, or —$NCH_3$—, one or more —$CH_2$— groups in the alkyl group are each independently optionally replaced with a cycloalkyl group of 3 to 8 members, and any hydrogen atom in the alkyl group is optionally replaced with an alkyl group of 1 to 20 carbon atoms, a cyano group, or a halogen atom); and $R^2$ is preferably a linear or branched alkyl group of 1 to 30 carbon atoms (where one or more —$CH_2$— groups in the alkyl group are each independently optionally replaced with a cycloalkyl group of 3 to 8 members, and any hydrogen atom in the alkyl group may be unreplaced or replaced with an alkyl group of 1 to 20 carbon atoms, a cyano group, or a halogen atom).

In general formula (IIa) or (IIb), $R^1$ is also preferably represented by general formula (IIc).

[Chem. 3]

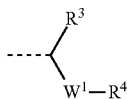

(In the formula, the dashed line is a linkage to the oxygen or nitrogen atom;

$W^1$ is a methylene group (where any hydrogen atom in the methylene group may be unreplaced or replaced with an alkyl group of 1 to 5 carbon atoms), —CO—O—, or —CO—NH—;

$R^3$ is a hydrogen atom or an alkyl group of 1 to 5 carbon atoms; and $R^4$ is a linear or branched alkyl group of 1 to 20 carbon atoms (where one or more non-adjacent —$CH_2$— groups in the alkyl group are replaced with —O—, —CO—, —CO—O—, —O—CO—, —CO—NH—, —NH—CO—, or —$NCH_3$—, one or more —$CH_2$— groups in the alkyl group are each independently optionally replaced with a cycloalkyl group of 3 to 8 members, and any hydrogen atom in the alkyl group may be unreplaced or replaced with a fluorine or chlorine atom.)

In general formula (IIa) or (IIb), $R^1$ is also preferably a linear or branched alkyl group of 1 to 30 carbon atoms (where one or more non-adjacent —$CH_2$— groups in the alkyl group are replaced with —CH=CH—, —CF=CF—, and/or —C≡C—, one or more —$CH_2$— groups in the alkyl group are each independently optionally replaced with a cycloalkyl group of 3 to 8 members, and any hydrogen atom in the alkyl group is optionally replaced with an alkyl group of 1 to 20 carbon atoms, a cyano group, or a halogen atom); and $R^2$ is also preferably a linear or branched alkyl group of 1 to 30 carbon atoms (where one or more —$CH_2$— groups in the alkyl group are each independently optionally replaced with a cycloalkyl group of 3 to 8 members, and any hydrogen atom in the alkyl group may be unreplaced or replaced with an alkyl group of 1 to 20 carbon atoms, a cyano group, or a halogen atom).

In general formula (IIa) or (IIb), $R^1$ is also preferably represented by any of general formulas (IId) to (IIg).

[Chem. 4]

(In the formulas, the dashed line is a linkage to the oxygen or nitrogen atom;

$W^2$ is a single bond, —$CH_2$—, —CO—O—, or —CO—NH—;

$R^7$ is a hydrogen atom or an alkyl group of 1 to 5 carbon atoms;

$R^8$ is a hydrogen atom, a linear or branched alkyl group of 1 to 20 carbon atoms (where one or more —$CH_2$— groups in the alkyl group are each independently optionally replaced with a cycloalkyl group of 3 to 8 members, and any hydrogen atom in the alkyl group may be unreplaced or replaced with a fluorine or chlorine atom);

$R^5$ is an alkyl group of 1 to 20 carbon atoms, where any hydrogen atom in the alkyl group is optionally replaced with a fluorine atom); and $R^6$ is an alkyl group of 1 to 20 carbon atoms (where one or more non-adjacent —$CH_2$— groups in the alkyl group are replaced with —CH═CH—, —CF═CF—, and/or —C≡C—, one or more —$CH_2$— groups in the alkyl group are each independently optionally replaced with a cycloalkyl group of 3 to 8 members, and any hydrogen atom in the alkyl group is optionally replaced with a fluorine or chlorine atom).

In general formula (IIa) or (IIb), $R^1$ is also preferably a hydrogen atom or a linear or branched alkyl group of 1 to 30 carbon atoms (where one or more —$CH_2$— groups in the alkyl group are each independently optionally replaced with a cycloalkyl group of 3 to 8 members, and any hydrogen atom in the alkyl group is optionally replaced with an alkyl group of 1 to 20 carbon atoms, a cyano group, or a halogen atom); and $R^2$ is also preferably a linear or branched alkyl group of 1 to 30 carbon atoms (where one or more —$CH_2$— groups in the alkyl group are each independently optionally replaced with a cycloalkyl group of 3 to 8 members, and any hydrogen atom in the alkyl group may be unreplaced or replaced with an alkyl group of 1 to 20 carbon atoms, a cyano group, or a halogen atom).

In this case, Sp in general formula (I) is preferably represented by general formula (IVc), described later.

In general formula (IIa) or (IIb), $R^1$ is also preferably a linear or branched alkyl group of 1 to 30 carbon atoms (where one or more —$CH_2$— groups in the alkyl group are each independently replaced with a cycloalkyl group of 3 to 8 members, and any hydrogen atom in the alkyl group is optionally replaced with an alkyl group of 1 to 20 carbon atoms, a cyano group, or a halogen atom); and $R^2$ is also preferably a linear or branched alkyl group of 1 to 30 carbon atoms (where one or more —$CH_2$— groups in the alkyl group are each independently optionally replaced with a cycloalkyl group of 3 to 8 members, and any hydrogen atom in the alkyl group may be unreplaced or replaced with an alkyl group of 1 to 20 carbon atoms, a cyano group, or a halogen atom). In this case, Sp in general formula (I) is preferably represented by general formula (IVb), described later.

The alkyl group of 1 to 20 carbon atoms for $R^2$ is preferably a linear or branched alkyl group or a cycloalkyl group of 3 to 8 members.

As used herein and in the claims, the term "non-adjacent $CH_2$ groups" refers to $CH_2$ groups that are not adjacent to each other.

Description of A

To improve the liquid crystal alignment properties of the liquid crystal alignment layer according to the present invention, it is preferred that A in general formula (I), (IIa), or (IIb) be a pyridine-2,5-diyl, pyrimidine-2,5-diyl, or 1,4-phenylene group. To improve the solubility of the polymer according to the present invention, it is preferred that A be a 1,4-naphthylene, 2,6-naphthylene, 2,5-thiophenylene, or 2,5-furanylene group.

To reduce the dose of light required to align a liquid crystal on the liquid crystal alignment layer according to the present invention, it is preferred that A be a pyridine-2,5-diyl, pyrimidine-2,5-diyl, 2,5-thiophenylene, or 1,4-phenylene group.

To achieve photoalignment at a longer wavelength on the liquid crystal alignment layer according to the present invention, it is preferred that A be a pyrimidine-2,5-diyl, 2,5-thiophenylene, 2,6-naphthylene, or 2,5-furanylene group and that X and Y be a fluorine atom, a chlorine atom, or a cyano group.

To improve the voltage holding ratio of the liquid crystal alignment layer according to the present invention, it is preferred that X and Y be a hydrogen atom, that W be a single bond or —$CH_2$—, and that $R^2$ be an alkyl group of 1 to 12 carbon atoms where one $CH_2$ group is replaced with —CH═CH— or —C≡C—.

To reduce residual charge on the liquid crystal alignment layer according to the present invention, it is preferred that W be —CO—O— or —CO—NH— and that $R^2$ be an alkyl group of 1 to 6 carbon atoms where one $CH_2$ group is replaced with —CH═CH— or —C≡C—.

In the polymer represented by general formula (I) according to the present invention, A is preferably a 1,4-phenylene group where one or more hydrogen atoms are optionally replaced with a fluorine atom, a chlorine atom, a methyl group, or a methoxy group.

Description of X and Y

In the polymer represented by general formula (I), X and Y are preferably hydrogen atoms. The use of such a polymer improves the voltage holding ratio of the liquid crystal alignment layer according to the present invention.

Description of Sp

In general formula (I), Sp is preferably a structure represented by general formula (IVa) below.

[Chem. 5]

(IVa)

In general formula (IVa), the left dashed line is a linkage to L, and the right dashed line is a linkage to A or a linkage to the carbon atom to which X is linked;

$Z^1$, $Z^2$, and $Z^3$ are each independently a single bond, —$(CH_2)_u$— (where u is 1 to 20), —$OCH_2$—, —$CH_2O$—, —COO—, —OCO—, —CH═CH—, —CF═CF—, —$CF_2O$—, —$OCF_2$—, —$CF_2CF_2$—, or —C≡C—, where one or more non-adjacent $CH_2$ groups in these substituents are independently optionally replaced with —O—, —CO—, —CO—O—, —O—CO—, —$Si(CH_3)_2$—O—$Si(CH_3)_2$—, —NR—, —NR—CO—, —CO—NR—, —NR—CO—O—, —O—CO—NR—, —NR—CO—NR—, —CH═CH—, —C≡C—, or —O—CO—O— (where R is independently hydrogen or an alkyl group of 1 to 5 carbon atoms);

$A^1$ and $A^2$ are each independently a group selected from the group consisting of:

(a) a trans-1,4-cyclohexylene group (where one or more non-adjacent methylene groups present in this group are optionally replaced with —O—, —NH—, or —S—), (b) a 1,4-phenylene group (where one or more —CH═ groups in this group are optionally replaced with —N═), and (c) 1,4-cyclohexenylene, 2,5-thiophenylene, 2,5-furanylene, 1,4-bicyclo(2.2.2)octylene, naphthalene-1,4-diyl, naphthalene-2,6-diyl, decahydronaphthalene-2,6-diyl, and 1,2,3,4-tetrahydronaphthalene-2,6-diyl groups, where groups (a), (b), and (c) may each be unsubstituted or have one or more hydrogen atoms replaced with a fluorine atom, a chlorine atom, a cyano group, a methyl group, or a methoxy group; and p and q are each independently 0 or 1).

Preferably, in general formula (IVa), the left dashed line is a linkage to the polymer main chain; the right dashed line is a linkage to A or a linkage to the carbon atom to which X is linked; $Z^1$, $Z^2$, and $Z^3$ are each independently a single bond, —(CH$_2$)$_u$— (where u is 1 to 20), —OCH$_2$—, —CH$_2$O—, —COO—, —OCO—, —CH=CH—, —CF=CF—, —CF$_2$O—, —OCF$_2$—, —CF$_2$CF$_2$—, or —C≡C—, where one or more non-adjacent CH$_2$ groups in these substituents are independently optionally replaced with —O—, —CO—, —CO—O—, —O—CO—, —Si(CH$_3$)$_2$—O—Si(CH$_3$)$_2$—, —NR—, —NR—CO—, —CO—NR—, —NR—CO—O—, —O—CO—NR—, —NR—CO—NR—, —CH=CH—, —C≡C—, or —O—CO—O— (where R is independently a hydrogen atom or an alkyl group of 1 to 5 carbon atoms); $A^1$ and $A^2$ are each independently a trans-1,4-cyclohexylene, trans-1,3-dioxane-2,5-diyl, 1,4-naphthylene, 2,6-naphthylene, pyridine-2,5-diyl, pyrimidine-2,5-diyl, 2,5-thiophenylene, 2,5-furanylene, or 1,4-phenylene group, where one or more hydrogen atoms in the group are optionally replaced with a fluorine atom, a chlorine atom, a methyl group, or a methoxy group; and p and q are each independently 0 or 1.

Sp is also preferably represented by general formula (IVb) below, rather than by general formula (IVa).
[Chem. 6]

(IVb)

(In the formula, $Z^1$, $Z^2$, $Z^3$, $A^2$, p, and q are as defined in general formula (IVa); and $A^8$ is a trans-1,4-cyclohexylene (where one or more non-adjacent methylene groups present in this group are optionally replaced with —O—, —NH—, or —S—) or 1,4-phenylene (where one or two —CH= groups present in this group are optionally replaced with —N=) group that may be unsubstituted or have one or more hydrogen atoms replaced with a fluorine atom, a chlorine atom, a cyano group, a methyl group, or a methoxy group.)

Sp is also preferably represented by general formula (IVc) below.
[Chem. 7]

(IVc)

(In the formula, $Z^1$, $Z^2$, $Z^3$, and $A^2$ are as defined in general formula (IVa);

$A^7$ is a group selected from the group consisting of 1,4-phenylene (where three or more —CH= groups present in this group are replaced with —N=), 1,4-cyclohexenylene, 2,5-thiophenylene, 2,5-furanylene, 1,4-bicyclo(2.2.2)octylene, naphthalene-1,4-diyl, naphthalene-2,6-diyl, decahydronaphthalene-2,6-diyl, and 1,2,3,4-tetrahydronaphthalene-2,6-diyl groups that may each be unsubstituted or have one or more hydrogen atoms replaced with a fluorine atom, a chlorine atom, a cyano group, a methyl group, or a methoxy group; and p is 1, and q is 1 or 2, where if q is 2, each occurrence of $A^2$ and $Z^3$ may be the same or different.)

In general formula (IVc), $A^7$ is preferably a 2,6-naphthylene group, where one or more hydrogen atoms in the 2,6-naphthylene group are preferably replaced with a fluorine atom, a chlorine atom, a methyl group, or a methoxy group.

In general formula (IVa), $Z^1$, $Z^2$, and $Z^3$ are preferably each independently a single bond, —(CH$_2$)$_u$— (where u is 1 to 20, and one or more non-adjacent CH$_2$ groups are independently —O—, —CO—, —CO—O—, —O—CO—, —NR—, —NR—CO—, —CO—NR—, —NR—CO—NR—, —CH=CH—, —C≡C—, or —O—CO—O—, where R is hydrogen, a methyl group, or an ethyl group), —OCH$_2$—, —CH$_2$O—, —COO—, —OCO—, —CH=CH—, —CF$_2$O—, —OCF$_2$—, or —C≡C—.

More preferably, $Z^1$, $Z^2$, and $Z^3$ in general formula (IVa) are each independently a single bond, —(CH$_2$)$_u$— (where u is 1 to 20, and one or more non-adjacent CH$_2$ groups are independently optionally replaced with —O—, —CO—O—, —O—CO—, —CH=CH—, or —C≡C—), —OCH$_2$—, —CH$_2$O—, —COO—, —OCO—, —CH=CH—, or —C≡C—.

Even more preferably, $Z^1$, $Z^2$, and $Z^3$ in general formula (IVa) are each independently a single bond, —(CH$_2$)$_u$— (where u is 1 to 20, and one or more non-adjacent CH$_2$ groups are independently —O—, —CO—O—, —O—CO—, —CH=CH—, or —C≡C—), —OCH$_2$—, —CH$_2$O—, —COO—, —OCO—, —CH=CH—, or —C≡C—.

As used herein, the term "one or more non-adjacent CH$_2$ groups" refers to one or more CH$_2$ groups that are not adjacent to each other.

In general formula (IVa), q is preferably 1. In general formula (IVa), p is preferably 0.

In general formula (IVa), $A^1$ and $A^2$ are preferably each independently a trans-1,4-cyclohexylene, trans-1,3-dioxane-2,5-diyl, 1,4-naphthylene, 2,6-naphthylene, pyridine-2,5-diyl, pyrimidine-2,5-diyl, or 1,4-phenylene group that may be unsubstituted or have one or more hydrogen atoms replaced with a fluorine atom, a chlorine atom, a methyl group, or a methoxy group.

More preferably, $A^1$ and $A^2$ in general formula (IVa) are each independently a trans-1,4-cyclohexylene, 2,6-naphthylene, pyridine-2,5-diyl, pyrimidine-2,5-diyl, or 1,4-phenylene group that may be unsubstituted or have one or more hydrogen atoms replaced with a fluorine atom, a chlorine atom, a methyl group, or a methoxy group.

Even more preferably, $A^1$ and $A^2$ in general formula (IVa) are each independently a trans-1,4-cyclohexylene, 2,6-naphthylene, or 1,4-phenylene group that may be unsubstituted or have one or more hydrogen atoms replaced with a fluorine atom, a methyl group, or a methoxy group.

Most preferably, $A^2$ in general formulas (IVa), (IVb), and (IVc) is a 1,4-phenylene group that is unsubstituted or has one or more hydrogen atoms replaced with a fluorine atom, a methyl group, or a methoxy group. This 1,4-phenylene group may be unsubstituted or have one or more hydrogen atoms replaced with a fluorine atom, a methyl group, or a methoxy group.

To improve the liquid crystal alignment properties of the liquid crystal alignment layer according to the present invention, it is preferred that $Z^1$, $Z^2$, and $Z^3$ in general formula (IVa) be each independently a single bond, —(CH$_2$)$_u$— (where u is 1 to 8, and one or two non-adjacent CH$_2$ groups are independently —O—, —CO—O—, —O—CO—, —Si(CH$_3$)$_2$—O—Si(CH$_3$)$_2$—, —CH=CH—, or —C≡C—), —COO—, —OCO—, —CH=CH—, —CF=CF—, or —C≡C— and that $A^1$ and $A^2$ be each independently a trans-1,4-cyclohexylene, trans-1,3-dioxane-2,5-diyl, pyridine-2,5-diyl, pyrimidine-2,5-diyl, 2,5-thiophenylene, or 1,4-phenylene group.

To improve the thermal stability of alignment on the liquid crystal alignment layer according to the present invention, it is preferred that $Z^1$, $Z^2$, and $Z^3$ in general formula (IVa) be each independently —NR—CO—, —CO—NR—, —NR—CO—O—, —O—CO—NR—, —NR—CO—NR—, or —O—CO—O— and that A1 and $A^2$ be each independently a 1,4-naphthylene, 2,6-naphthylene, pyridine-2,5-diyl, pyrimidine-2,5-diyl, 2,5-thiophenylene, 2,5-furanylene, or 1,4-phenylene group.

To improve the solubility of the polymer according to the present invention, it is preferred that $Z^1$, $Z^2$, and $Z^3$ be each independently —OCH$_2$—, —CH$_2$O—, —CF$_2$O—, —OCF$_2$—, —CF$_2$CF$_2$—, —NR—, or —CO— and that $A^1$ and $A^2$ be each independently a trans-1,4-cyclohexylene, 1,4-naphthylene, 2,6-naphthylene, or 2,5-furanylene group.

Also preferably, in general formulas (IVa), (IVb), and (IVc), $A^2$ is a trans-1,4-cyclohexylene, 2,6-naphthylene, pyridine-2,5-diyl, pyrimidine-2,5-diyl, or 1,4-phenylene group, where one or more hydrogen atoms in the group are optionally replaced with a fluorine atom, a chlorine atom, a methyl group, or a methoxy group; $Z^3$ is a single bond or a —(CH$_2$)$_u$— (where u is 1 to 20), —OCH$_2$—, —CH$_2$O—, —COO—, —OCO—, —CH=CH—, or —C≡C— group, where one or more non-adjacent CH$_2$ groups in the group are independently optionally replaced with —O—, —CO—, —CO—O—, —O—CO—, —CH=CH—, or —C≡C—; and q is 1.

Examples of preferred groups represented by general formula (IVa) for Sp include those represented by chemical formulas (Sp-a-1) to (Sp-ah1-8) below. In these chemical formulas, the left dashed line is a linkage to the polymer main chain, and the right dashed line is a linkage to A or a linkage to the carbon atom to which X is linked.

Although any of these groups may be selected as needed, more preferred groups include those represented by chemical formulas (Sp-a-6) to (Sp-a-16), chemical formulas (Sp-b-3) to (Sp-b-10), chemical formulas (Sp-c-3) to (Sp-c-10), chemical formulas (Sp-d-3) to (Sp-d-12), chemical formulas (Sp-k-4) to (Sp-k-7), chemical formulas (Sp-l-13) to (Sp-l-17), chemical formulas (Sp-o-3) to (Sp-o-14), chemical formulas (Sp-p-2) to (Sp-p-13), chemical formulas (Sp-s-1) to (Sp-s-8), chemical formulas (Sp-t-1) to (Sp-t-8), chemical formulas (Sp-y-1) to (Sp-y-9), and chemical formulas (Sp-aa-1) to (Sp-aa-9).

[Chem. 8]

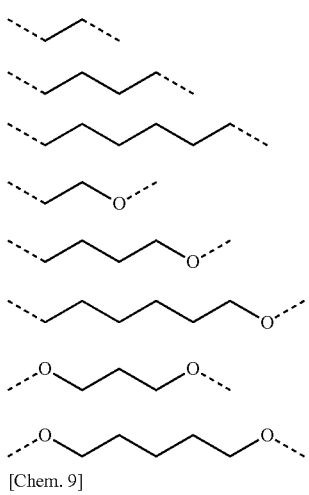
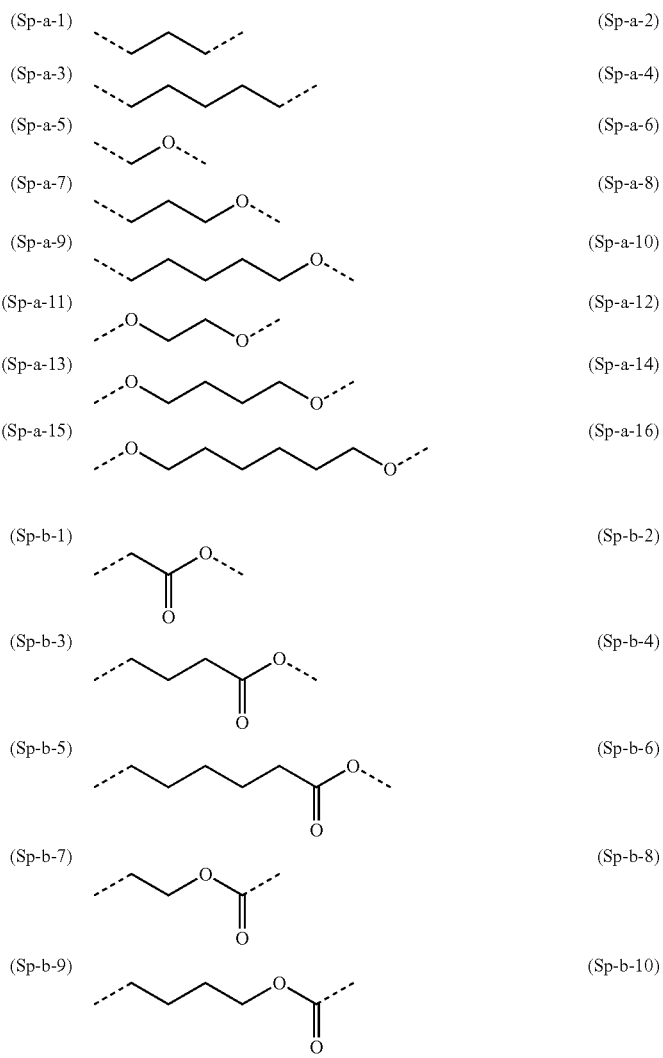

[Chem. 9]

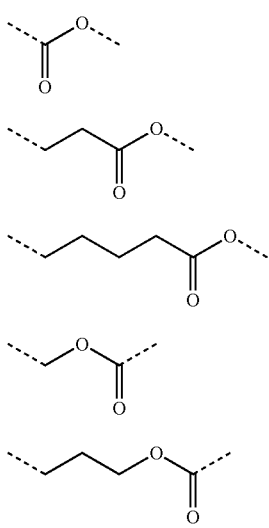

[Chem. 10]

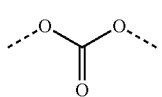

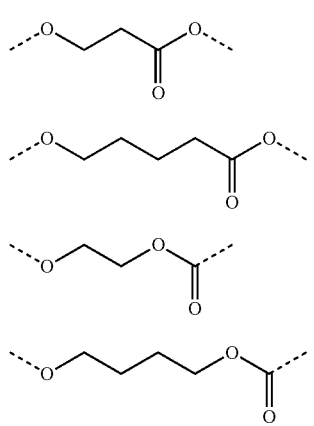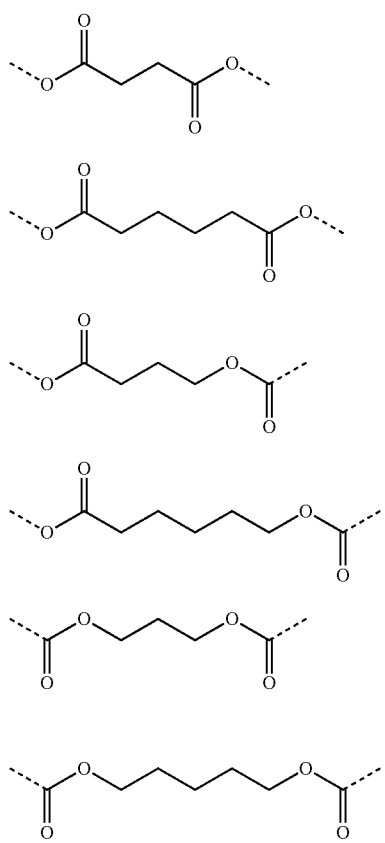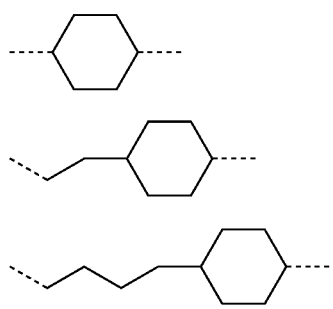

[Chem. 13]
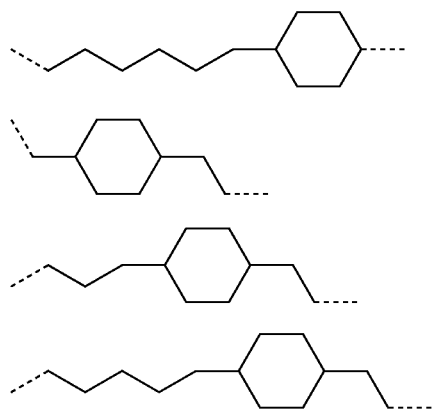
[Chem. 14]
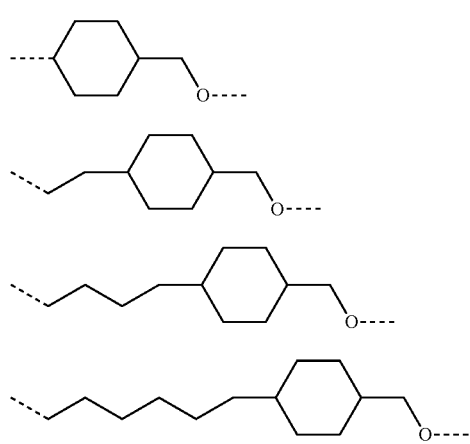
[Chem. 15]
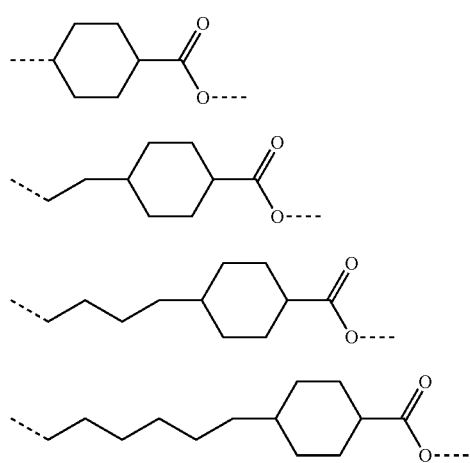

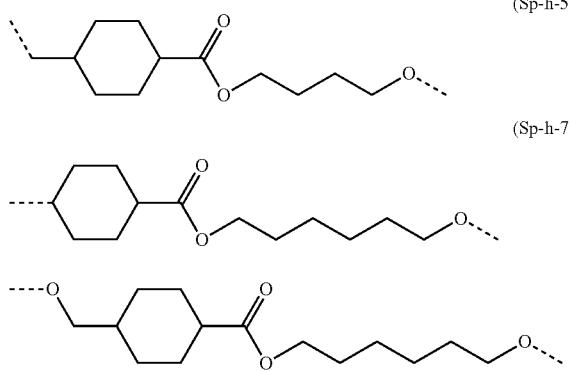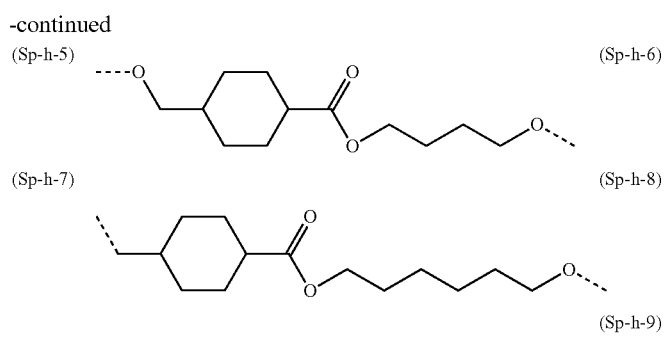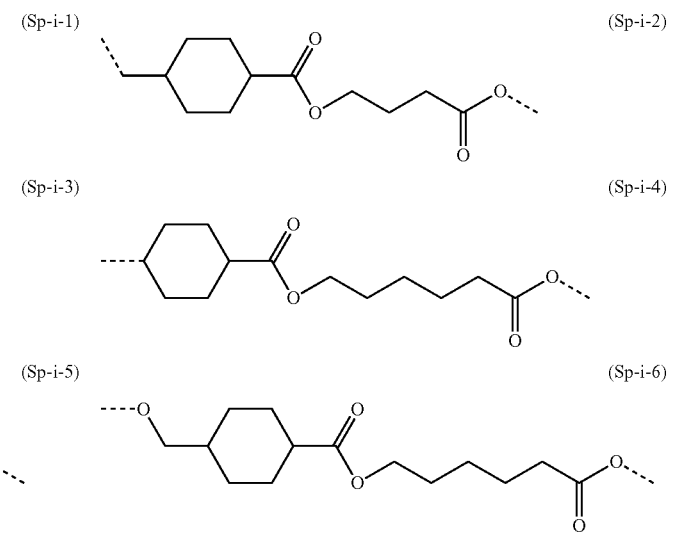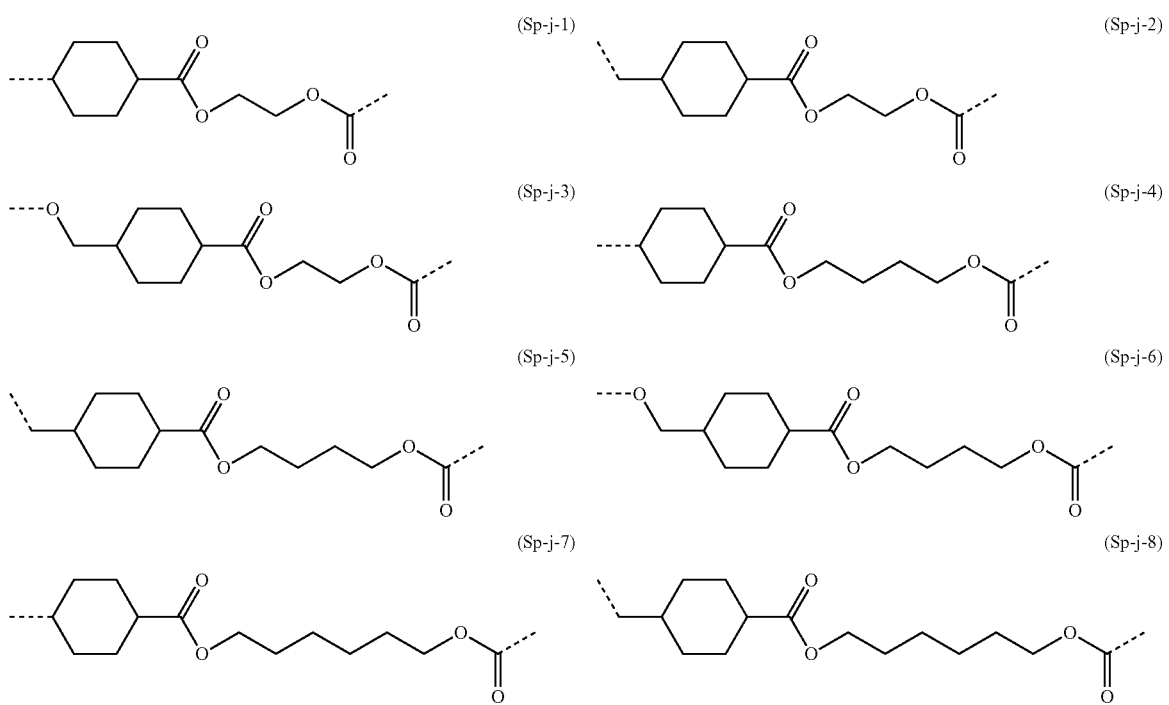

-continued
(Sp-j-9)
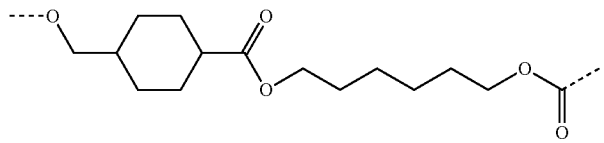
[Chem. 18]
(Sp-k-1) 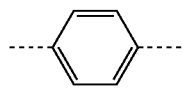 (Sp-k-2) 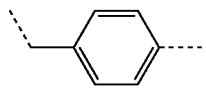
(Sp-k-3) 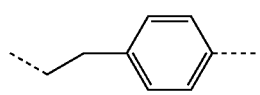 (Sp-k-4) 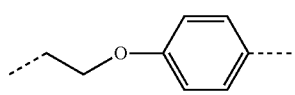
(Sp-k-5) 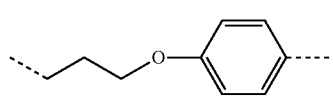 (Sp-k-6) 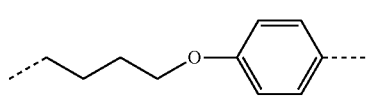
(Sp-k-7) 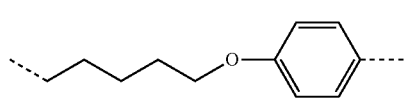 (Sp-k-8) 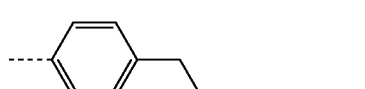
(Sp-k-9) 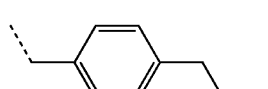 (Sp-k-10) 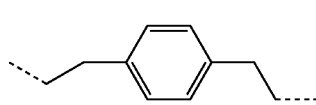
(Sp-k-11) 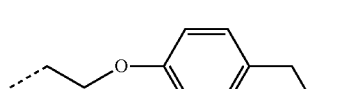 (Sp-k-12) 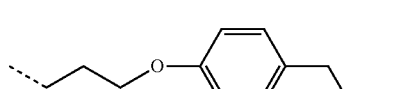
(Sp-k-13) 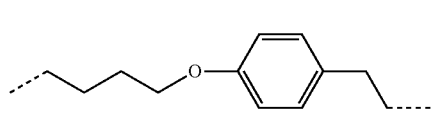 (Sp-k-14) 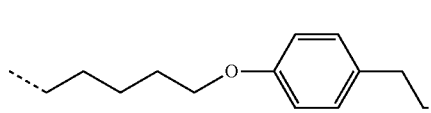
[Chem. 19]
(Sp-l-1) 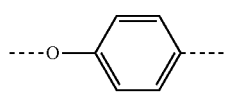 (Sp-l-2) 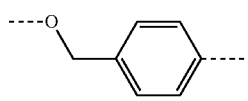
(Sp-l-3) 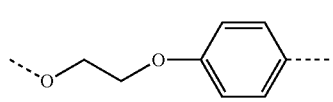 (Sp-l-4) 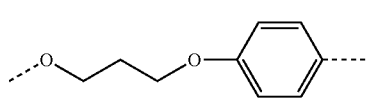
(Sp-l-5) 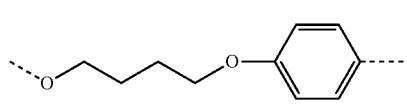 (Sp-l-6) 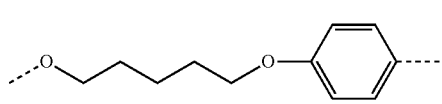
(Sp-l-7) 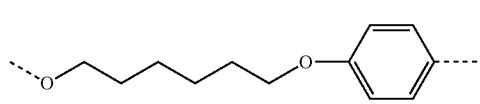 (Sp-l-8) 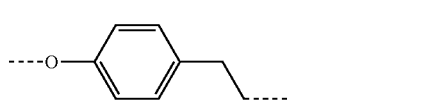
(Sp-l-9) 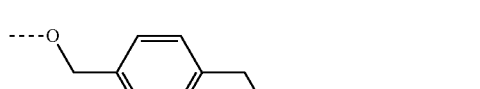 (Sp-l-10) 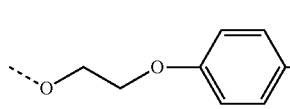
(Sp-l-11) 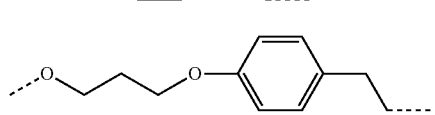 (Sp-l-12) 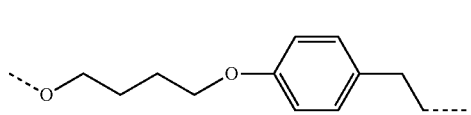

-continued
(Sp-l-13)
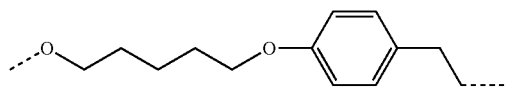
(Sp-l-14)
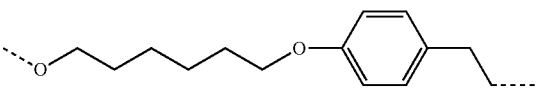
[Chem. 20]
(Sp-m-1)
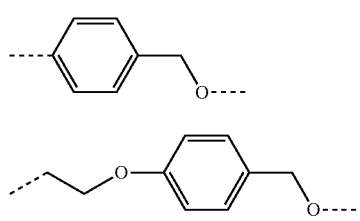
(Sp-m-2)
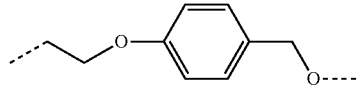
(Sp-m-3)
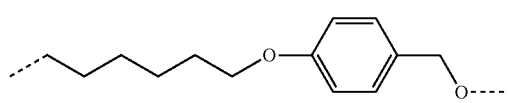
(Sp-m-4)
(Sp-m-5)
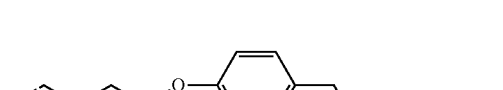
(Sp-m-6)
(Sp-m-7)
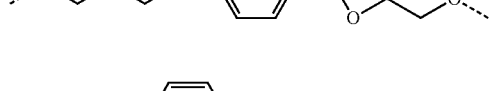
(Sp-m-8)
(Sp-m-9)
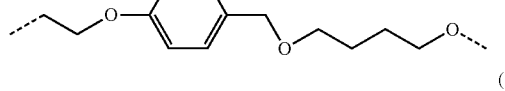
(Sp-m-10)
(Sp-m-11)
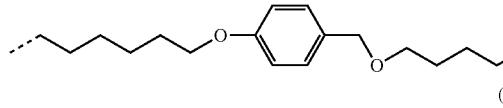
(Sp-m-12)
(Sp-m-13)
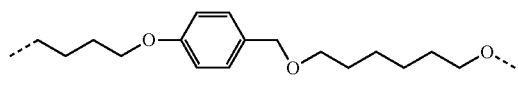
(Sp-m-14)
[Chem. 21]
(Sp-n-1)
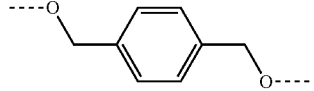
(Sp-n-2)
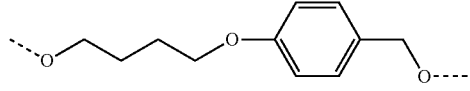
(Sp-n-3)
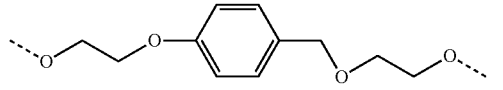
(Sp-n-4)
(Sp-n-5)
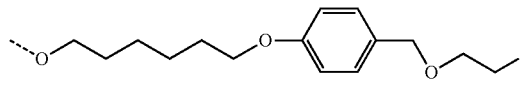
(Sp-n-6)
(Sp-n-7)
(Sp-n-8)
(Sp-n-9)
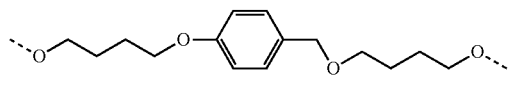
(Sp-n-10)

-continued
(Sp-n-11) 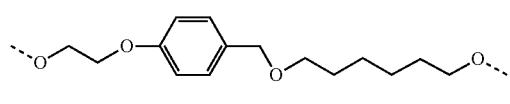
(Sp-n-12) 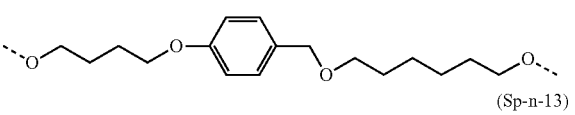
(Sp-n-13) 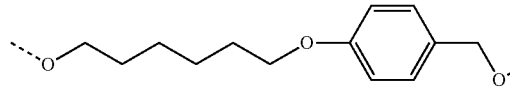
[Chem. 22]
(Sp-o-1) 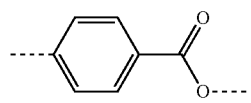
(Sp-o-2)
(Sp-o-3) 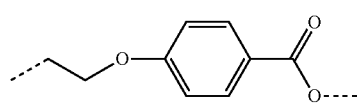
(Sp-o-4)
(Sp-o-5) 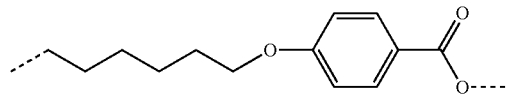
(Sp-o-6)
(Sp-o-7) 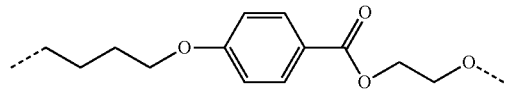
(Sp-o-8) 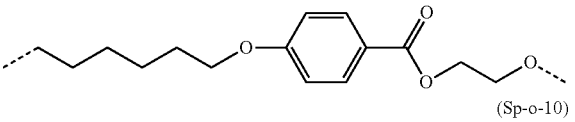
(Sp-o-9)
(Sp-o-10)
(Sp-o-11) 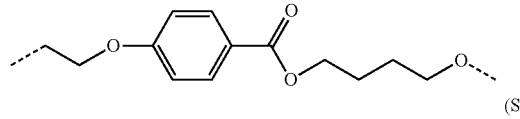
(Sp-o-12)
(Sp-o-13) 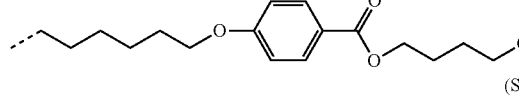
(Sp-o-14)
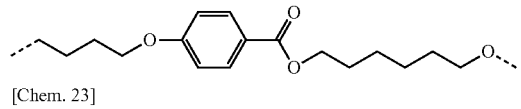
[Chem. 23]
(Sp-p-1) 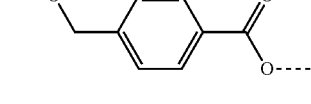
(Sp-p-2)
(Sp-p-3) 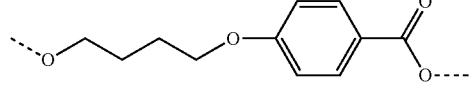
(Sp-p-4)
(Sp-p-5) 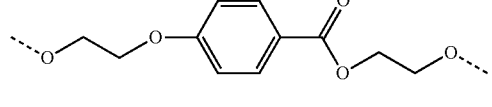
(Sp-p-6)
(Sp-p-7) 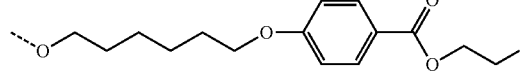
(Sp-p-8) 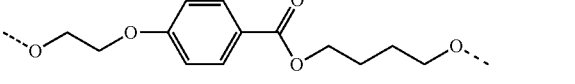

-continued
(Sp-p-9)
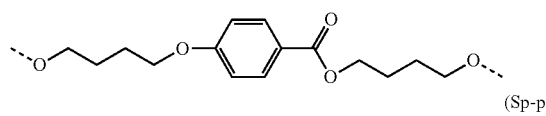
(Sp-p-10)
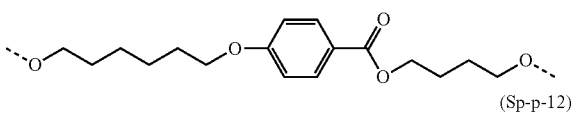
(Sp-p-11)
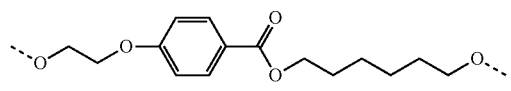
(Sp-p-12)
(Sp-p-13)
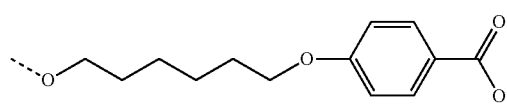
[Chem. 24]
(Sp-q-1)
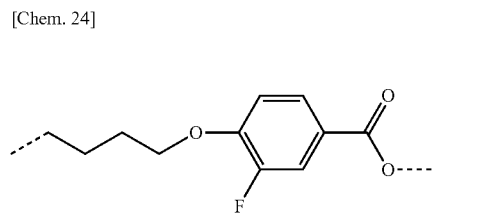
(Sp-q-2)
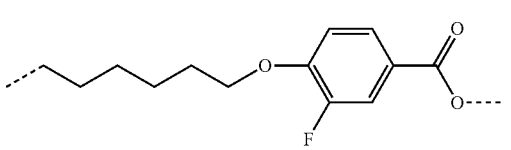
(Sp-q-3)
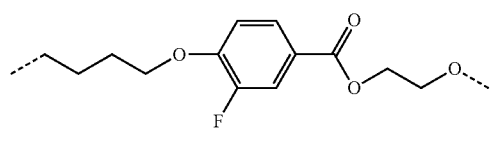
(Sp-q-4)
(Sp-q-5)
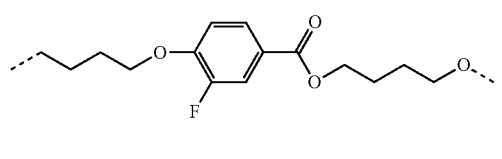
(Sp-q-6)
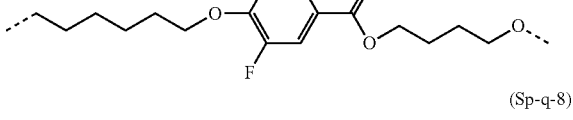
(Sp-q-7)
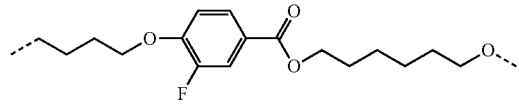
(Sp-q-8)
[Chem. 25]
(Sp-r-1)
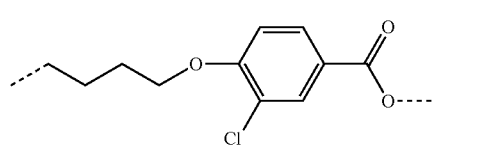
(Sp-r-2)
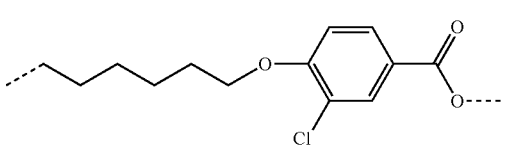
(Sp-r-3)
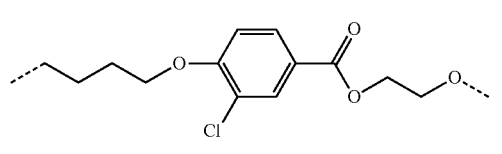
(Sp-r-4)
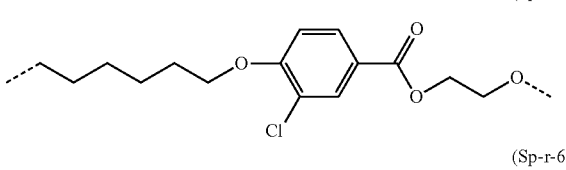
(Sp-r-5)
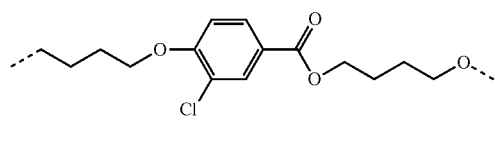
(Sp-r-6)
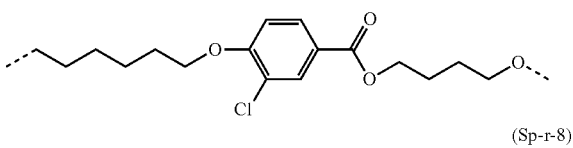
(Sp-r-7)
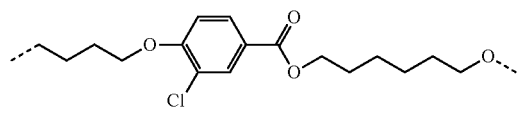
(Sp-r-8)

-continued
[Chem. 26]
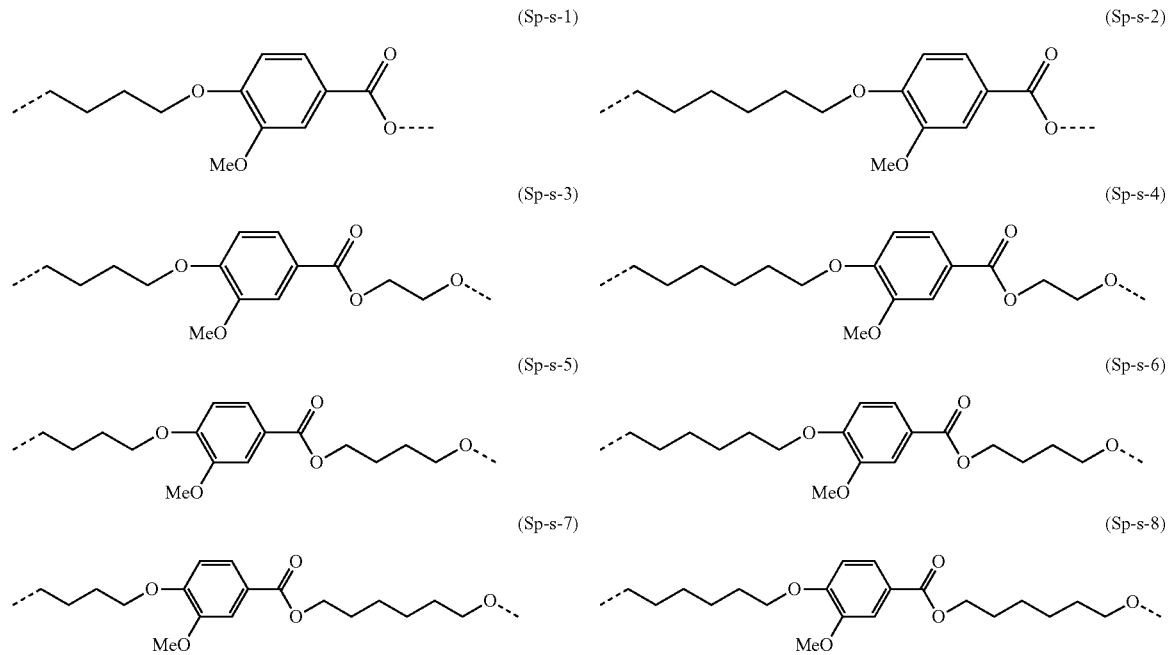
[Chem. 27]
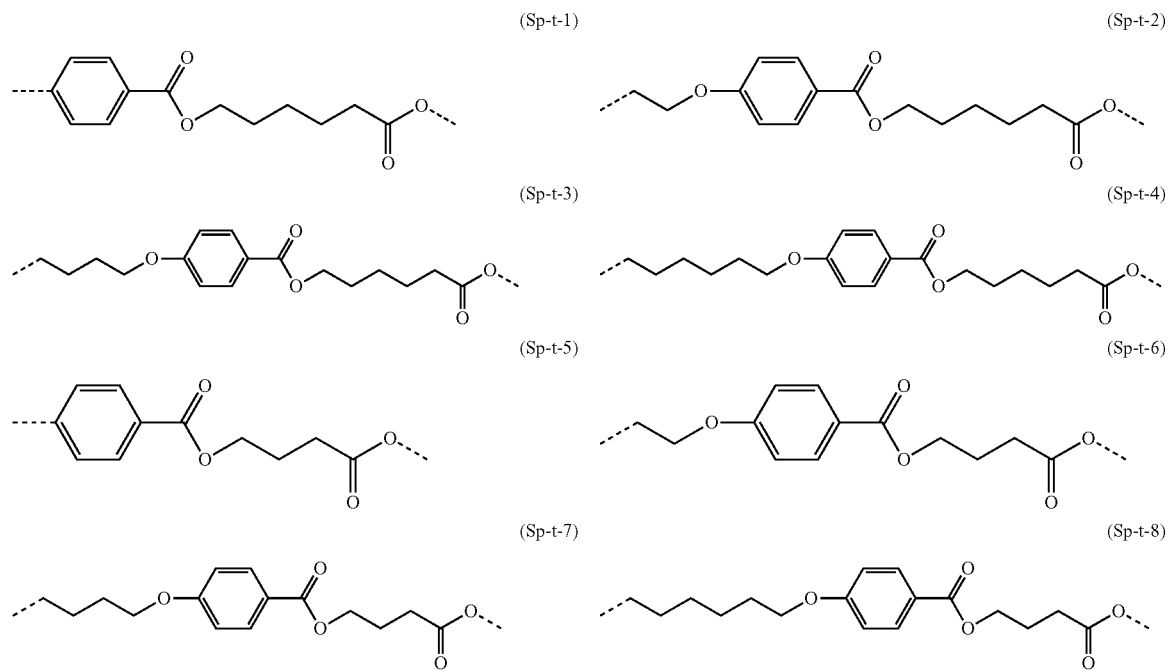
[Chem. 28]
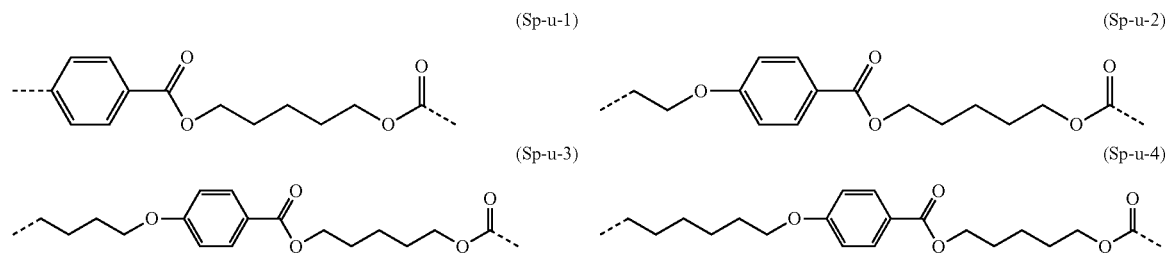

-continued
(Sp-u-5) 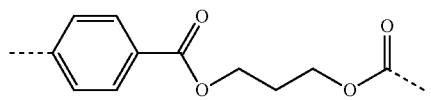
(Sp-u-6) 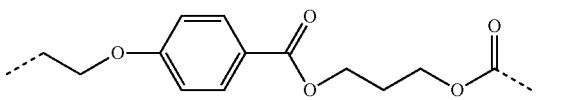
[Chem. 29]
(Sp-u-7) 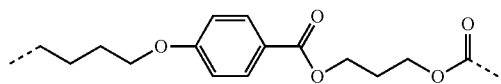
(Sp-u-8) 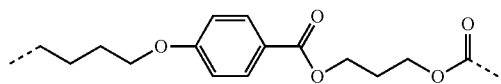
(Sp-v-1) 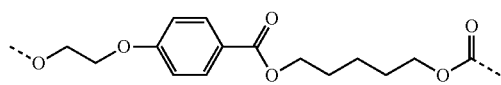
(Sp-v-2)
(Sp-v-3) 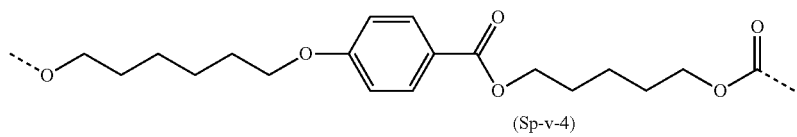
(Sp-v-4) 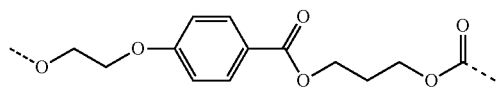
(Sp-v-5)
(Sp-v-6) 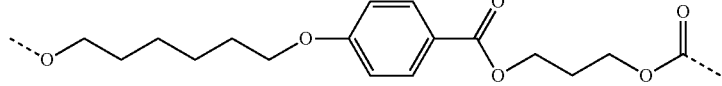
[Chem. 30]
(Sp-w-1) 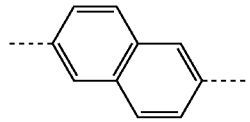
(Sp-w-2)
(Sp-w-3) 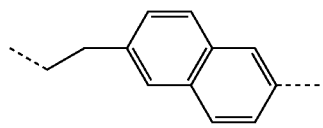
(Sp-w-4)
(Sp-w-5) 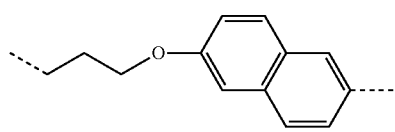
(Sp-w-6)
(Sp-w-7) 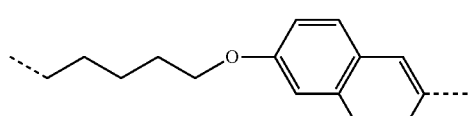
(Sp-w-8)
[Chem. 31]
(Sp-x-1) 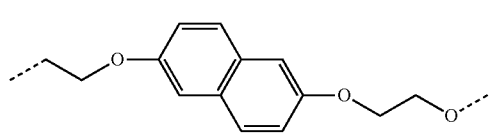
(Sp-x-2) 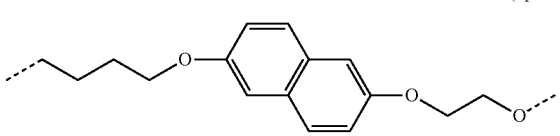

-continued
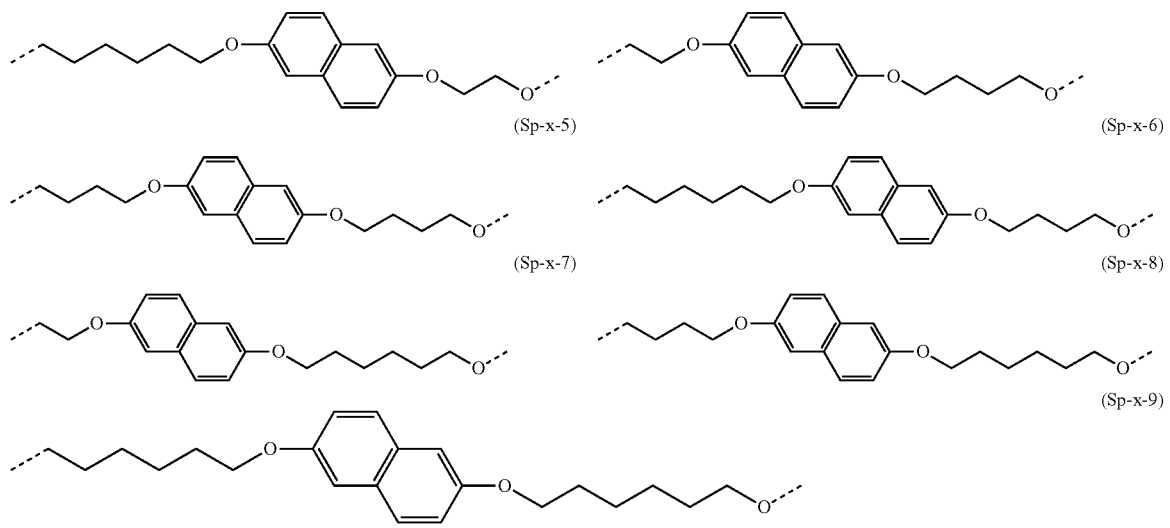
[Chem. 32]
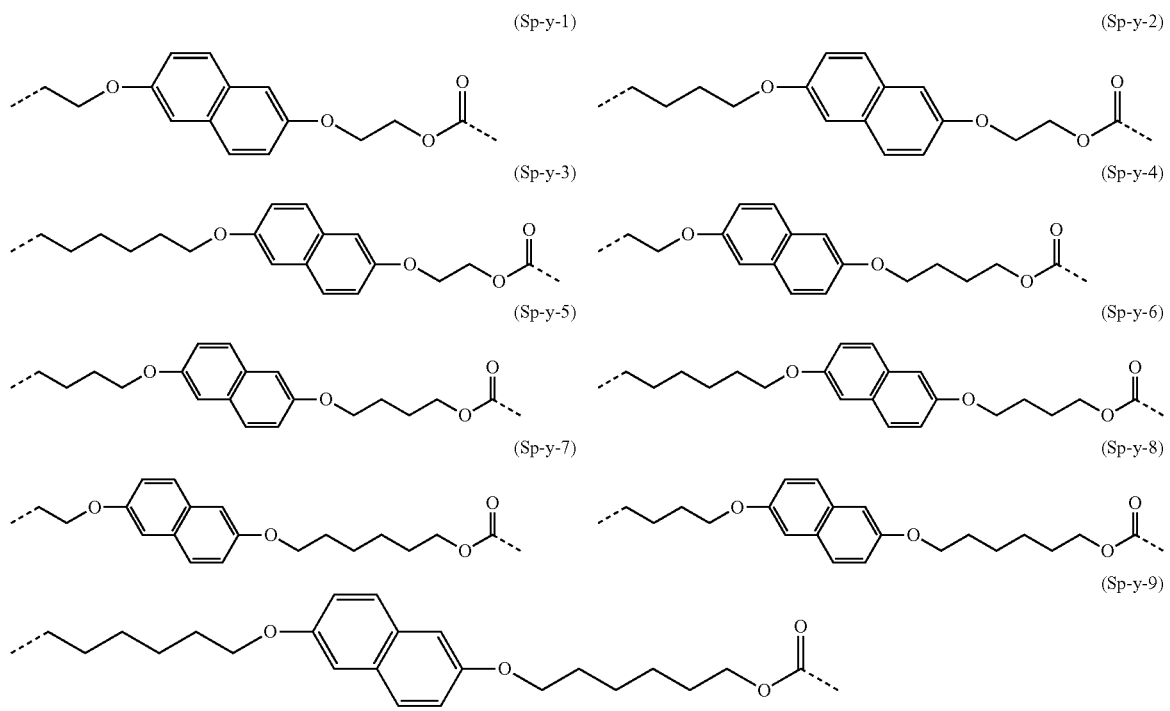
[Chem. 33]
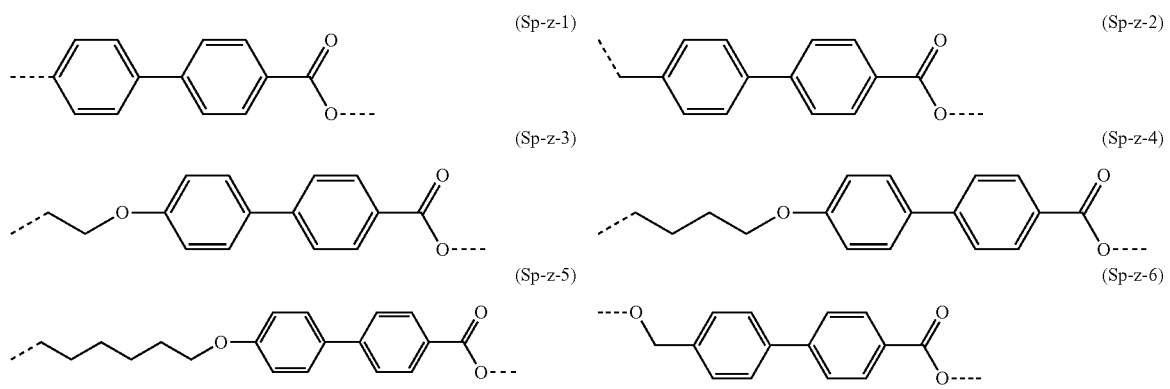

(Sp-z-7) 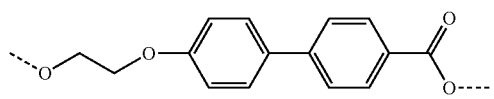
(Sp-z-8) 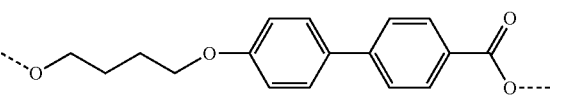
(Sp-z-9) 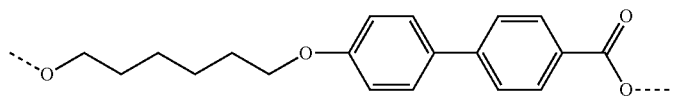
[Chem. 34]
(Sp-aa-1) 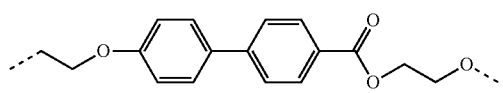
(Sp-aa-2)
(Sp-aa-3) 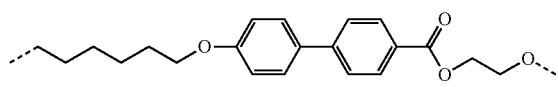
(Sp-aa-4)
(Sp-aa-5) 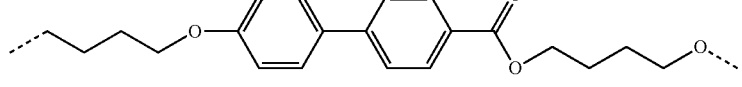
(Sp-aa-6) 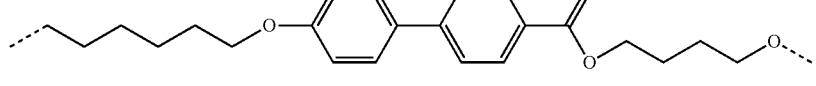
(Sp-aa-7) 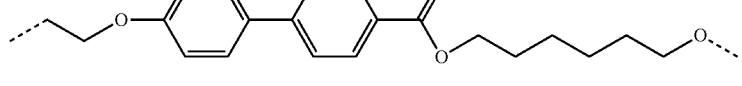
(Sp-aa-8) 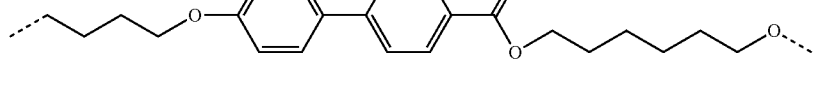
(Sp-aa-9) 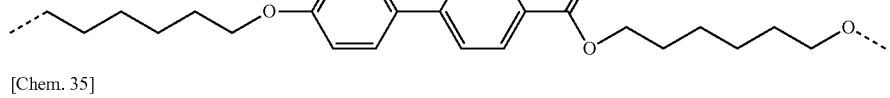
[Chem. 35]
(Sp-ab-1) 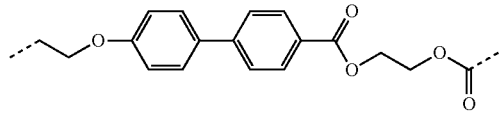
(Sp-ab-2)
(Sp-ab-3) 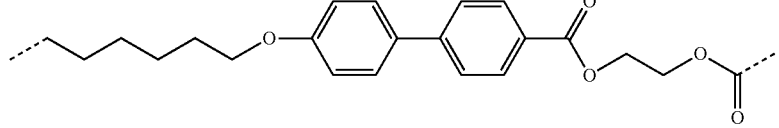
(Sp-ab-4) 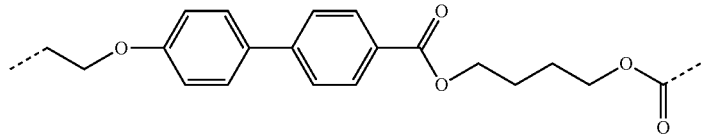

-continued
(Sp-ab-5)
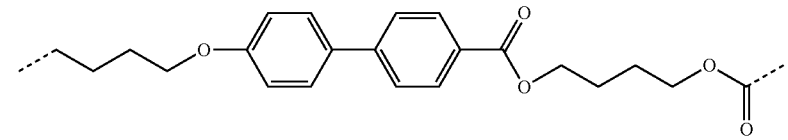
(Sp-ab-6)
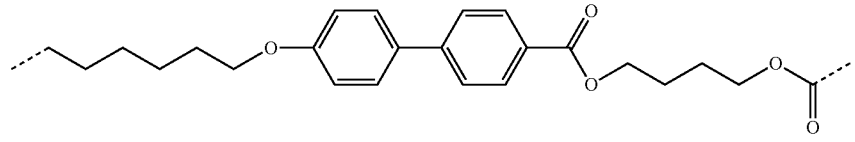
(Sp-ab-7)
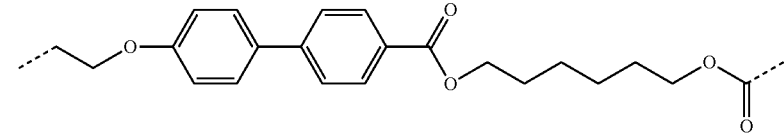
(Sp-ab-8)
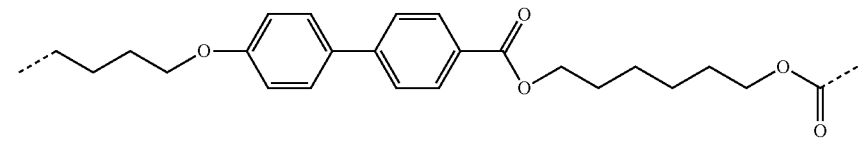
(Sp-ab-9)
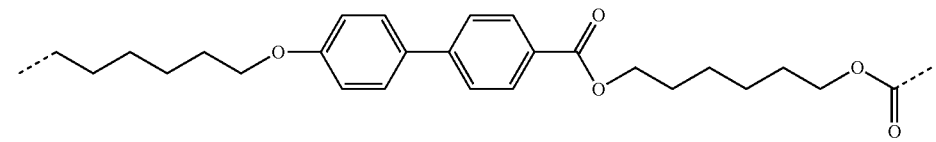
[Chem. 36]
(Sp-ac-1)
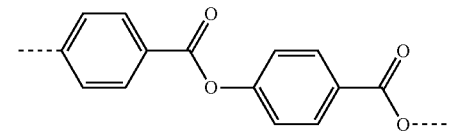
(Sp-ac-2)
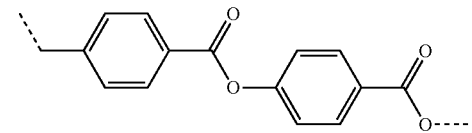
(Sp-ac-3)
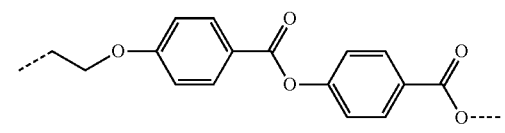
(Sp-ac-4)
(Sp-ac-5)
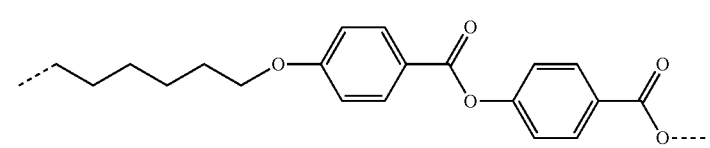
[Chem. 37]
(Sp-ad-1)
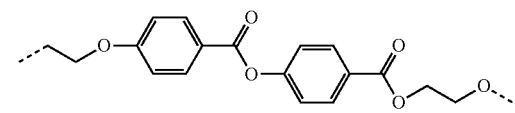
(Sp-ad-2)
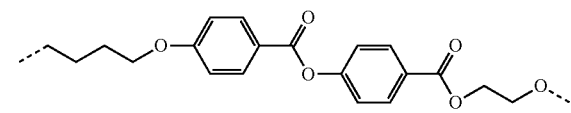
(Sp-ad-3)
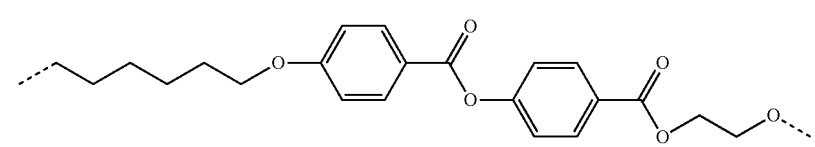

(Sp-ad-4)
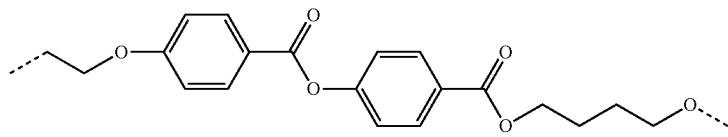
(Sp-ad-5)
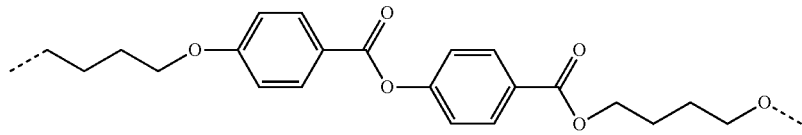
(Sp-ad-6)
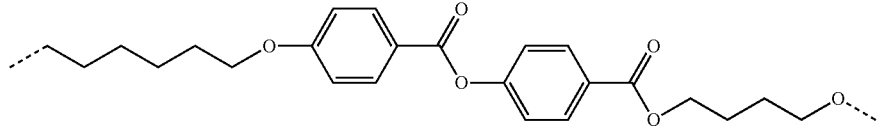
(Sp-ad-7)
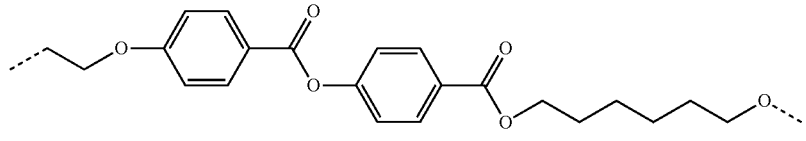
(Sp-ad-8)
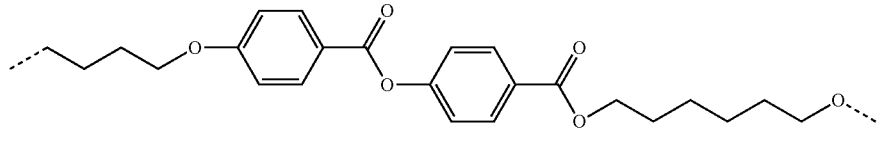
(Sp-ad-9)
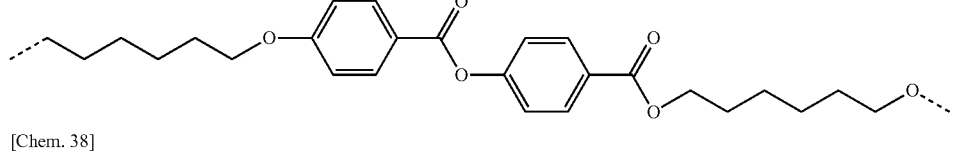
[Chem. 38]
(Sp-ae-1)                                  (Sp-ae-2)
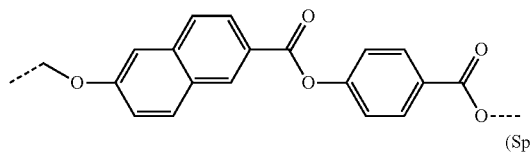        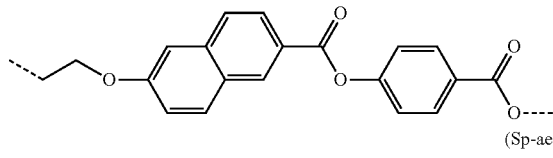
(Sp-ae-3)                                  (Sp-ae-4)
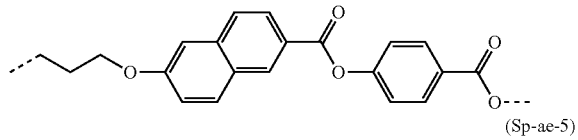        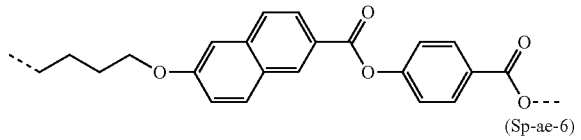
(Sp-ae-5)                                  (Sp-ae-6)
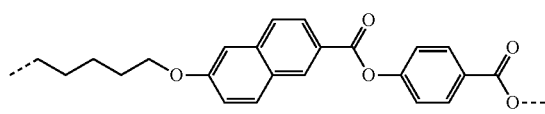       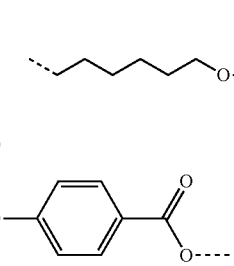
(Sp-ae-7)
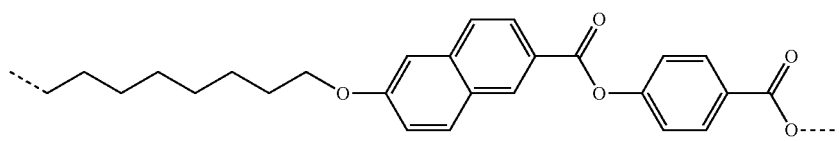
(Sp-ae-8)

(Sp-ae-9)
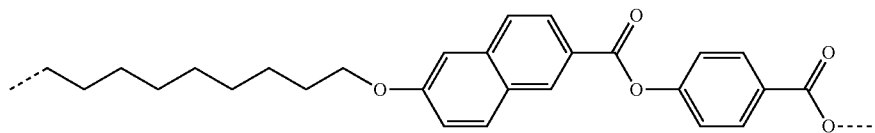
[Chem. 39]
(Sp-af-1) (Sp-af-2)
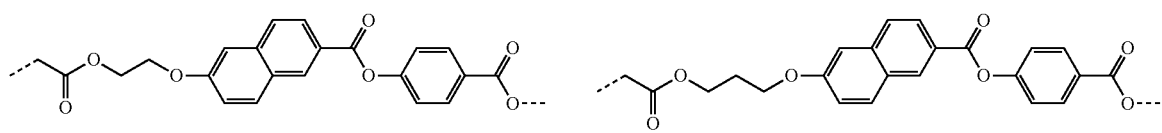
(Sp-af-3)
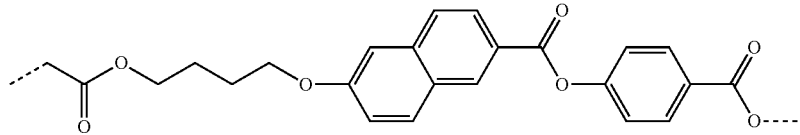
(Sp-af-4)
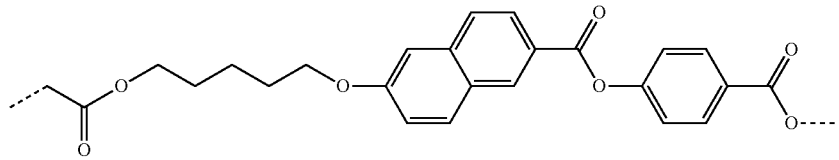
(Sp-af-5)
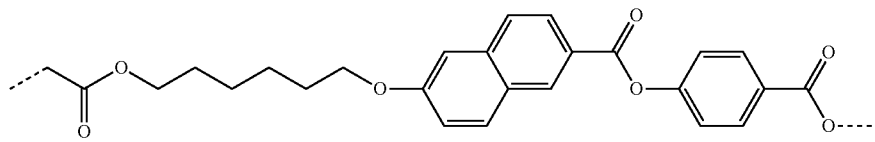
(Sp-af-6)
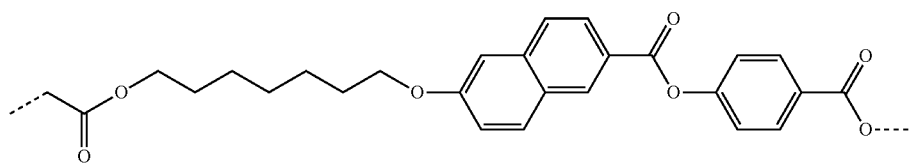
(Sp-af-7)
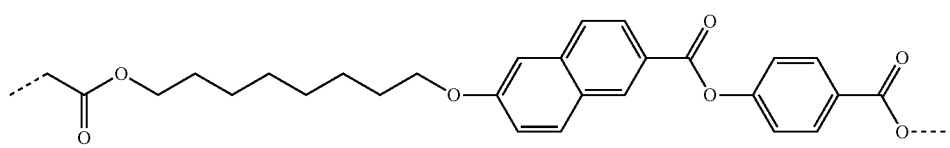
(Sp-af-8)
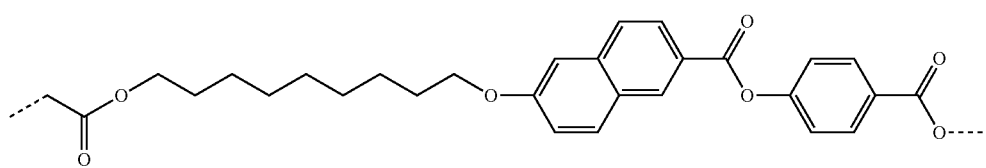
[Chem. 40]
(Sp-ag-1) (Sp-ag-2)
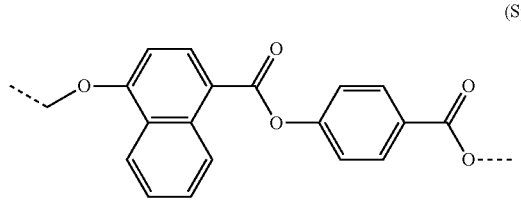 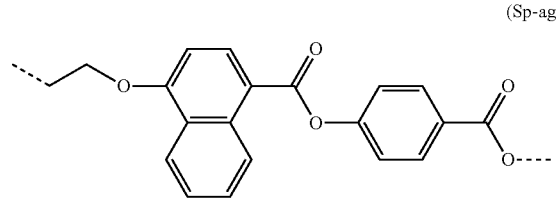

-continued
(Sp-ag-3)
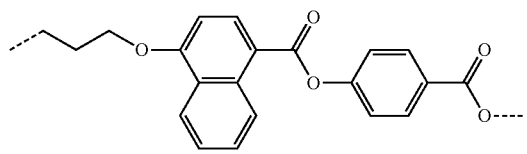
(Sp-ag-4)
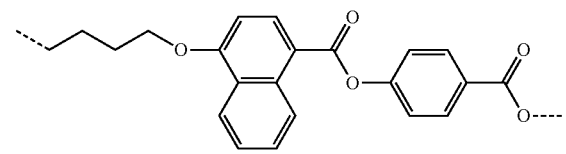
(Sp-ag-5)
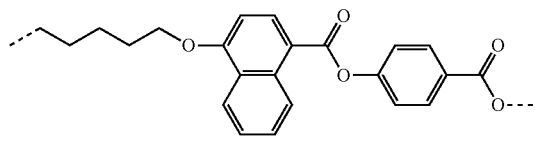
(Sp-ag-6)
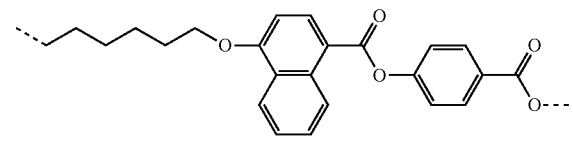
(Sp-ag-7)
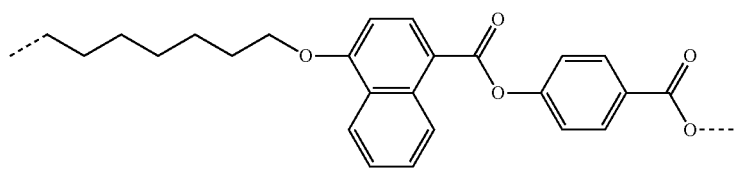
(Sp-ag-8)
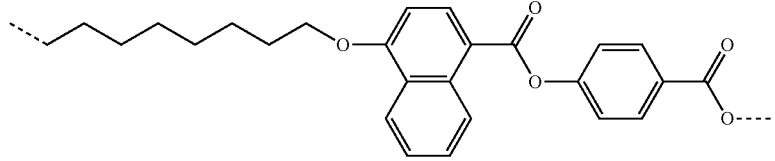
(Sp-ag-9)
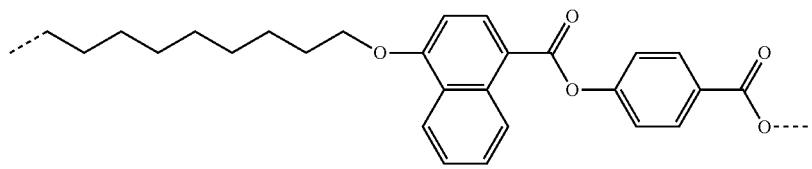
[Chem. 41]
(Sp-ah-1)
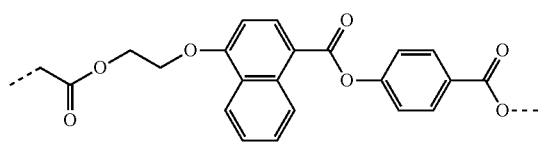
(Sp-ah-2)
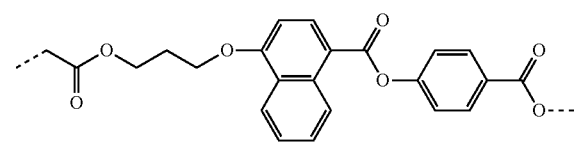
(Sp-ah-3)
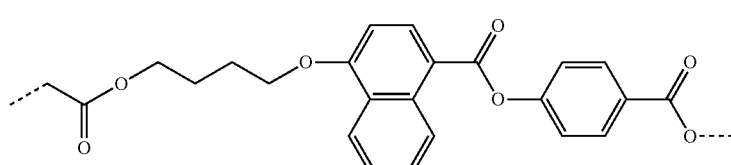
(Sp-ah-4)
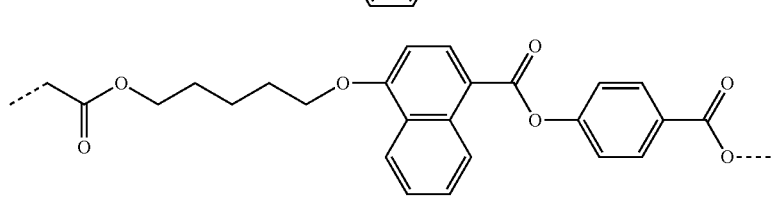
(Sp-ah-5)
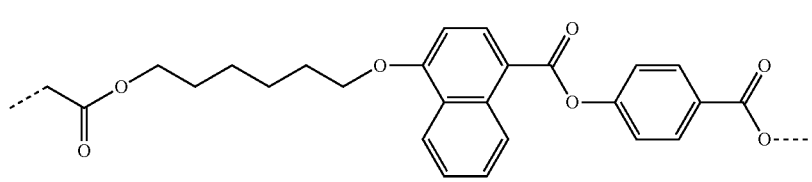

-continued

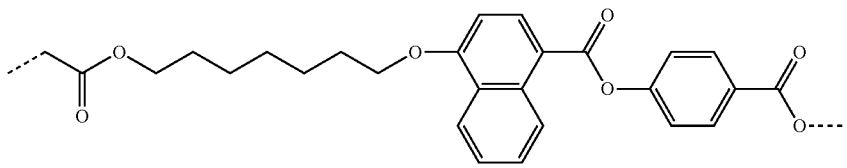
(Sp-ah-6)

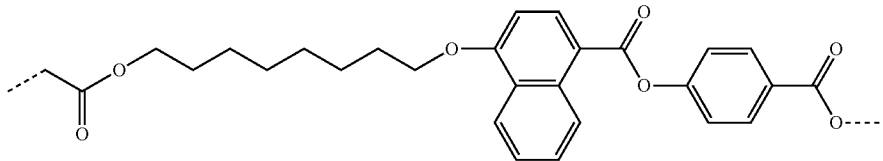
(Sp-ah-7)

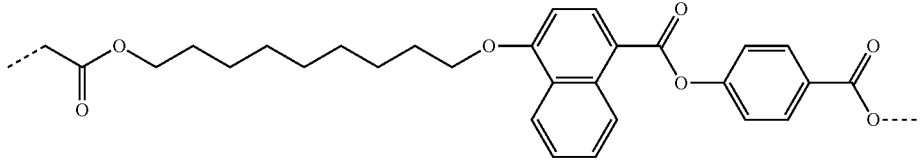
(Sp-ah-8)

A preferred polymer for the photoalignment layer is a polymer where Sp is represented by general formula (IVa) where $A^2$ is a trans-1,4-cyclohexylene, 2,6-naphthylene, pyridine-2,5-diyl, pyrimidine-2,5-diyl, or 1,4-phenylene group, where one or more hydrogen atoms in the group are optionally replaced with a fluorine atom, a chlorine atom, a methyl group, or a methoxy group; $Z^3$ is a single bond or a —$(CH_2)_u$— (where u is 1 to 20), —$OCH_2$—, —$CH_2O$—, —COO—, —OCO—, —CH=CH—, or —C≡C— group, where one or more non-adjacent $CH_2$ groups in the group are independently optionally replaced with —O—, —CO—, —CO—O—, —O—CO—, —CH=CH—, or —C≡C—; and q is 1. The use of such a polymer provides a liquid crystal alignment layer with good liquid crystal alignment properties and pretilt angle control performance and a high voltage holding ratio (VHR) and a liquid crystal display device including such a liquid crystal alignment layer.

Description of L

In general formula (I), L is preferably any substituent selected from the group consisting of substituents represented by general formulas (III-1) to (III-17).

[Chem. 42]

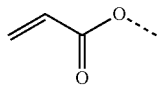
(III-1)

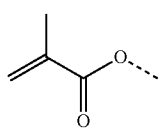
(III-2)

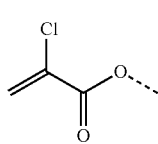
(III-3)

-continued

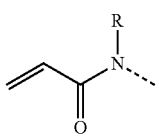
(III-4)

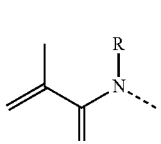
(III-5)

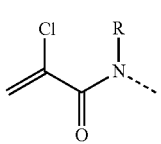
(III-6)

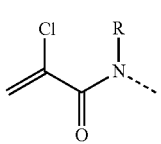
(III-7)

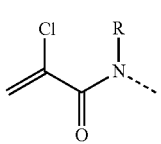
(III-8)

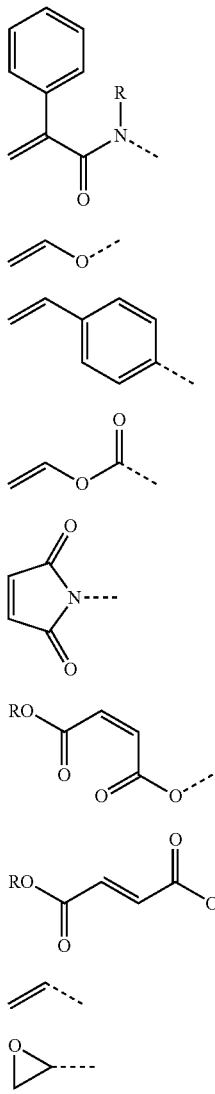

(III-9)
(III-10)
(III-11)
(III-12)
(III-13)
(III-14)
(III-15)
(III-16)
(III-17)

(In the formulas, the dashed line is a linkage to Sp, and R is independently hydrogen or an alkyl group of 1 to 5 carbon atoms.)

More preferably, L is represented by general formula (III-1), (III-2), (III-6), (III-7), or (III-13). Even more preferably, L is represented by general formula (III-1) or (III-2).

Photochemically Isomerizable, Photochemically Uncrosslinkable Segment and Polymer Containing this Segment A preferred polymer for the photoalignment layer contains a photochemically isomerizable, photochemically uncrosslinkable segment containing a structure represented by general formula (Q) below.

[Chem. 43]

$$-S_a-P-S_{aa}-V_a \quad (Q)$$

(In the formula, the dashed line is a linkage to the polymer main chain; $S_a$ and $S_{aa}$ are spacer units that may be different; P is a photochemically isomerizable, photochemically uncrosslinkable moiety; and $V_a$ is a side chain end.)

A preferred polymer for the photoalignment layer contains a structural unit represented by general formula (QP) below.

[Chem. 44]

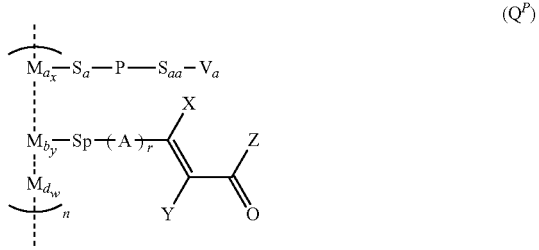

(QP)

(In the formula, Sp, A, X, Y, Z, and r are as defined in general formula (I); $S_a$, P, $S_{aa}$, and $V_a$ are as defined in general formula (Q); Ma, Mb, and Md are monomer units of the polymer that may be different; x, y, and w are mole fractions in the copolymer and necessarily satisfy $0<x\le1$, $0<y\le1$, and $0\le w<1$; n is 4 to 1,000,000; and Ma, Mb, and Md may be arranged in the same order as or in a different order from those in the formula and may each independently be composed of one type of monomer unit or two or more different types of monomer units).

A preferred polymer for the photoalignment layer is suitable for the formation of liquid crystal alignment layers for horizontally and vertically aligned liquid crystal display devices and the formation of liquid crystal alignment layers for optically anisotropic elements. The resulting liquid crystal alignment layer is suitable for horizontally and vertically aligned liquid crystal display devices.

A preferred polymer for the photoalignment layer contains a photochemically isomerizable, photochemically uncrosslinkable segment containing an azo group.

Preferred are compounds containing a structural unit represented by general formula (QP) where Ma and Mb are each independently any group selected from the group consisting of groups represented by formulas (QIII-A-1) to (QIII-A-17).

[Chem. 45]

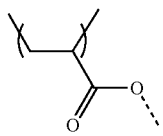

(Q$^{III-A-1}$)

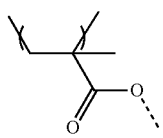

(Q$^{III-A-2}$)

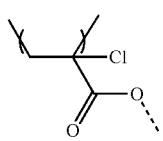

(Q$^{III-A-3}$)

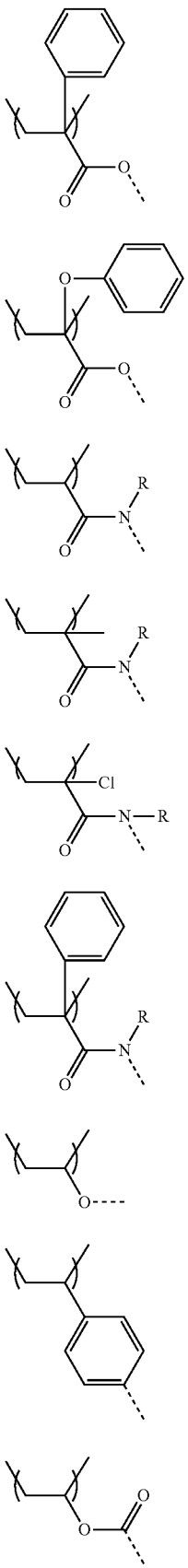

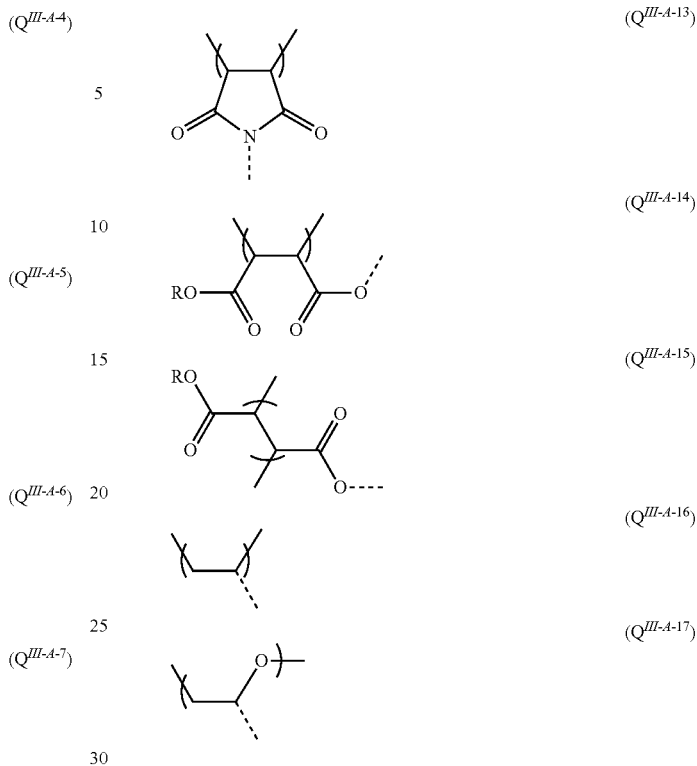

(In the formulas, the dashed line is a linkage to $S_a$ or Sp; R is independently a hydrogen atom or an alkyl group of 1 to 5 carbon atoms; and any hydrogen atom in each structure is optionally replaced with a fluorine atom, a chlorine atom, a methyl group, or a methoxy group.) Preferred are formulas (QIII-A-1), (QIII-A-2), (QIII-A-3), (QIII-A-4), (QIII-A-6), (QIII-A-7), (QIII-A-8), (QIII-A-9), (QIII-A-10), (QIII-A-11), (QIII-A-13), (QIII-A-16), and (QIII-A-17). More preferred are formulas (QIII-A-1), (QIII-A-2), (QIII-A-3), (QIII-A-6), (QIII-A-7), (QIII-A-8), (QIII-A-13), (QIII-A-16), and (QIII-A-17). Even more preferred are formulas (QIII-A-1), (QIII-A-2), (QIII-A-3), (QIII-A-6), (QIII-A-7), and (QIII-A-13).

To improve the solubility of the polymer, formulas (QIII-A-1), (QIII-A-2), (QIII-A-3), (QIII-A-6), (QIII-A-7), (QIII-A-8), (QIII-A-10), (QIII-A-12), (QIII-A-14), (QIII-A-16), and (QIII-A-17) are preferred, and formulas (QIII-A-1), (QIII-A-2), (QIII-A-10), (QIII-A-12), and (QIII-A-17) are more preferred. To improve the rate of polymerization, formulas (QIII-A-3), (QIII-A-8), (QIII-A-10), (QIII-A-12), (QIII-A-13), (QIII-A-14), (QIII-A-15), (QIII-A-16), and (QIII-A-17) are preferred, and formulas (QIII-A-3), (QIII-A-8), (QIII-A-10), (QIII-A-12) and (QIII-A-17) are more preferred. To narrow the molecular weight distribution of the polymer, formulas (QIII-A-2), (QIII-A-10), (QIII-A-11), and (QIII-A-12) are preferred. To improve the alignment stability, formulas (QIII-A-2), (QIII-A-4), (QIII-A-5), (QIII-A-7), (QIII-A-9), (QIII-A-13), (QIII-A-14), and (QIII-A-15) are preferred. To improve the adhesion to substrates, formulas (QIII-A-1), (QIII-A-6), (QIII-A-7), (QIII-A-8), (QIII-A-9), (QIII-A-10), (QIII-A-12), (QIII-A-13), and (QIII-A-17) are preferred, and formulas (QIII-A-6), (QIII-A-7), (QIII-A-8), and (QIII-A-13) are more preferred.

Examples of groups for Ma and Mb in general formula (Q) or (QP) include acrylate, methacrylate, acrylamide, methacrylamide, maleic acid derivative, siloxane, epoxide, acryloyloxy, methacryloyloxy, 2-chloroacryloyloxy, 2-phenylacryloyloxy, 2-phenyloxyacryloyloxy, acrylamide, methacrylamide, 2-chloromethacrylamide, 2-phenylacrylamide, vinyloxy, styryl, vinyloxycarbonyl, maleimide, maleate, fumarate, siloxane, vinyl, and epoxy groups.

In general formula (QP), Md is preferably each independently represented by any of formulas (QIII-1) to (QIII-17).

[Chem. 46]

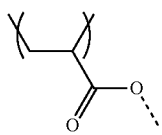
(Q$^{III\text{-}1}$)

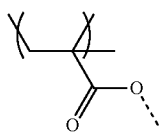
(Q$^{III\text{-}2}$)

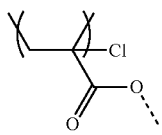
(Q$^{III\text{-}3}$)

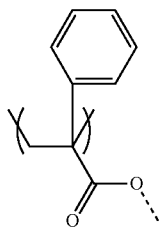
(Q$^{III\text{-}4}$)

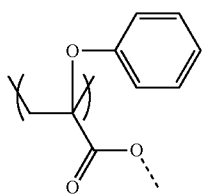
(Q$^{III\text{-}5}$)

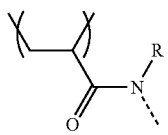
(Q$^{III\text{-}6}$)

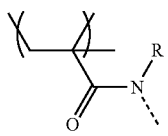
(Q$^{III\text{-}7}$)

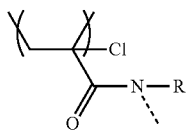
(Q$^{III\text{-}8}$)

-continued

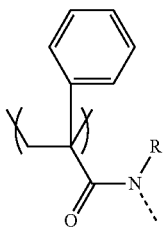
(Q$^{III\text{-}9}$)

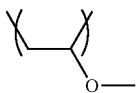
(Q$^{III\text{-}10}$)

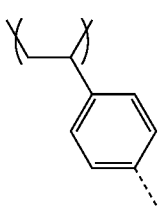
(Q$^{III\text{-}11}$)

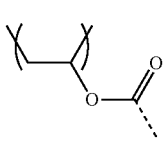
(Q$^{III\text{-}12}$)

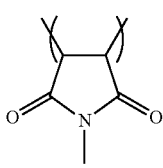
(Q$^{III\text{-}13}$)

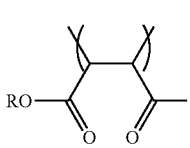
(Q$^{III\text{-}14}$)

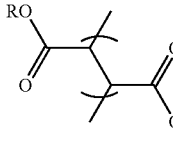
(Q$^{III\text{-}15}$)

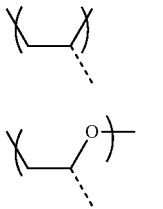
(Q$^{III\text{-}16}$)

(Q$^{III\text{-}17}$)

(In the formulas, the dashed line is a linkage to a hydrogen atom or a monovalent organic group; R is independently a hydrogen atom or an alkyl group of 1 to 5 carbon atoms; and any hydrogen atom in each structure is optionally replaced with a fluorine atom, a chlorine atom, a methyl group, or a methoxy group.)

In general formulas (QIII-1) to (QIII-17), the monovalent organic group is preferably represented by general formula (QIV).

[Chem. 47]

(QIV)

(In the formula, the dashed line is a linkage to $M_a$; $S_a$ is a structure represented by general formula (VI); and $V_a$ is a structure represented by general formula (VII).)

In general formula (Q) or (QP), $S_a$ and $S_{aa}$ are preferably structures represented by general formula (VI) below.

[Chem. 48]

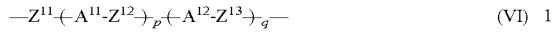

(VI)

(In the formula, each dashed line is a linkage to the polymer main chain, Ma, P, or Va;

$Z^{11}$, $Z^{12}$, and $Z^{13}$ are each independently a single bond, —$(CH_2)_u$— (where u is 1 to 20), —$OCH_2$—, —$CH_2O$—, —COO—, —OCO—, —CH=CH—, —CF=CF—, —$CF_2O$—, —$OCF_2$—, —$CF_2CF_2$—, or —C≡C—, where one or more non-adjacent $CH_2$ groups in these substituents are independently optionally replaced with —O—, —CO—, —CO—O—, —O—CO—, —Si$(CH_3)_2$—O—Si$(CH_3)_2$—, —NR—, —NR—CO—, —CO—NR—, —NR—CO—O—, —O—CO—NR—, —NR—CO—NR—, —CH=CH—, —C≡C—, or —O—CO—O— (where R is independently hydrogen or an alkyl group of 1 to 5 carbon atoms);

$A^{11}$ and $A^{12}$ are each independently a group selected from the group consisting of:

(a) a trans-1,4-cyclohexylene group (where one or more non-adjacent methylene groups present in this group are optionally replaced with —O—, —NH—, or —S—), (b) a 1,4-phenylene group (where one or more —CH= groups present in this group are optionally replaced with —N=), and (c) 1,4-cyclohexenylene, 2,5-thiophenylene, 2,5-furanylene, 1,4-bicyclo(2.2.2)octylene, naphthalene-1,4-diyl, naphthalene-2,6-diyl, decahydronaphthalene-2,6-diyl, and 1,2,3,4-tetrahydronaphthalene-2,6-diyl groups, where groups (a), (b), and (c) may each be unsubstituted or have one or more hydrogen atoms replaced with a fluorine atom, a chlorine atom, a cyano group, a methyl group, or a methoxy group; and p and q are each independently 0 or 1.)

In general formula (VI), each dashed line may be a linkage to the polymer main chain, Ma, P, or Va;

$Z^{11}$, $Z^{12}$, and $Z^{13}$ may each independently be a single bond, —$(CH_2)_u$—, —$OCH_2$—, —$CH_2O$—, —COO—, —OCO—, —CH=CH—, —CF=CF—, —$CF_2O$—, —$OCF_2$—, —$CF_2CF_2$—, or —C≡C—, where u is 1 to 20, and one or more non-adjacent $CH_2$ groups in the alkyl group are independently optionally replaced with Q, where Q is —O—, —CO—, —CO—O—, —O—CO—, —Si$(CH_3)_2$—O—Si$(CH_3)_2$—, —NR—, —NR—CO—, —CO—NR—, —NR—CO—O—, —O—CO—NR—, —NR—CO—NR—, —CH=CH—, —C≡C—, or —O—CO—O—, where R is independently a hydrogen atom or an alkyl group of 1 to 5 carbon atoms;

$A^{11}$ and $A^{12}$ may each independently be a trans-1,4-cyclohexylene, trans-1,3-dioxane-2,5-yl, 1,4-naphthylene, 2,6-naphthylene, 2,5-pyridyl, 2,5-pyrimidyl, 2,5-thiophenylene, 2,5-furanylene, or 1,4-phenylene group that may be unsubstituted or have one or more hydrogen atoms replaced with a fluorine atom, a chlorine atom, a methyl group, or a methoxy group; and p and q may be 0 or 1.

$Z^{11}$, $Z^{12}$, and $Z^{13}$ are preferably each independently a single bond, —$(CH_2)_u$— (where u is 1 to 12, and one or more non-adjacent $CH_2$ groups are independently optionally replaced with —O—, —CO—, —CO—O—, —O—CO—, —NR—, —NR—CO—, —CO—NR—, —NR—CO—NR—, —CH=CH—, —C≡C—, or —O—CO—O—, where R is hydrogen, a methyl group, or an ethyl group), —$OCH_2$—, —$CH_2O$—, —COO—, —OCO—, —CH=CH—, —$CF_2O$—, —$OCF_2$—, or —C≡C—. $A^{11}$ and $A^{12}$ are preferably each independently a trans-1,4-cyclohexylene, trans-1,3-dioxane-2,5-diyl, 1,4-naphthylene, 2,6-naphthylene, pyridine-2,5-diyl, pyrimidine-2,5-diyl, or 1,4-phenylene group that is unsubstituted or has one or more hydrogen atoms replaced with a fluorine atom, a chlorine atom, a methyl group, or a methoxy group. $Z^{11}$, $Z^{12}$, and $Z^{13}$ are more preferably each independently a single bond, —$(CH_2)_u$— (where u is 1 to 10, and one or more non-adjacent $CH_2$ groups are independently optionally replaced with —O—, —CO—, —CO—O—, —O—CO—, —NR—, —NR—CO—, —CO—NR—, —CH=CH—, or —C≡C—, where R is hydrogen, a methyl group, or an ethyl group), —$OCH_2$—, —$CH_2O$—, —COO—, —OCO—, —CH=CH—, or —C≡C—. $A^{11}$ and $A^{12}$ are more preferably each independently a trans-1,4-cyclohexylene, 2,6-naphthylene, or 1,4-phenylene group that is unsubstituted or has one or more hydrogen atoms replaced with a fluorine atom, a chlorine atom, a methyl group, or a methoxy group. $Z^{111}$, $Z^{12}$, and $Z^{13}$ are even more preferably each independently a single bond, —$(CH_2)_u$— (where u is 1 to 6, and one or more non-adjacent $CH_2$ groups are independently optionally replaced with —O—, —CO—O—, —O—CO—, —CH=CH—, or —C≡C—), —$OCH_2$—, —$CH_2O$—, —COO—, —OCO—, —CH=CH—, or —C≡C—. $A^{11}$ and $A^{12}$ are even more preferably each independently a trans-1,4-cyclohexylene, 2,6-naphthylene, or 1,4-phenylene group that is unsubstituted or has one or more hydrogen atoms replaced with a fluorine atom, a methyl group, or a methoxy group.

To improve the liquid crystal alignment properties, it is preferred that $Z^{11}$, $Z^{12}$, and $Z^{13}$ in general formula (VI) be each independently a single bond, —$(CH_2)_u$— (where u is 1 to 6, one or more non-adjacent $CH_2$ groups are independently —O—, —CO—O—, —O is 1 to 8, and one or two non-adjacent $CH_2$ groups are independently optionally replaced with —O—, —CO—O—, —O—CO—, —Si$(CH_3)_2$—O—Si$(CH_3)_2$—, —CH=CH—, or —C≡C—), —COO—, —OCO—, —CH=CH—, —CF=CF—, or —C≡C—. It is also preferred that $A^{11}$ and $A^{12}$ be each independently a trans-1,4-cyclohexylene, trans-1,3-dioxane-2,5-diyl, pyridine-2,5-diyl, pyrimidine-2,5-diyl, 2,5-thiophenylene, or 1,4-phenylene group.

To improve the thermal stability of alignment, it is preferred that $Z^{11}$, $Z^{12}$, and $Z^{13}$ be each independently —NR—CO—, —CO—NR—, —NR—CO—O—, —O—CO—NR—, —NR—CO—NR—, or —O—CO—O—. It is also preferred that $A^{11}$ and $A^{12}$ be each independently a 1,4-naphthylene, 2,6-naphthylene, pyridine-2,5-diyl, pyrimidine-2,5-diyl, 2,5-thiophenylene, 2,5-furanylene, or 1,4-phenylene group.

To improve the solubility of the polymer, it is preferred that $Z^{11}$, $Z^{12}$, and $Z^{13}$ be each independently —$OCH_2$—, —$CH_2O$—, —$CF_2O$—, —$OCF_2$—, —$CF_2CF_2$—, —NR—, or —CO—. It is also preferred that $A^{11}$ and $A^{12}$ be each independently a trans-1,4-cyclohexylene, 1,4-naphthylene, 2,6-naphthylene, or 2,5-furanylene group.

Although general formula (VI) encompasses numerous compounds, specific preferred compounds include those represented by formulas (S-a-1) to (S-ad-9) below.

[Chem. 49]
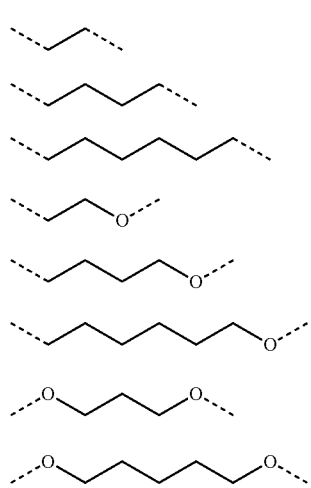
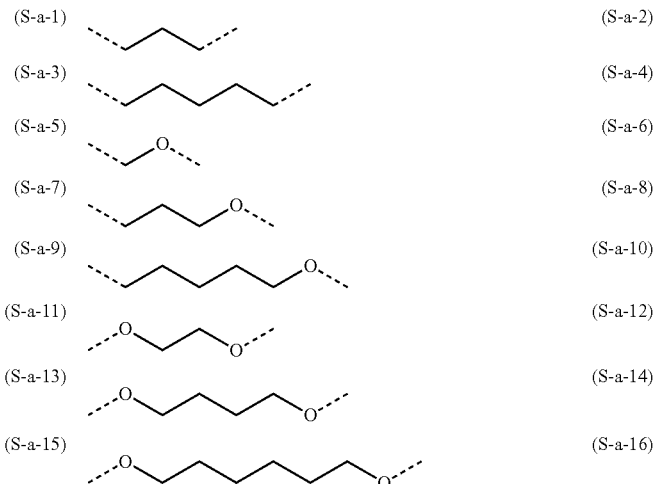
[Chem. 50]
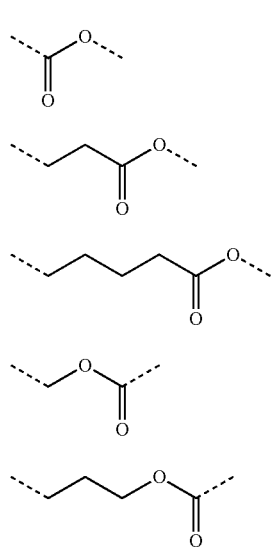
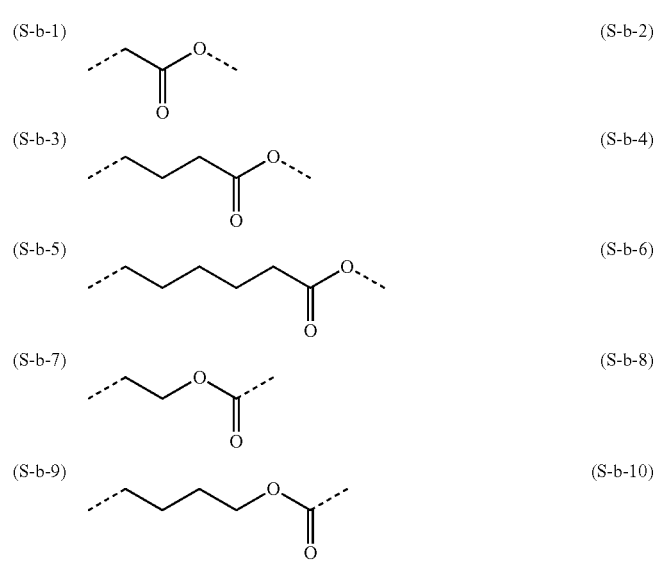
[Chem. 51]
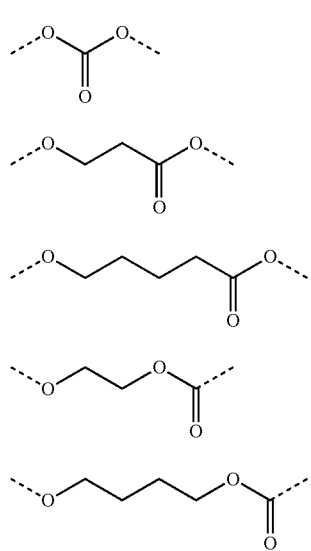
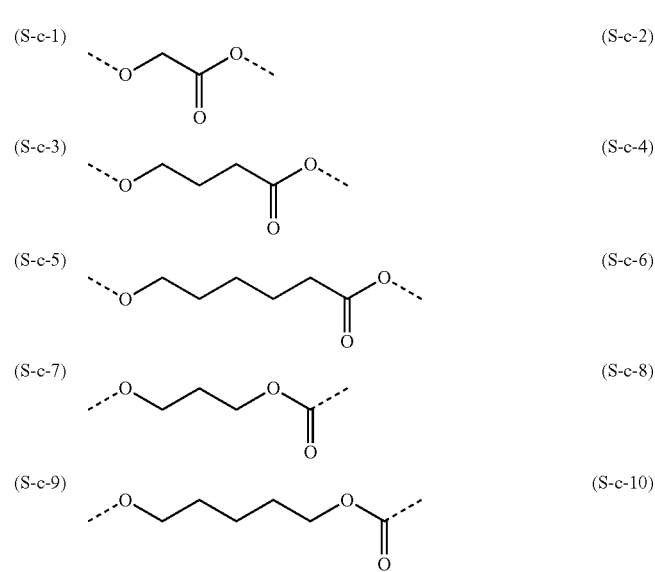

[Chem. 52]
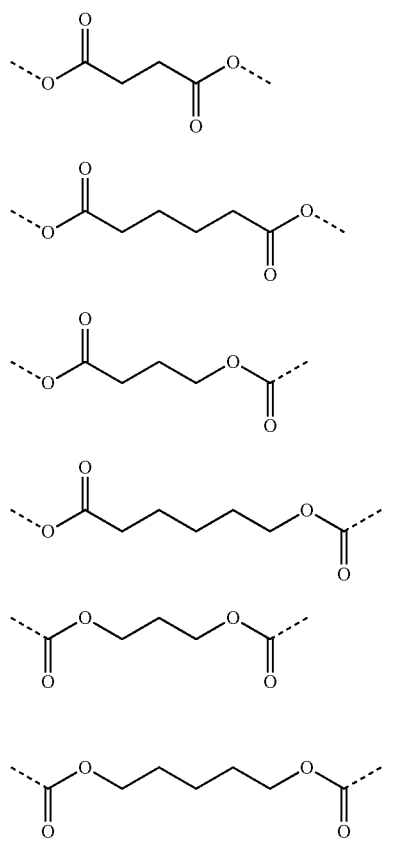
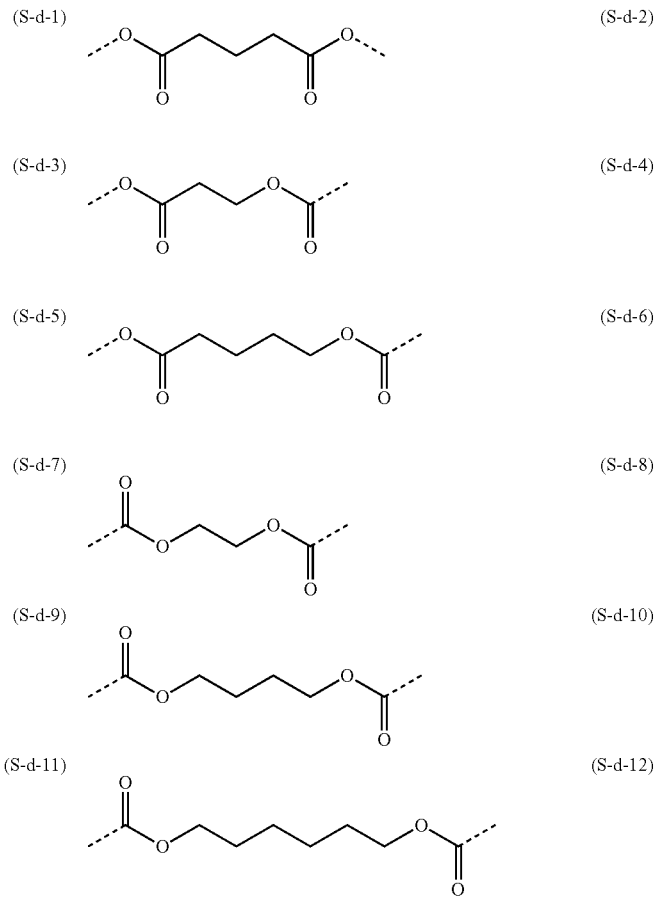
(S-d-1) (S-d-2) (S-d-3) (S-d-4) (S-d-5) (S-d-6) (S-d-7) (S-d-8) (S-d-9) (S-d-10) (S-d-11) (S-d-12)
[Chem. 53]
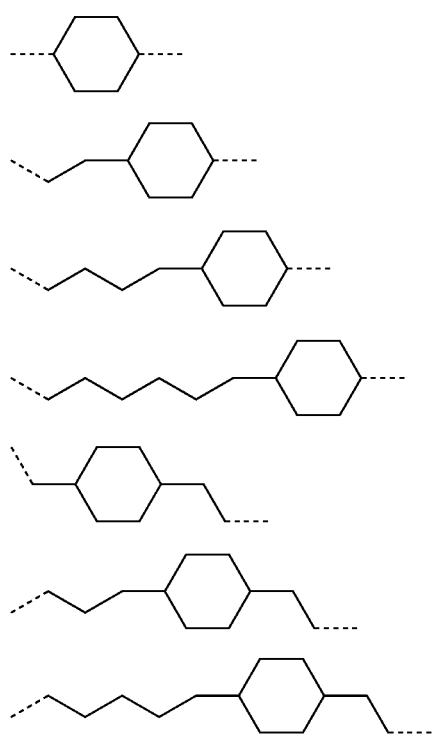
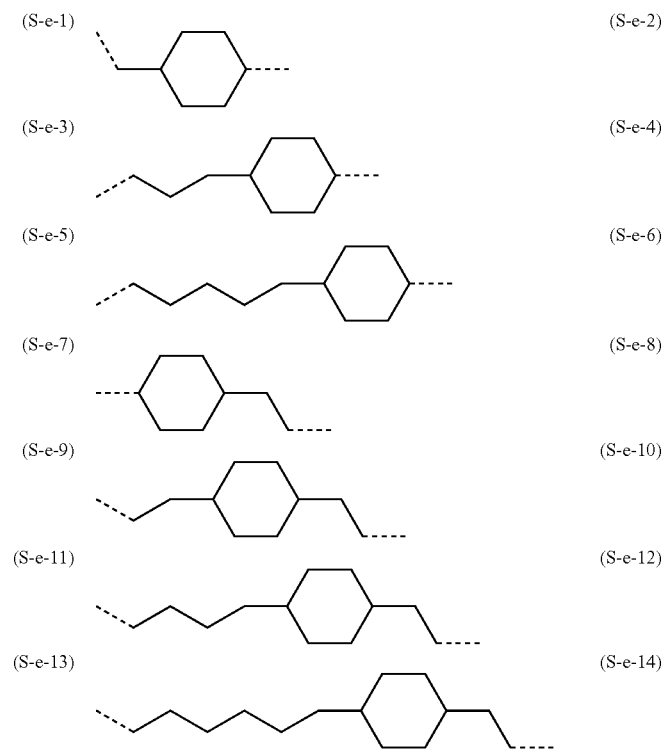
(S-e-1) (S-e-2) (S-e-3) (S-e-4) (S-e-5) (S-e-6) (S-e-7) (S-e-8) (S-e-9) (S-e-10) (S-e-11) (S-e-12) (S-e-13) (S-e-14)

[Chem. 54]
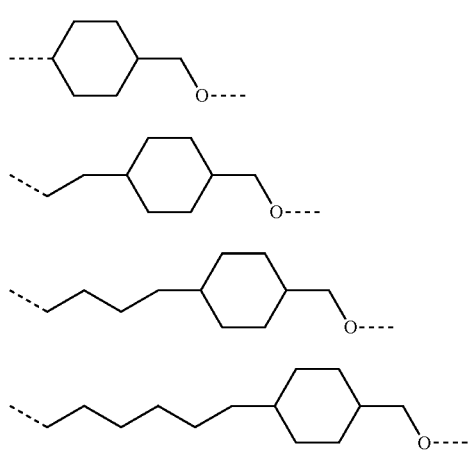
(S-f-1) (S-f-3) (S-f-5) (S-f-7)
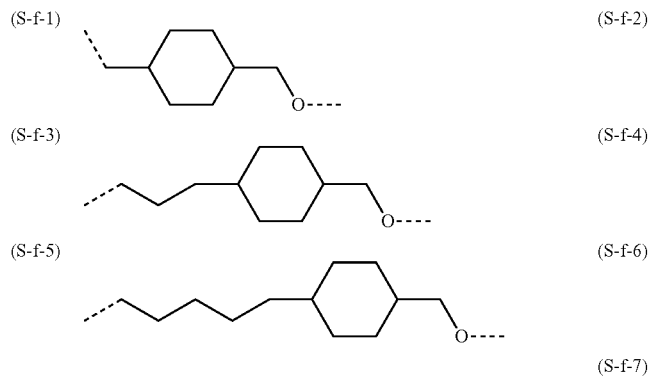
(S-f-2) (S-f-4) (S-f-6)
[Chem. 55]
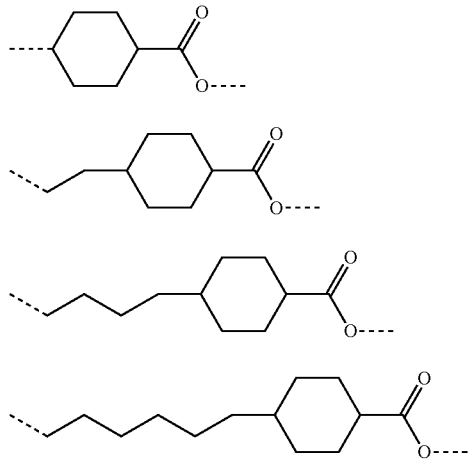
(S-g-1) (S-g-3) (S-g-5) (S-g-7)
(S-g-2) (S-g-4) (S-g-6)
[Chem. 56]
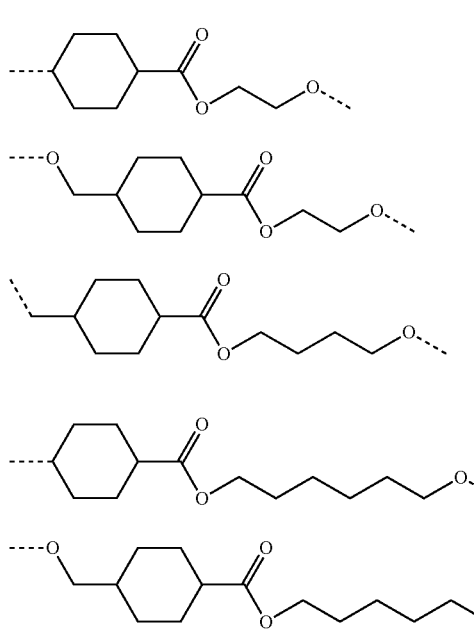
(S-h-1) (S-h-3) (S-h-5) (S-h-7) (S-h-9)
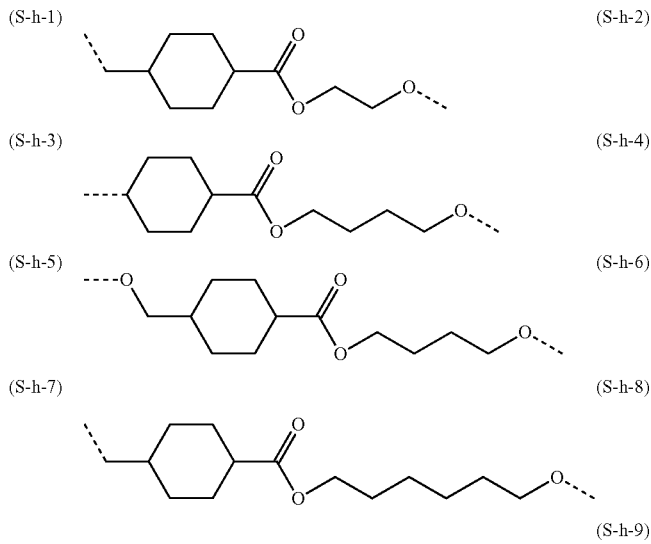
(S-h-2) (S-h-4) (S-h-6) (S-h-8)

[Chem. 57]
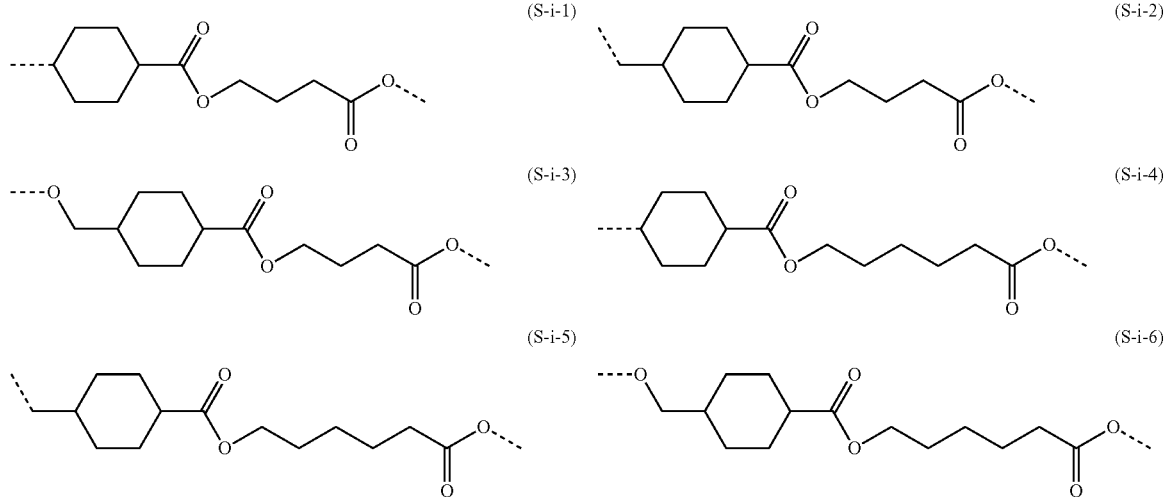
[Chem. 58]
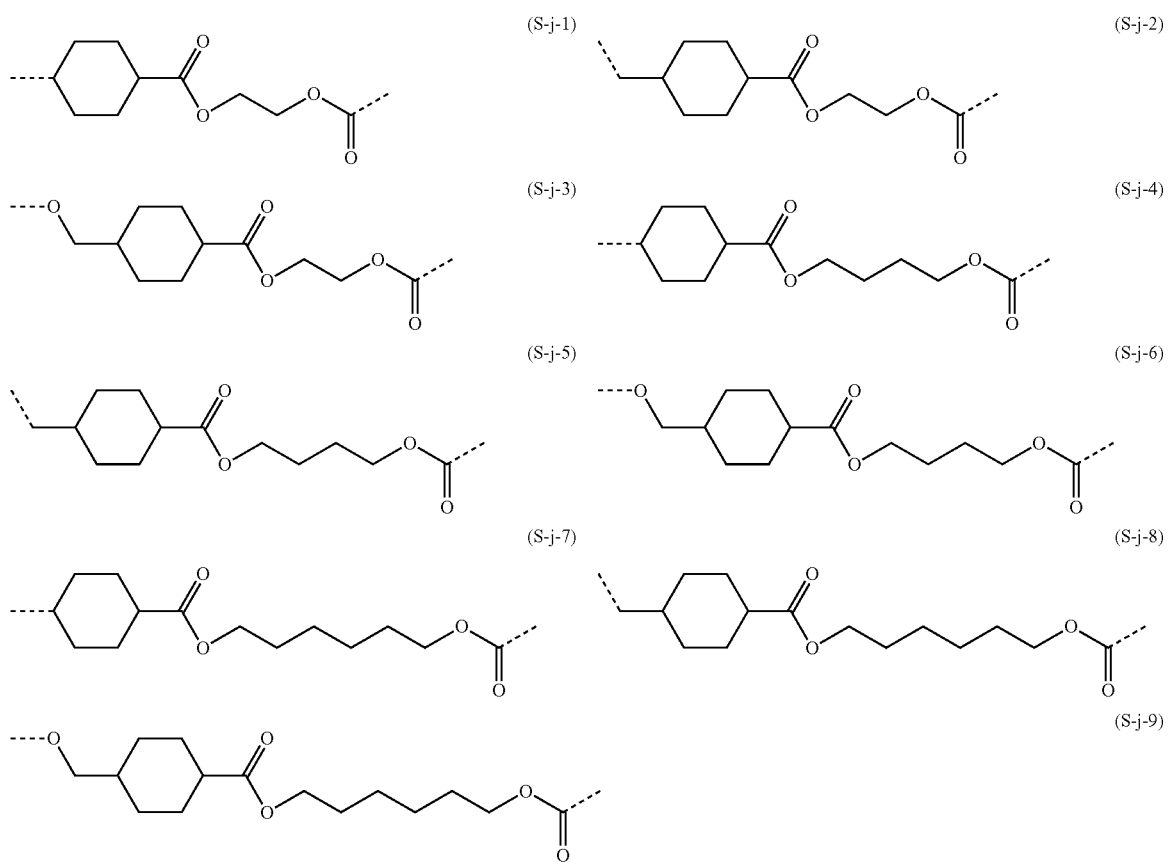
[Chem. 59]
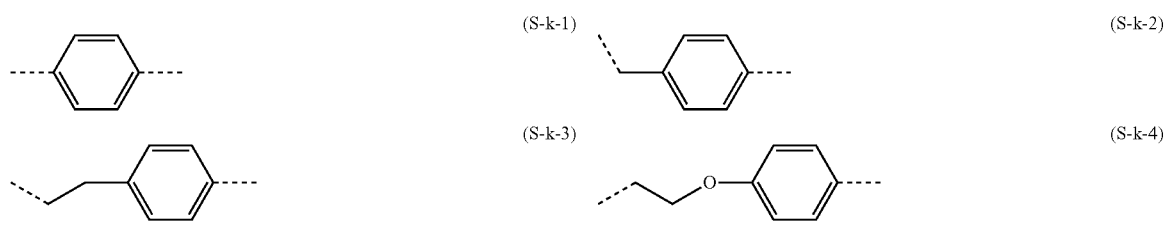

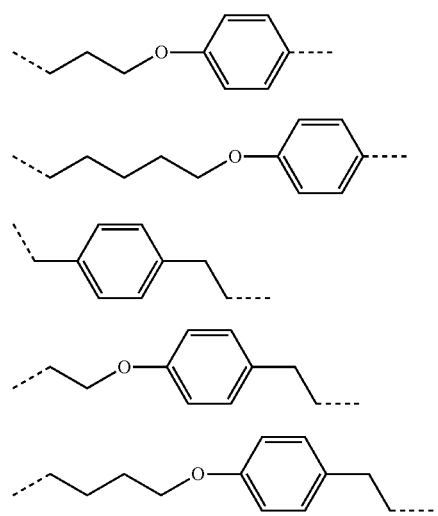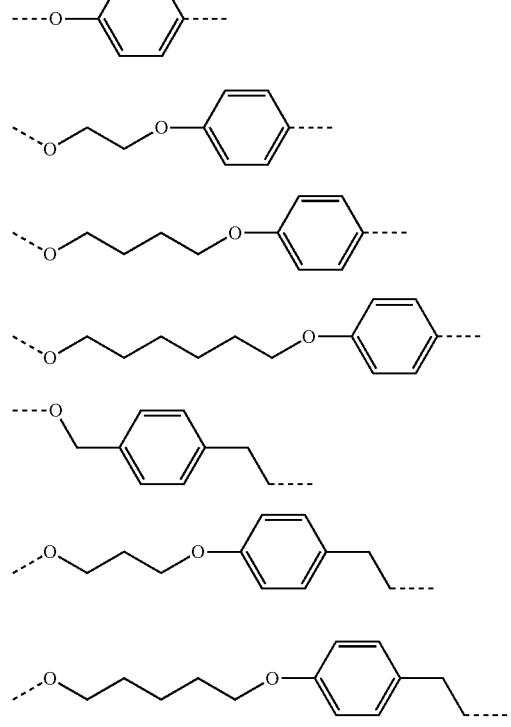

-continued
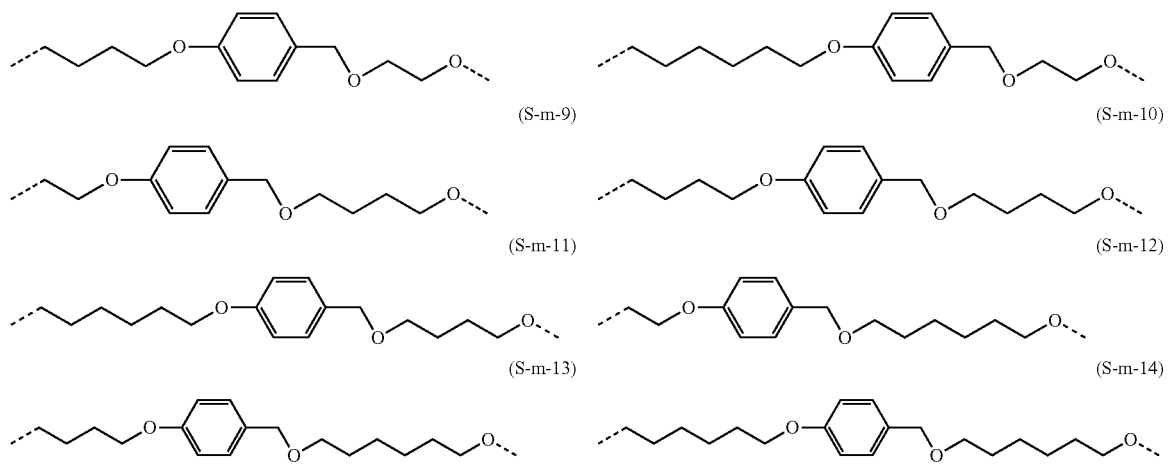
[Chem. 62]
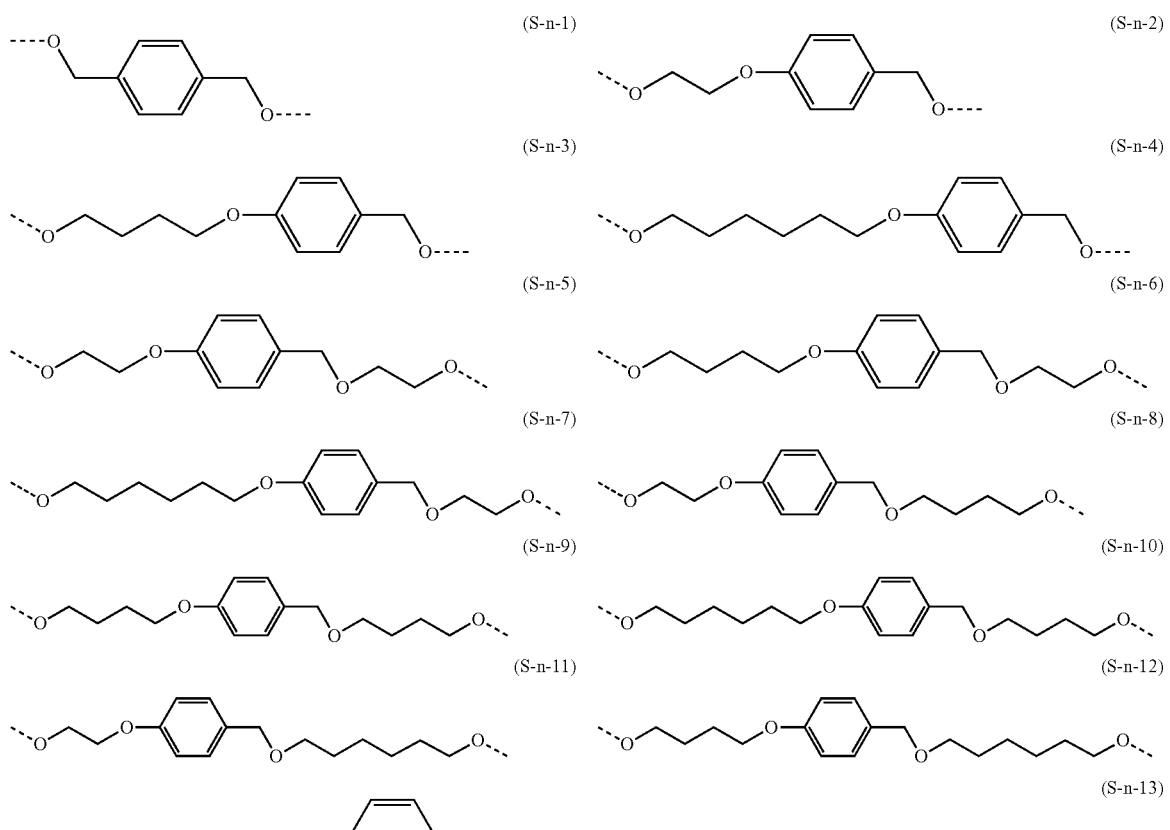
[Chem. 63]
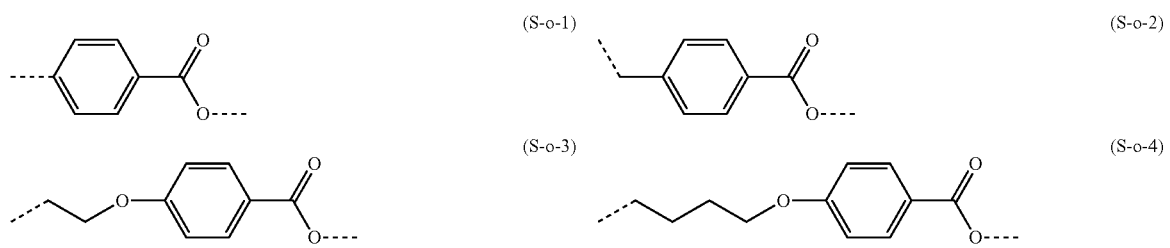

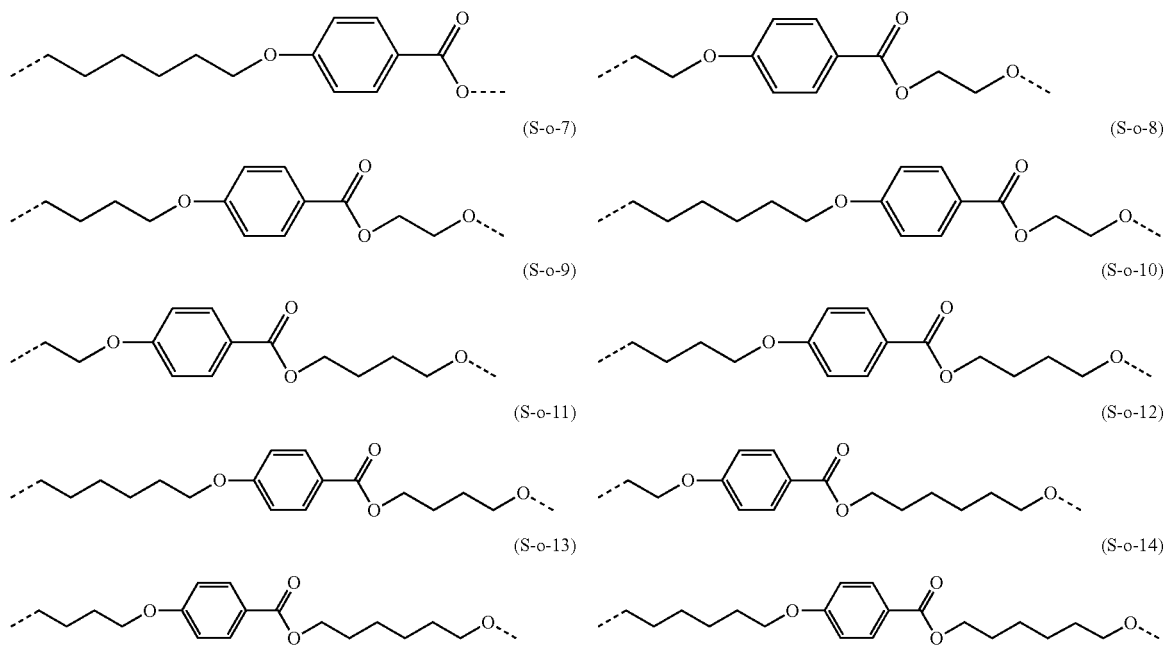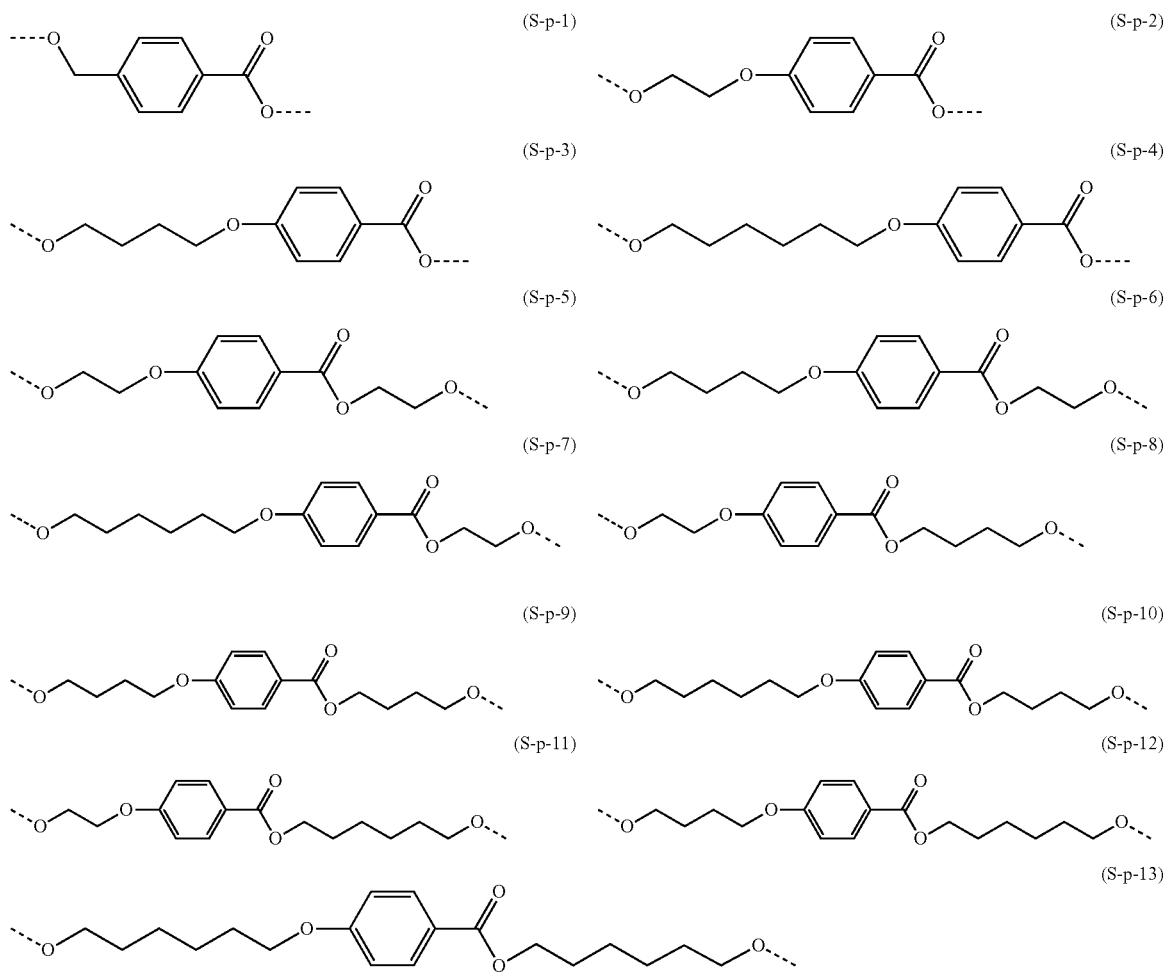

-continued
[Chem. 65]
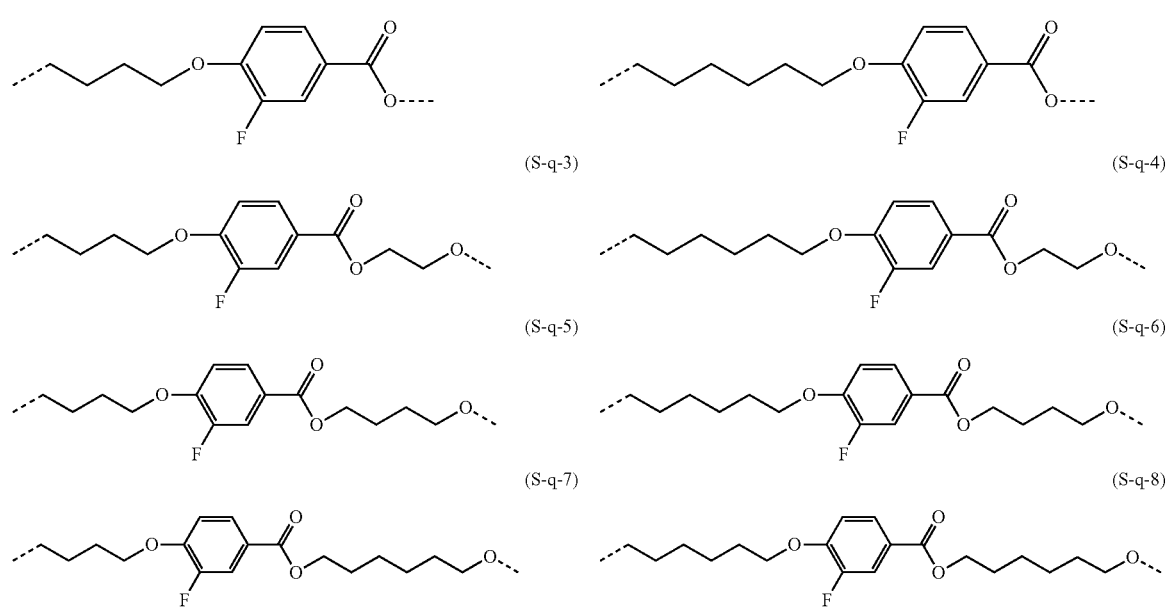
[Chem. 66]
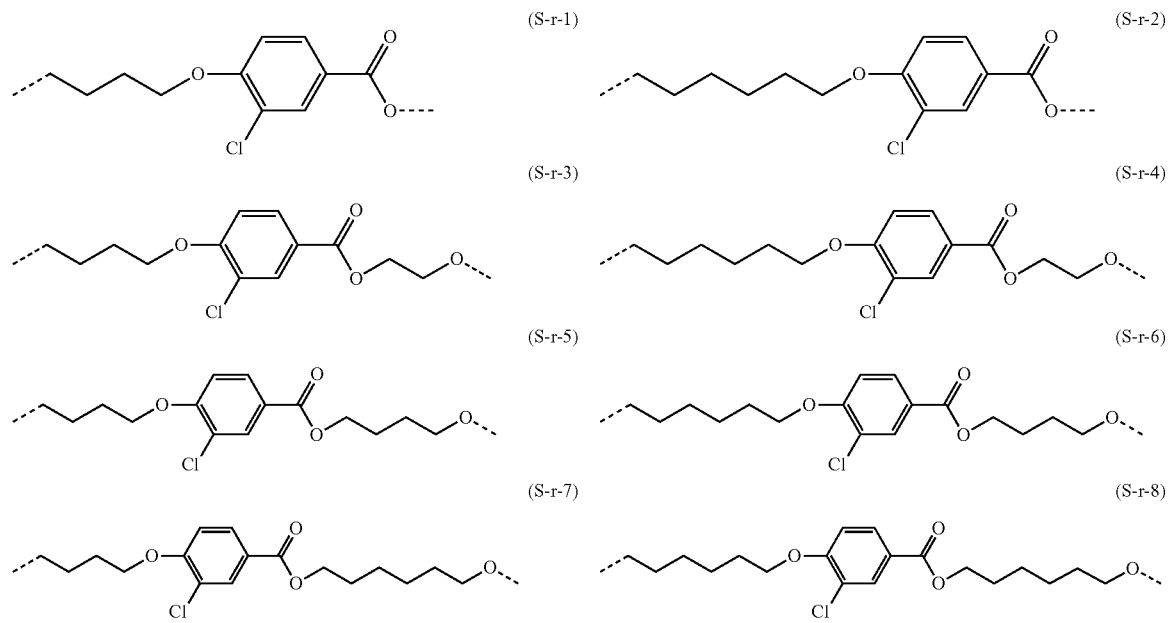
[Chem. 67]
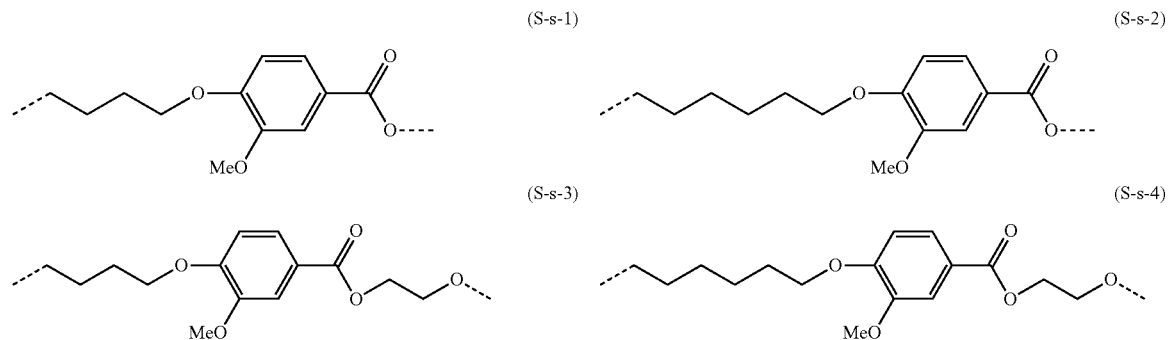

-continued
(S-s-5) 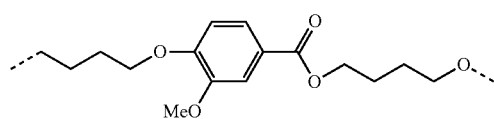
(S-s-6) 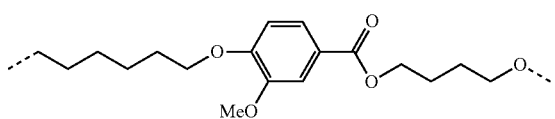
(S-s-7) 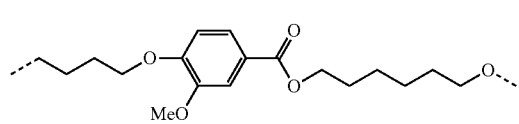
(S-s-8) 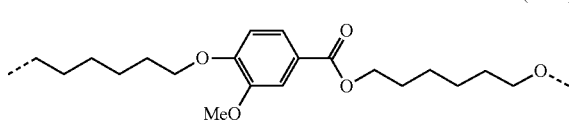
[Chem. 68]
(S-t-1) 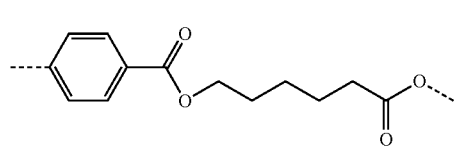
(S-t-2) 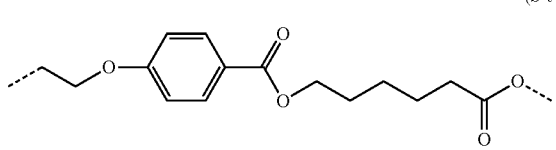
(S-t-3) 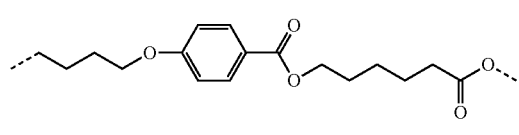
(S-t-4) 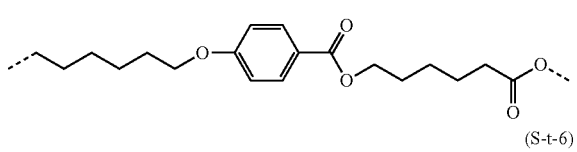
(S-t-5) 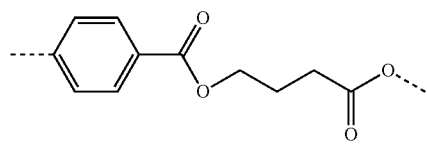
(S-t-6) 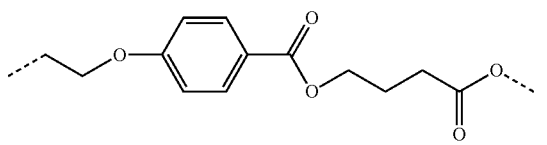
(S-t-7) 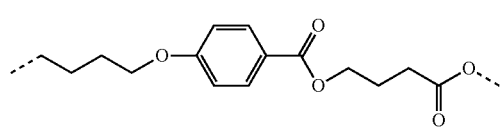
(S-t-8) 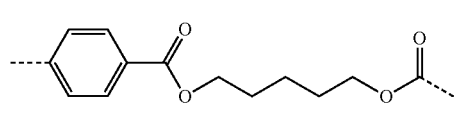
[Chem. 69]
(S-u-1) 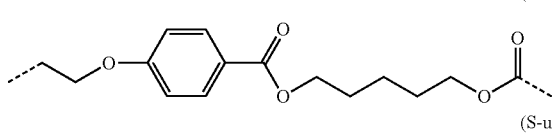
(S-u-2) 
(S-u-3) 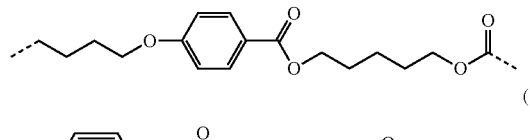
(S-u-4) 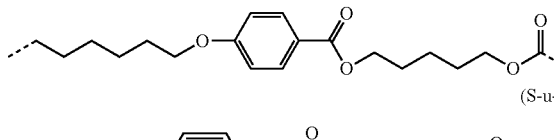
(S-u-5) 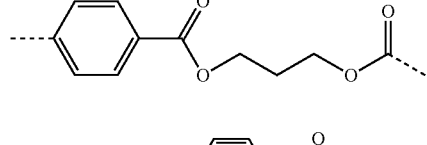
(S-u-6) 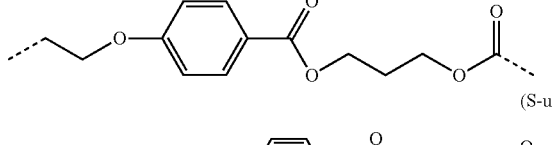
(S-u-7) 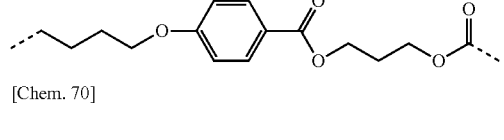
(S-u-8) 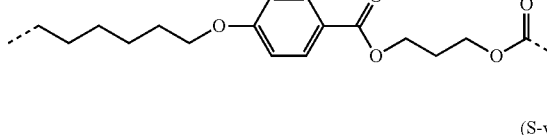
[Chem. 70]
(S-v-1) 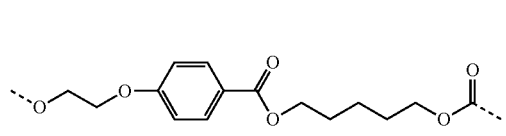
(S-v-2) 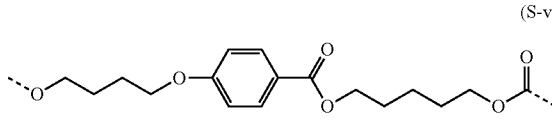

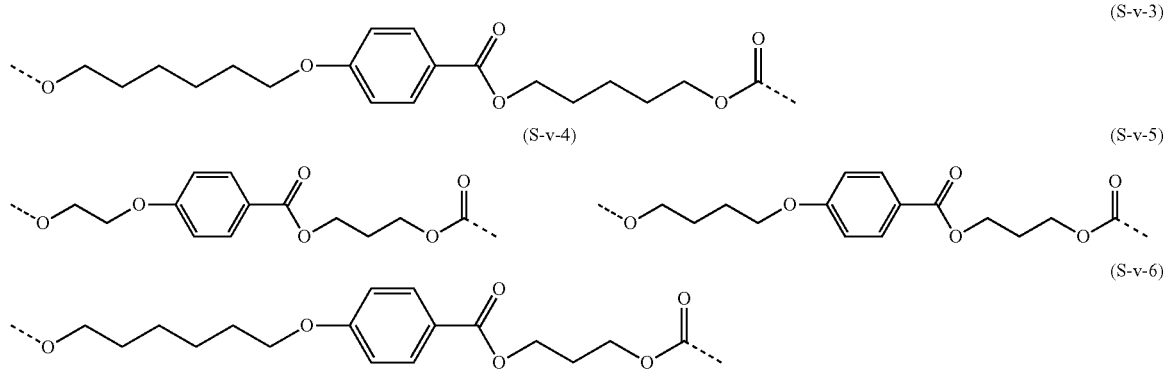
[Chem. 71]
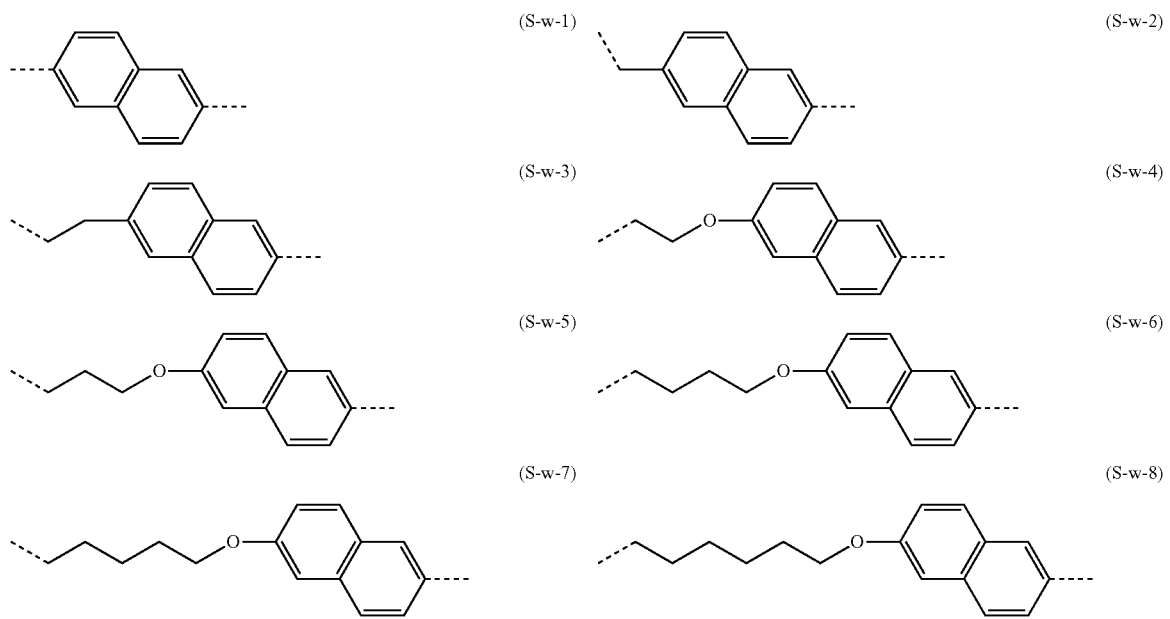
[Chem. 72]
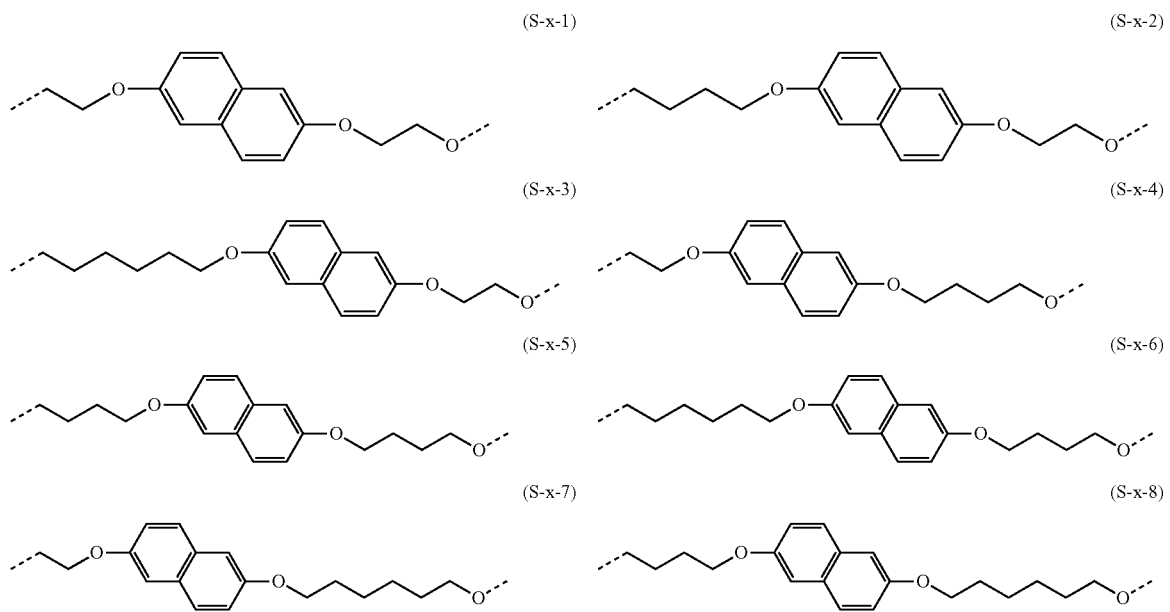

(S-x-9)
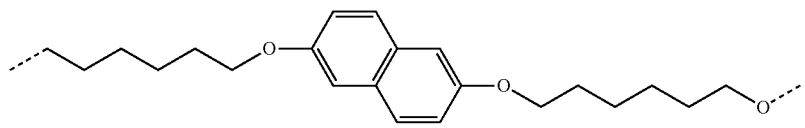
[Chem. 73]
(S-y-1) 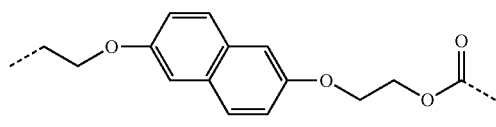  (S-y-2) 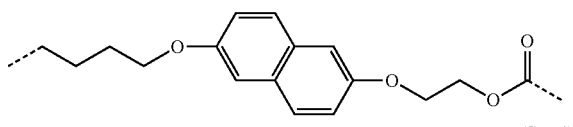
(S-y-3) 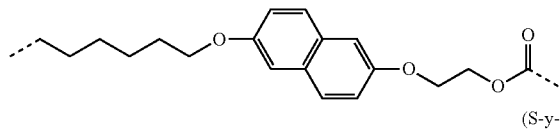  (S-y-4) 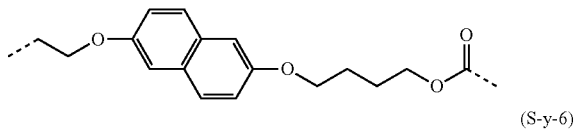
(S-y-5) 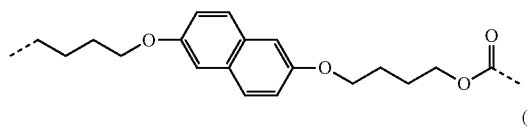  (S-y-6) 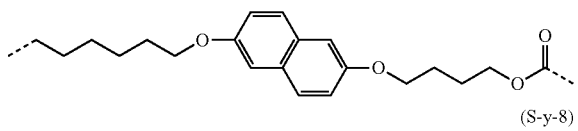
(S-y-7) 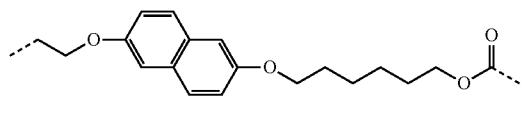
(S-y-9)
[Chem. 74]
(S-z-1) 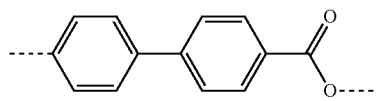  (S-z-2) 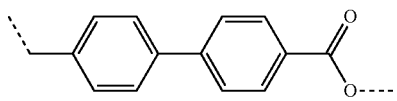
(S-z-3) 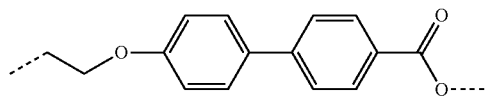  (S-z-4) 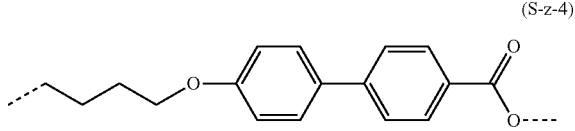
(S-z-5) 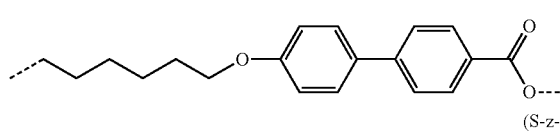
(S-z-7) 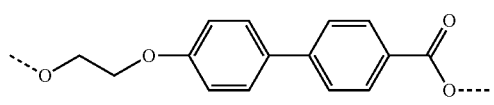  (S-z-8) 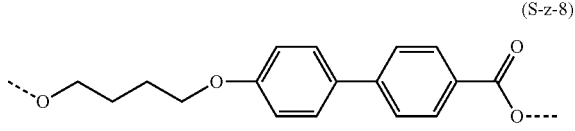
(S-z-9)
[Chem. 75]
(S-aa-1) 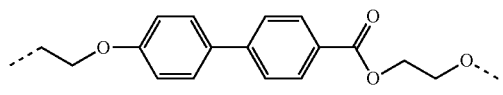  (S-aa-2) 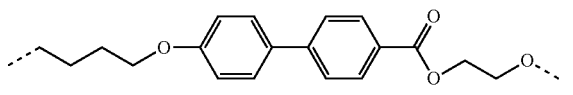

-continued
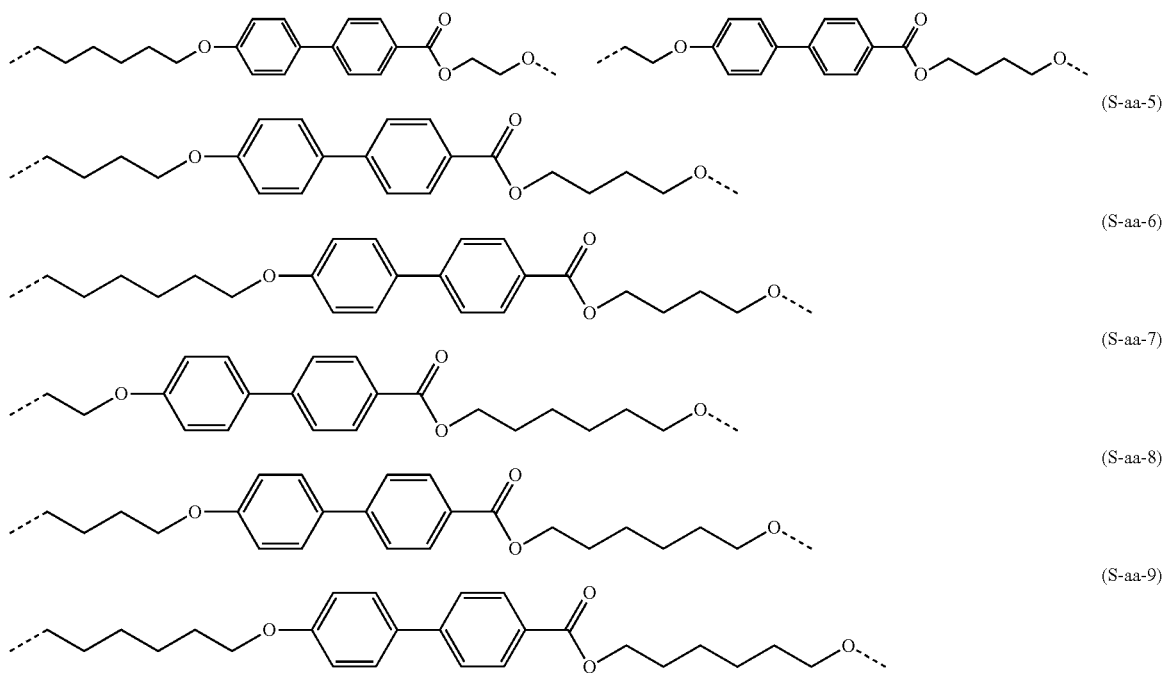
[Chem. 76]
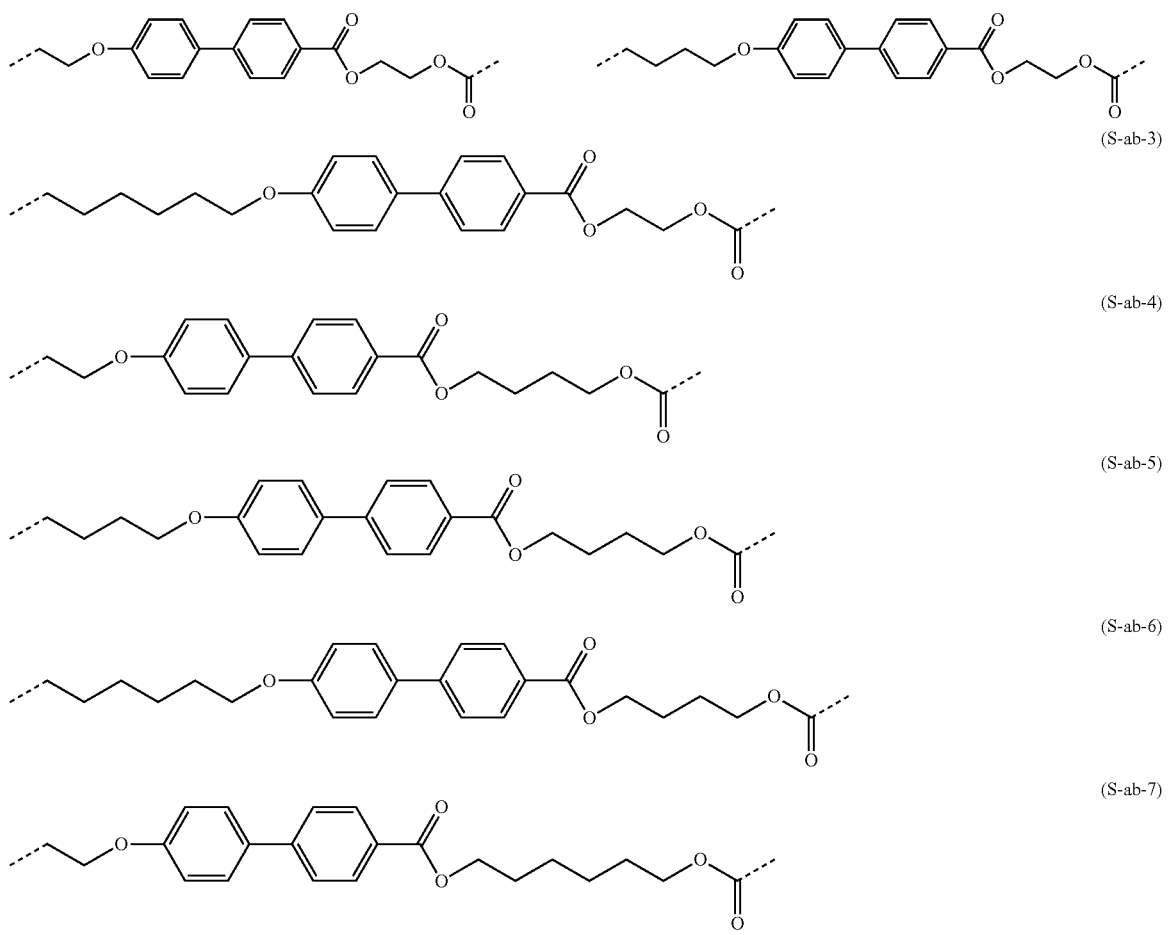

(S-ab-8)
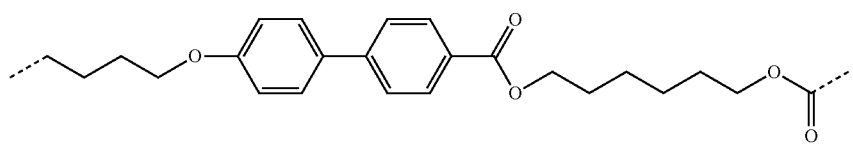
(S-ab-9)
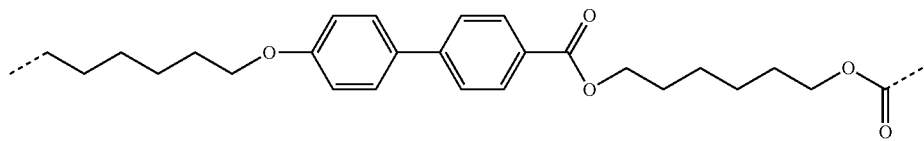
[Chem. 77]
(S-ac-1)
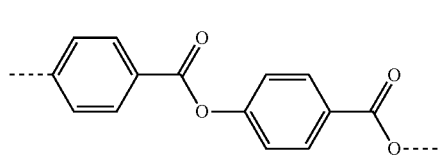
(S-ac-2)
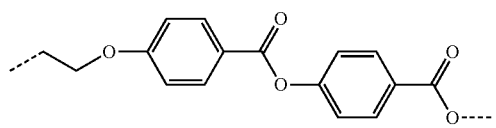
(S-ac-3)
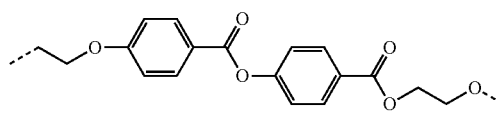
(S-ac-4)
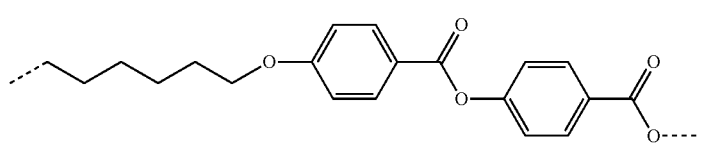
(S-ac-5)
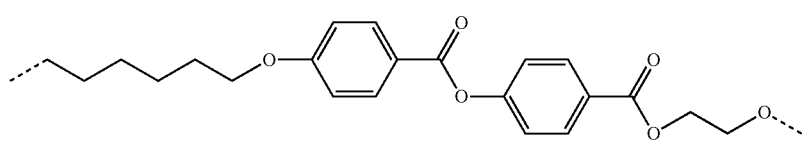
[Chem. 78]
(S-ad-1)
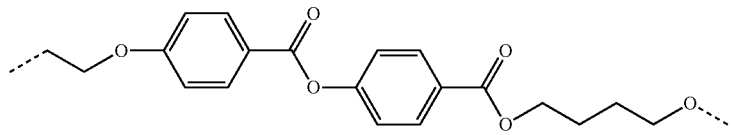
(S-ad-2)
(S-ad-3)
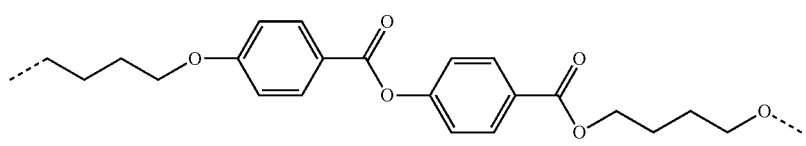
(S-ad-4)
(S-ad-5)
(S-ad-6)
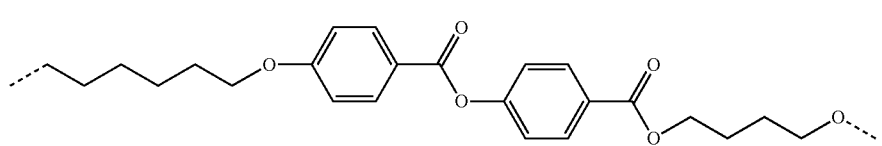

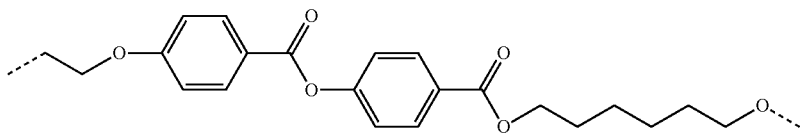

(S-ad-7)

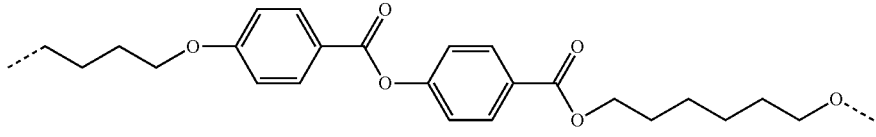

(S-ad-8)

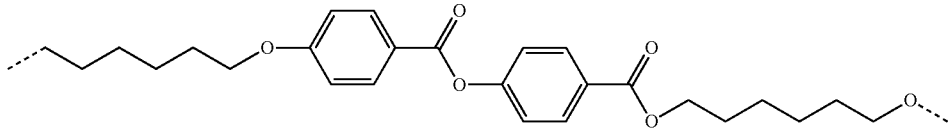

(S-ad-9)

Preferred among these are compounds represented by formulas (S-a-6) to (S-a-16), formulas (S-b-3) to (S-b-10), formulas (S-c-3) to (S-c-10), formulas (S-d-3) to (S-d-12), formulas (S-k-4) to (S-k-7), formulas (S-1-13) to (S-1-17), formulas (S-o-3) to (S-o-14), formulas (S-p-2) to (S-p-13), formulas (S-s-1) to (S-s-8), formulas (S-t-1) to (S-t-8), formulas (S-y-1) to (S-y-9), and formulas (S-aa-1) to (S-aa-9).

In general formula (Q) or (QP), $V_a$ is preferably a structure represented by general formula (VII) below.

[Chem. 79]

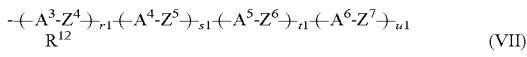

(VII)

(In the formula, the dashed line is a linkage to $S_{aa}$;

$Z^4$, $Z^5$, $Z^6$, and $Z^7$ are each independently a single bond, —$(CH_2)_u$— (where u is 1 to 20), —$OCH_2$—, —$CH_2O$—, —COO—, —OCO—, —CH=CH—, —CF=CF—, —$CF_2O$—, —$OCF_2$—, —$CF_2CF_2$—, or —C≡C—, where one or more non-adjacent $CH_2$ groups in these substituents are independently optionally replaced with —O—, —CO—, —CO—O—, —O—CO—, —$Si(CH_3)_2$—O—$Si(CH_3)_2$—, —NR—, —NR—CO—, —CO—NR—, —NR—CO—O—, —O—CO—NR—, —NR—CO—NR—, —CH=CH—, —C≡C—, or —O—CO—O— (where R is independently hydrogen or an alkyl group of 1 to 5 carbon atoms);

$A^3$, $A^4$, $A^5$, and $A^6$ are each independently a group selected from the group consisting of:

(a) a trans-1,4-cyclohexylene group (where one or more non-adjacent methylene groups present in this group are optionally replaced with —O—, —NH—, or —S—), (b) a 1,4-phenylene group (where one or more —CH= groups present in this group are optionally replaced with —N=), and (c) 1,4-cyclohexenylene, 2,5-thiophenylene, 2,5-furanylene, 1,4-bicyclo(2.2.2)octylene, naphthalene-1, 4-diyl, naphthalene-2,6-diyl, decahydronaphthalene-2,6-diyl, and 1,2,3,4-tetrahydronaphthalene-2,6-diyl groups, where groups (a), (b), and (c) may each be unsubstituted or have one or more hydrogen atoms replaced with a fluorine atom, a chlorine atom, a cyano group, a methyl group, or a methoxy group;

r1, s1, t1, and u1 are each independently 0 or 1; and $R^{12}$ is hydrogen, fluorine, chlorine, a cyano group, or an alkyl group of 1 to 20 carbon atoms, where any hydrogen atom in the alkyl group is optionally replaced with a fluorine atom, and one or more non-adjacent $CH_2$ groups in the alkyl group are optionally replaced with —O—, —CO—O—, —O—CO—, and/or —CH=CH.)

Preferably, in general formula (VII), the dashed line is a linkage to $S_{aa}$;

$Z^4$, $Z^5$, $Z^6$, and $Z^7$ are each independently a single bond, —$(CH_2)_u$—, —$OCH_2$—, —$CH_2O$—, —COO—, —OCO—, —CH=CH—, —CF=CF—, —$CF_2O$—, —$OCF_2$—, —$CF_2CF_2$—, or —C≡C—, where u is 1 to 20, and one or more non-adjacent $CH_2$ groups in the alkyl group are independently optionally replaced with Q, where Q is —O—, —CO—, —CO—O—, —O—CO—, —$Si(CH_3)_2$—O—$Si(CH_3)_2$—, —NR—, —NR—CO—, —CO—NR—, —NR—CO—O—, —O—CO—NR—, —NR—CO—NR—, —CH=CH—, —C≡C—, or —O—CO—O—, where R is independently a hydrogen atom or an alkyl group of 1 to 5 carbon atoms;

$A^3$, $A^4$, $A^5$, and $A^6$ are each independently a trans-1,4-cyclohexylene, trans-1,3-dioxane-2,5-yl, 1,4-naphthylene, 2,6-naphthylene, 2,5-pyridyl, 2,5-pyrimidyl, 2,5-thiophenylene, 2,5-furanylene, or 1,4-phenylene group that may be unsubstituted or have one or more hydrogen atoms replaced with a fluorine atom, a chlorine atom, a methyl group, or a methoxy group;

r1, s1, t1, and u1 are 0 or 1; and $R^{12}$ is hydrogen, fluorine, chlorine, a cyano group, or an alkyl group of 1 to 20 carbon atoms (which may be substituted with fluorine and may have one or more non-adjacent $CH_2$ groups replaced with —O—, —CO—O—, —O—CO—, and/or —CH=CH—).

$Z^4$, $Z^5$, $Z^6$, and $Z^7$ are preferably each independently a single bond, —$(CH_2)_u$— (where u is 1 to 12, and one or more non-adjacent $CH_2$ groups are independently optionally replaced with —O—, —CO—, —CO—O—, —O—CO—, —NR—CO—, —CO—NR—, —NR—CO—NR—, —CH=CH—, —C≡C—, or —O—CO—O—, where R is independently hydrogen, a methyl group, or an ethyl group), —$OCH_2$—, —$CH_2O$—, —COO—, —OCO—, —CH=CH—, —$CF_2O$—, —$OCF_2$—, or —C≡C—. $A^3$, $A^4$, $A^5$, and $A^E$ are preferably each independently a trans-1,4-cyclohexylene, 2,6-naphthylene, pyridine-2,5-diyl, pyrimidine-2,5-diyl, or 1,4-phenylene group that is unsubstituted or has one or more hydrogen atoms replaced with a fluorine atom, a chlorine atom, a methyl group, or a methoxy group.

r1, s1, t1, and u1 preferably satisfy r1+s1+t+u=0 to 3. $R^2$ is preferably a structure represented by hydrogen, fluorine, chlorine, a cyano group, or an alkyl group of 1 to 18 carbon atoms (where one or more non-adjacent $CH_2$ groups in the alkyl group are optionally replaced with —O—, —CO—O—, —O—CO—, and/or —CH=CH—).

To improve the liquid crystal alignment properties, it is preferred that $Z^4$, $Z^5$, $Z^6$, and $Z^7$ be each independently a single bond, —$(CH_2)_u$— (where u is 1 to 8, and one or two non-adjacent $CH_2$ groups are independently optionally replaced with —O—, —CO—O—, —O—CO—, —Si$(CH_3)_2$—O—Si$(CH_3)_2$—, —CH=CH—, or —C≡C—), —COO—, —OCO—, —CH=CH—, —CF=CF—, or —C≡C—. It is also preferred that $A^3$, $A^4$, $A^5$, and $A^6$ be each independently a trans-1,4-cyclohexylene, trans-1,3-dioxane-2,5-diyl, pyridine-2,5-diyl, pyrimidine-2,5-diyl, 2,5-thiophenylene, or 1,4-phenylene group.

To improve the thermal stability of alignment, it is preferred that $Z^4$, $Z^5$, $Z^6$, and $Z^7$ be each independently —NR—CO—, —CO—NR—, —NR—CO—O—, —O—CO—NR—, —NR—CO—NR—, or —O—CO—O—. It is also preferred that $A^3$, $A^4$, $A^5$, and $A^6$ be each independently a 1,4-naphthylene, 2,6-naphthylene, pyridine-2,5-diyl, pyrimidine-2,5-diyl, 2,5-thiophenylene, 2,5-furanylene, or 1,4-phenylene group. To improve the solubility of the polymer, it is preferred that $Z^4$, $Z^5$, $Z^6$, and $Z^7$ be each independently —$OCH_2$—, —$CH_2O$—, —$CF_2O$—, —$OCF_2$—, —$CF_2CF_2$—, —NR—, or —CO—. It is also preferred that $A^3$, $A^4$, $A^5$, and $A^6$ be each independently a trans-1,4-cyclohexylene, 1,4-naphthylene, 2,6-naphthylene, or 2,5-furanylene group.

To achieve a pretilt angle of 80° or more, it is preferred that $Z^4$, $Z^5$, $Z^6$, and $Z^7$ be each independently a single bond, —$OCH_2$—, —$CH_2O$—, —COO—, —OCO—, or —C≡C—. It is also preferred that $A^3$, $A^4$, $A^5$, and $A^6$ be each independently a trans-1,4-cyclohexylene, trans-1,3-dioxane-2,5-diyl, or 1,4-phenylene group and that $R^{12}$ be an alkyl group of 1 to 10 carbon atoms, an alkoxy group, fluorine, a trifluoromethyl group, or a trifluoromethoxy group.

Although general formula (VII) encompasses numerous compounds, specific preferred compounds include those represented by formulas (VII-a-1) to (VII-q-10) below.

[Chem. 80]

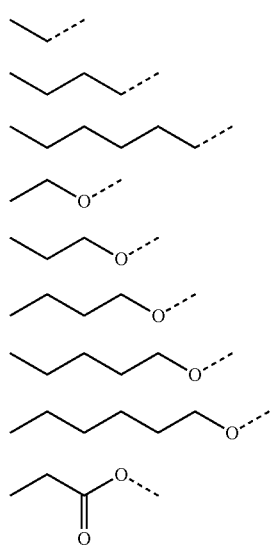

(VII-a-1)
(VII-a-2)
(VII-a-3)
(VII-a-4)
(VII-a-5)
(VII-a-6)
(VII-a-7)
(VII-a-8)
(VII-a-9)

-continued

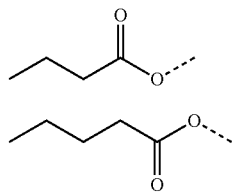

(VII-a-10)
(VII-a-11)

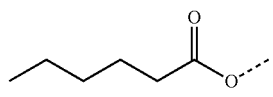

(VII-a-12)

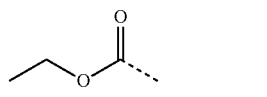

(VII-a-13)

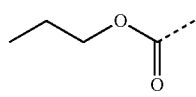

(VII-a-13)

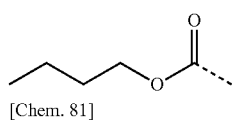

(VII-a-14)

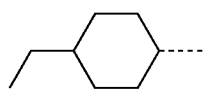

[Chem. 81]

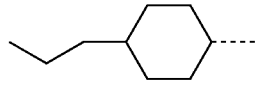

(VII-b-1)

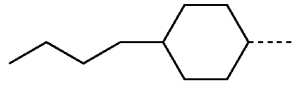

(VII-b-2)

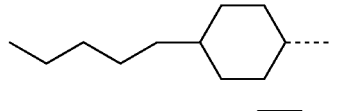

(VII-b-3)

(VII-b-4)

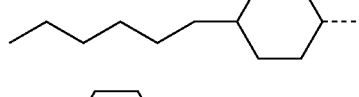

(VII-b-5)

(VII-b-6)

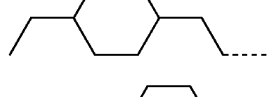

(VII-b-7)

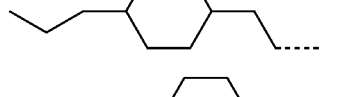

(VII-b-8)

(VII-b-9)

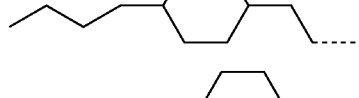

(VII-b-10)

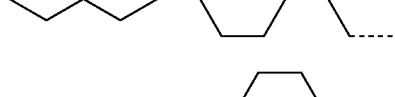

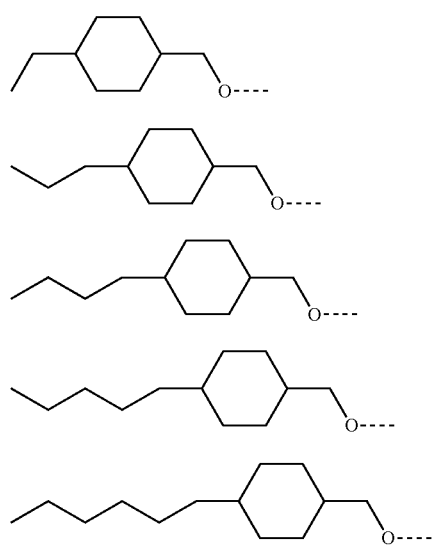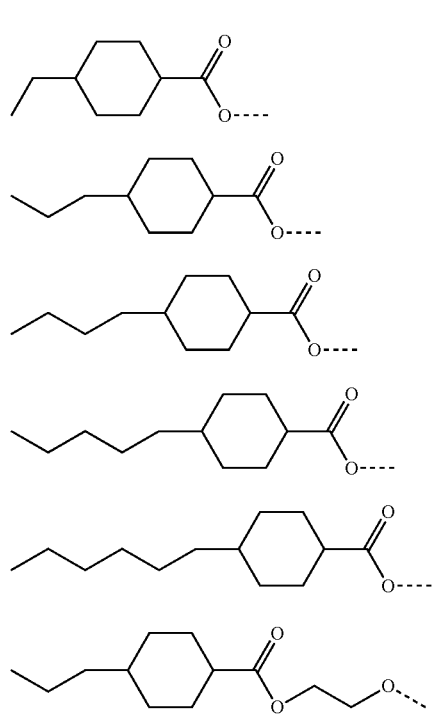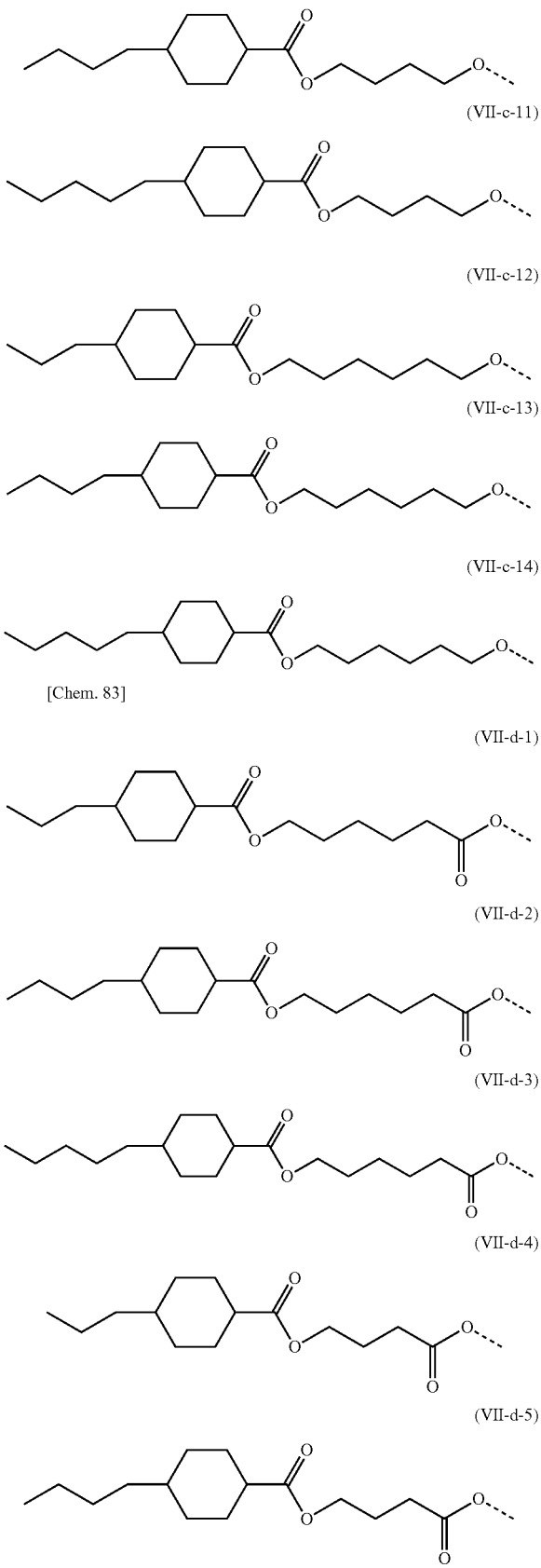

-continued
(VII-d-6)
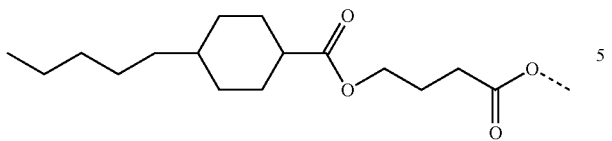
(VII-d-7)
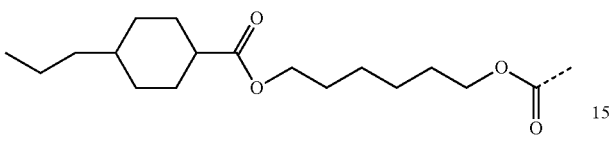
(VII-d-8)
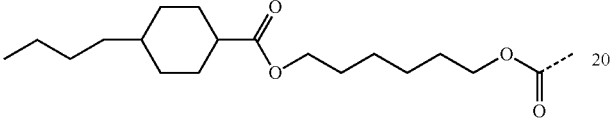
(VII-d-9)
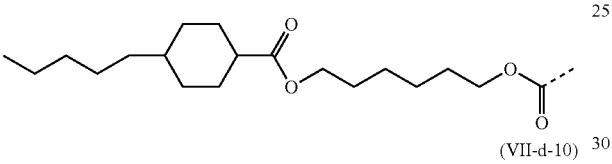
(VII-d-10)
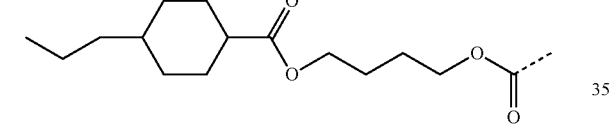
(VII-d-11)
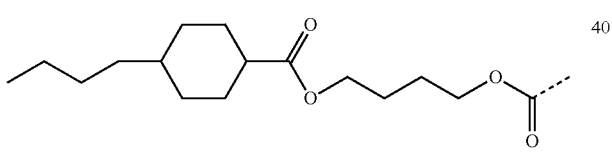
(VII-d-12)
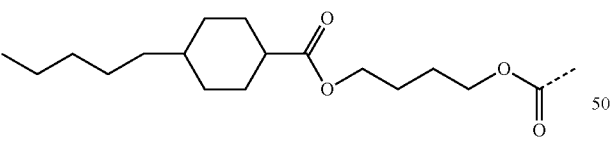
(VII-d-13)
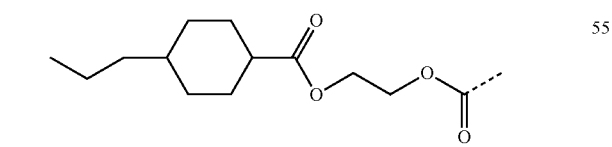
(VII-d-14)
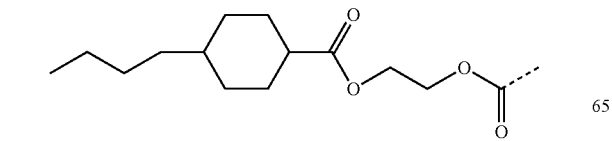
-continued
(VII-d-15)
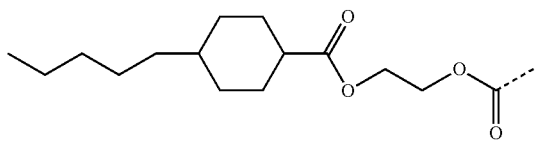
[Chem. 84]
(VII-e-1)
(VII-e-2)
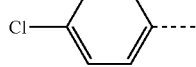
(VII-e-3)
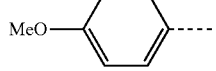
(VII-e-4)
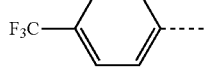
(VII-e-5)
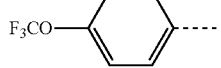
(VII-e-6)
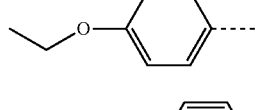
(VII-e-7)
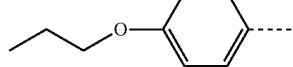
(VII-e-8)
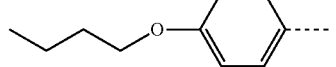
(VII-e-9)
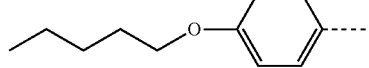
[Chem. 85]
(VII-f-1)
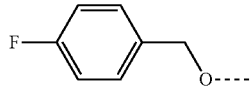
(VII-f-2)
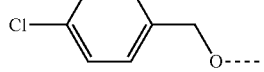
(VII-f-3)
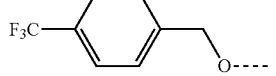
(VII-f-4)
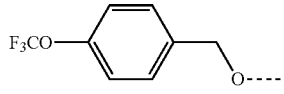

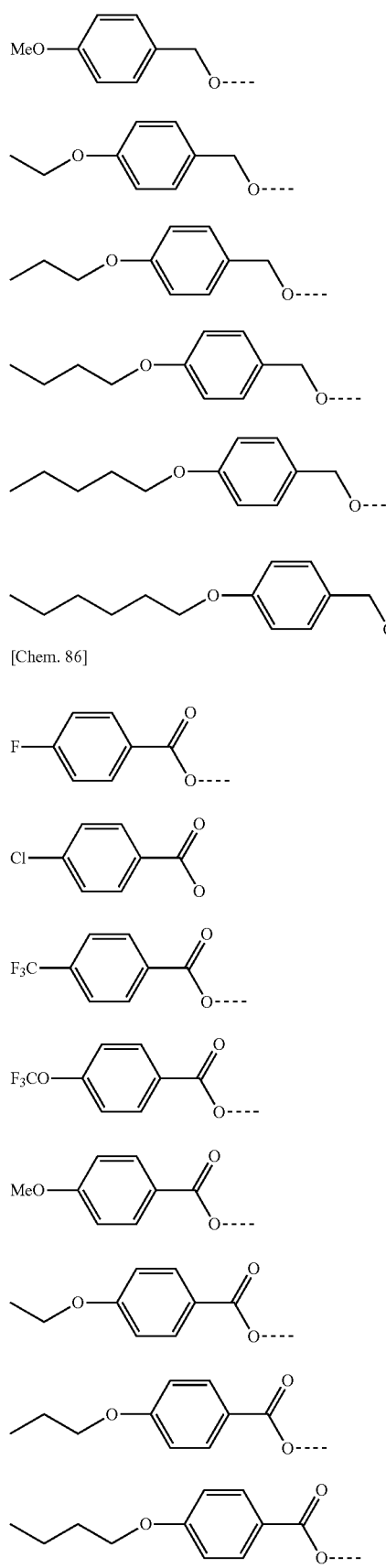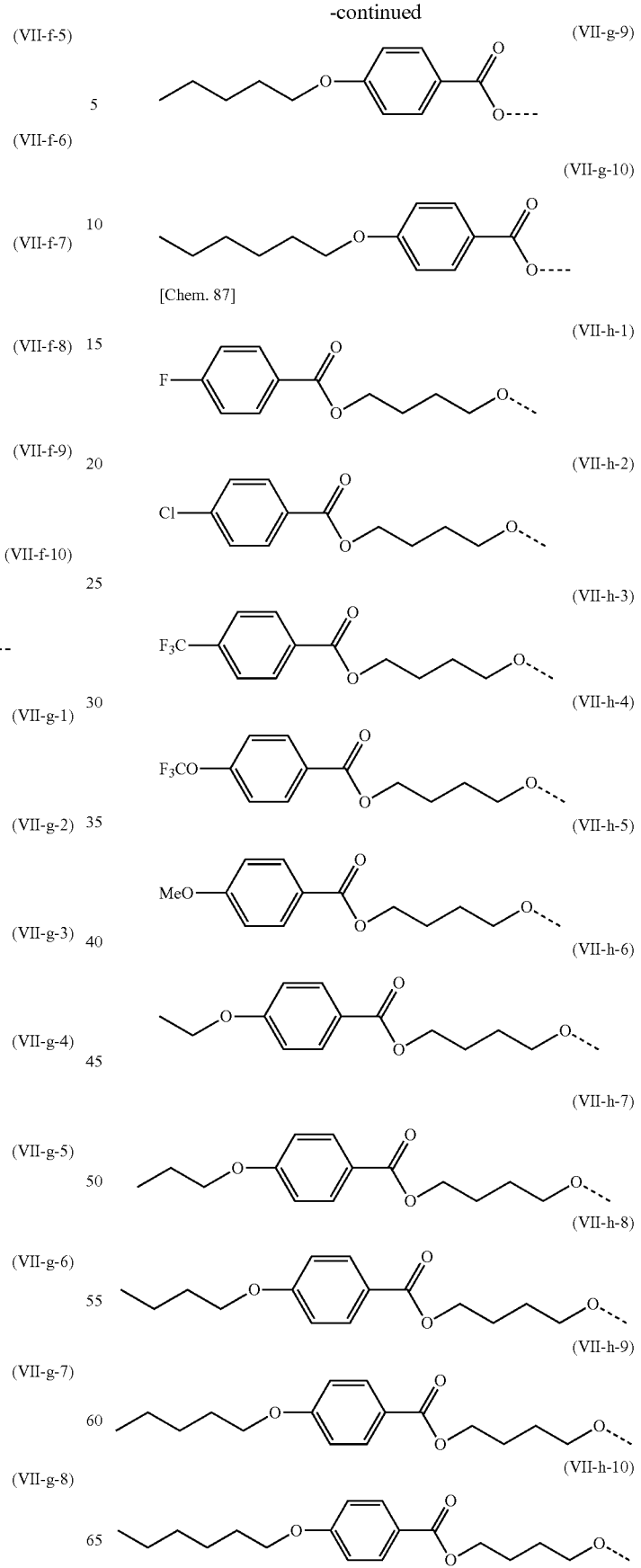

[Chem. 88]
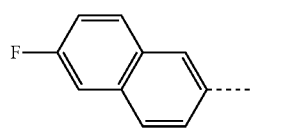 (VII-i-1)
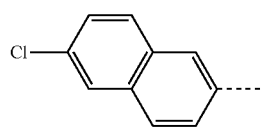 (VII-i-2)
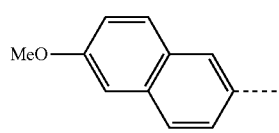 (VII-i-3)
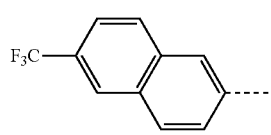 (VII-i-4)
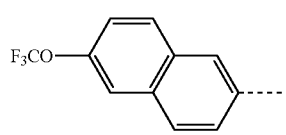 (VII-i-5)
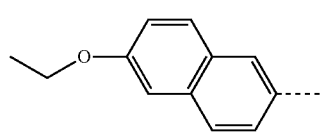 (VII-i-6)
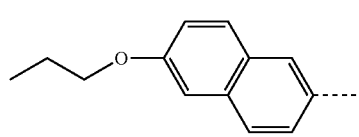 (VII-i-7)
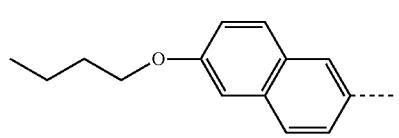 (VII-i-8)
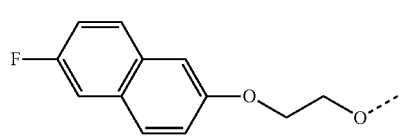 (VII-i-9)
[Chem. 89]
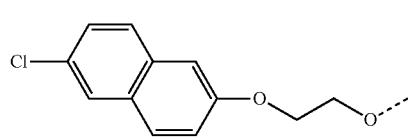 (VII-j-1)
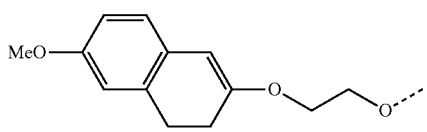 (VII-j-2)
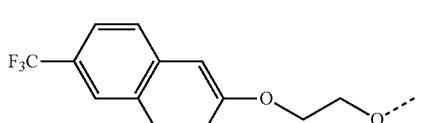 (VII-j-3)
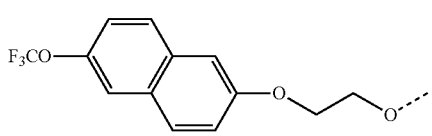 (VII-j-4)
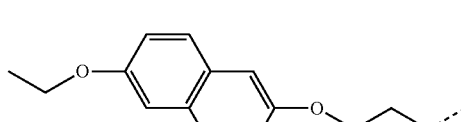 (VII-j-5)
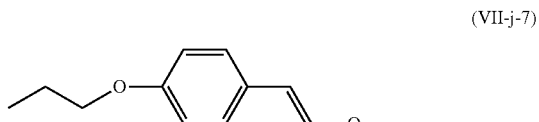 (VII-j-6)
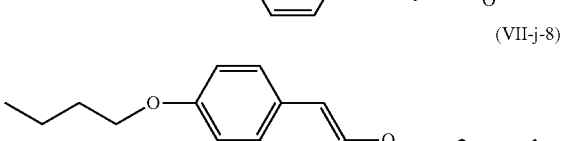 (VII-j-7)
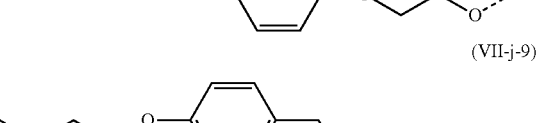 (VII-j-8)
 (VII-j-9)
[Chem. 90]
 (VII-k-1)
(VII-k-2)
(VII-k-3)
 (VII-k-4)
(VII-k-5)

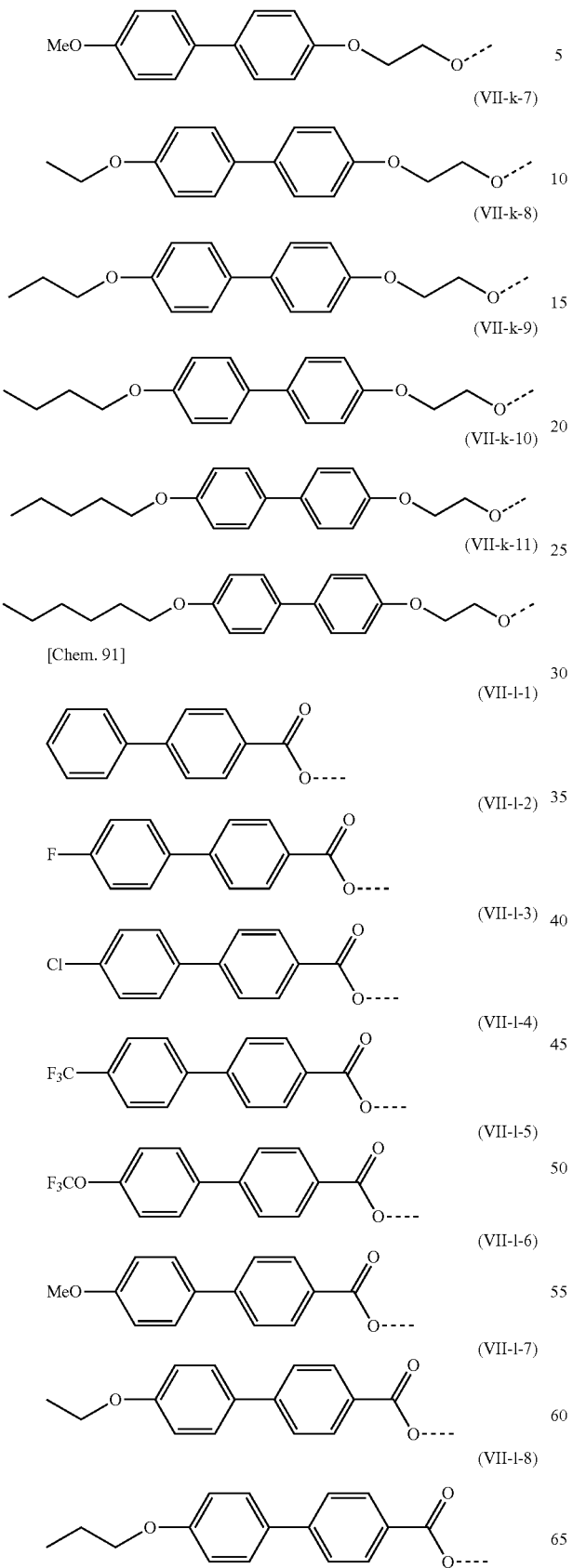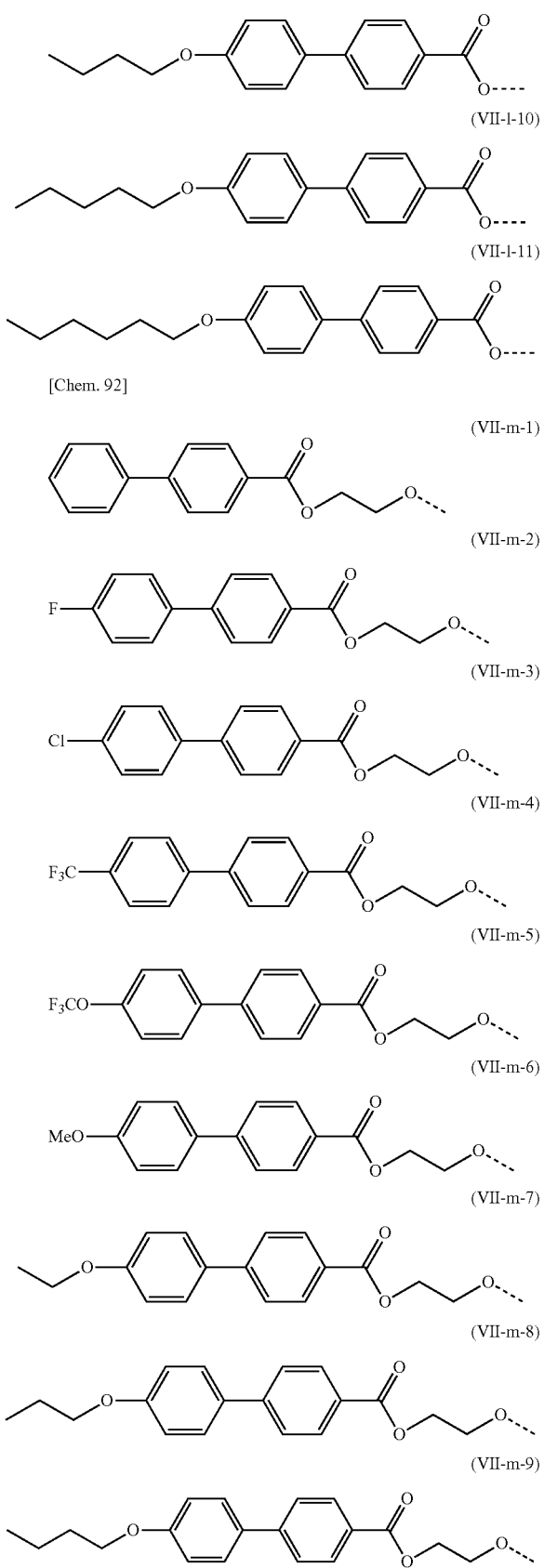

(VII-m-10)
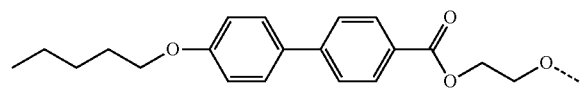
(VII-m-11)
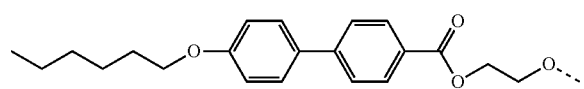
[Chem. 93]
(VII-n-1)
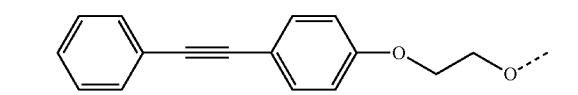
(VII-n-2)
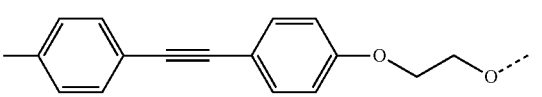
(VII-n-3)
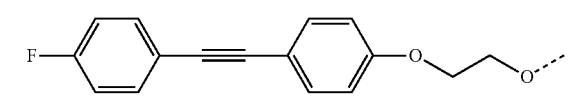
(VII-n-4)
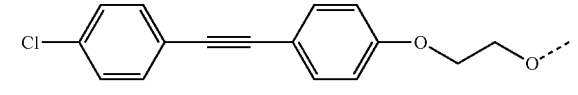
(VII-n-5)
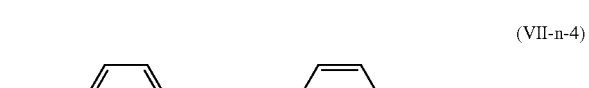
(VII-n-6)
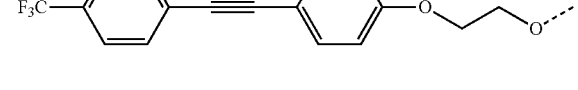
(VII-n-7)
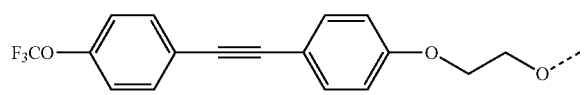
(VII-n-8)
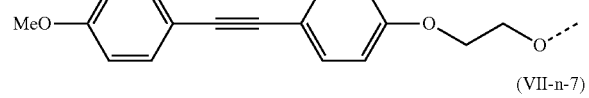
(VII-n-9)
(VII-n-10)
(VII-n-11)
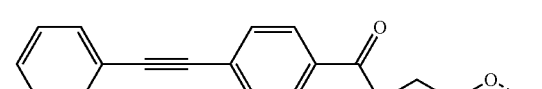
[Chem. 94]
(VII-o-1)
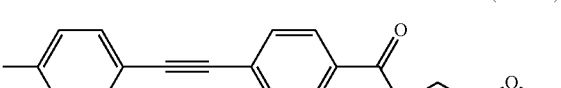
(VII-o-2)
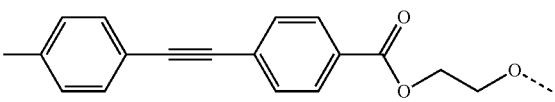
(VII-o-3)
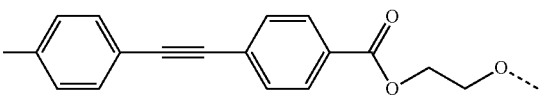
(VII-o-4)
(VII-o-5)
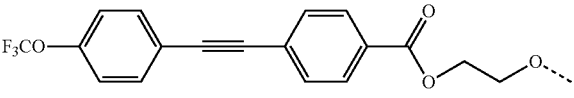
(VII-o-6)
(VII-o-7)
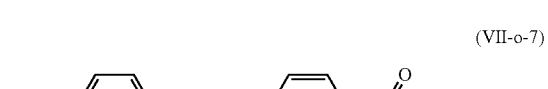
(VII-o-8)
(VII-o-9)
(VII-o-10)
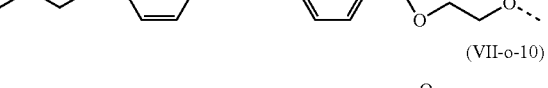

(VII-o-11)
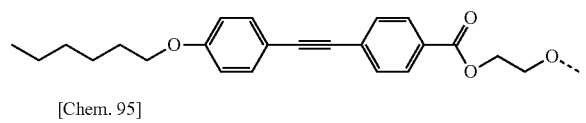

(VII-p-1)
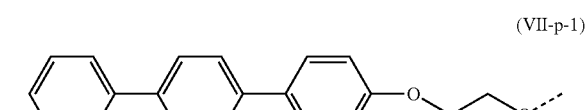

(VII-p-2)
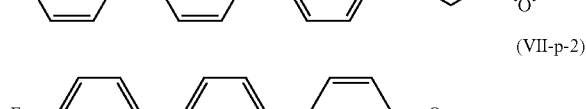

(VII-p-3)
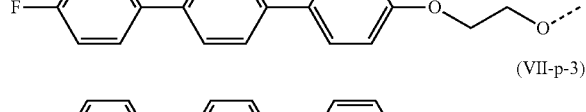

(VII-p-4)
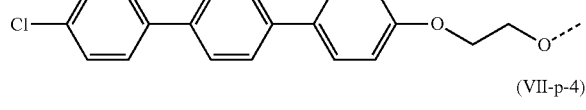

(VII-p-5)
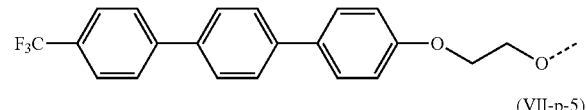

(VII-p-6)
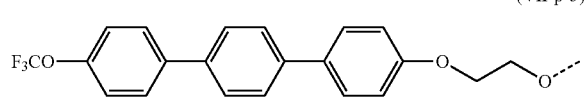

(VII-p-7)
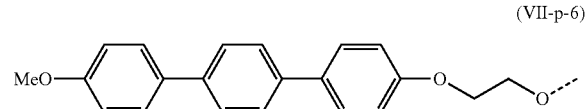

(VII-p-8)
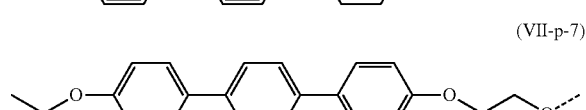

(VII-p-9)

(VII-p-10)
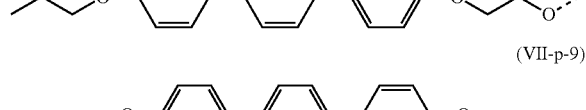

(VII-p-11)
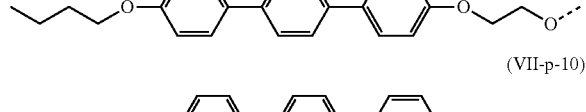

(VII-q-1)
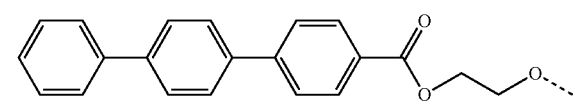

(VII-q-2)
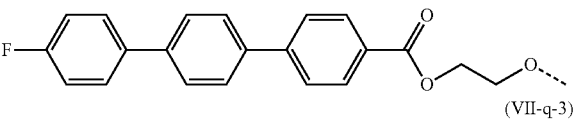

(VII-q-3)

(VII-q-4)

(VII-q-5)

(VII-q-6)

(VII-q-7)

(VII-q-8)

(VII-q-9)

(VII-q-10)

Preferred among these are formulas (VII-a-1) to (VII-a-15), formulas (VII-b-11) to (VII-b-15), formulas (VII-c-1) to (VII-c-11), formulas (VII-d-10) to (VII-d-15), formulas (VII-f-1) to (VII-f-10), formulas (VII-g-1) to (VII-g-10), formulas (VII-h-1) to (VII-h-10), formulas (VII-j-1) to (VII-j-9), formulas (VII-1-1) to (VII-1-11), and formulas (VII-m-1) to (VII-m-11).

In general formula (Q) or (QP), P is general formula (VIII) below.

[Chem. 97]

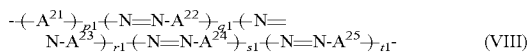

(VIII)

(In the formula, each dashed line is a linkage to $S_a$ or $S_{aa}$; $A^{21}$, $A^{22}$, $A^{23}$, $A^{24}$, and $A^{25}$ are each independently a 1,4-naphthylene, 2,6-naphthylene, 2,5-pyridyl, 2,5-pyrimidyl, 2,5-thiophenylene, 2,5-furanylene, or 1,4-phenylene group that is unsubstituted or mono- or polysubstituted with a fluorine atom, a chlorine atom, a bromine atom, a methyl group, a methoxy group, a nitro group, or —$NR^{21}R^{22}$ or with a linear or branched alkyl residue of 1 to 10 carbon atoms that is unsubstituted or mono- or polysubstituted with fluorine, where one or more non-adjacent CH₂ groups are independently optionally replaced with Q, where Q is —O—, —CO—, —CO—O—, —O—CO—, —Si(CH₃)₂—O—Si(CH₃)₂—, —NR—, —NR—CO—, —CO—NR—, —NR—CO—O—, —O—CO—NR—, —NR—CO—NR—, —CH=CH—, —C≡C—, or —O—CO—O—, where R, $R^{21}$, and $R^2$ are independently a hydrogen atom or an alkyl group of 1 to 5 carbon atoms; and p1, q1, r1, s1, and t1 are each independently 0 or 1, with the proviso that 0<q1+r1+s1+t1.)

$A^{21}$, $A^{22}$, $A^{23}$, $A^{24}$, and $A^{25}$ are preferably each independently a 1,4-naphthylene, 2,6-naphthylene, pyridine-2,5-diyl, pyrimidine-2,5-diyl, or 1,4-phenylene group that is unsubstituted or has one or more hydrogen atoms replaced with a fluorine atom, a chlorine atom, a methyl group, or a methoxy group. $A^{21}$, $A^{22}$, $A^{23}$, $A^{24}$, and $A^{25}$ are more preferably each independently a 2,6-naphthylene, pyridine-2,5-diyl, pyrimidine-2,5-diyl, or 1,4-phenylene group that is unsubstituted or has one or more hydrogen atoms replaced with a fluorine atom, a chlorine atom, a methyl group, or a methoxy group. q1+r1+s1+t1 is more preferably 1 or 2. $A^{21}$, $A^{22}$, $A^{23}$, $A^{24}$, and $A^{25}$ are even more preferably each independently a 2,6-naphthylene or 1,4-phenylene group that is unsubstituted or has one or more hydrogen atoms replaced with a fluorine atom, a chlorine atom, a methyl group, or a methoxy group. p1 and q1+r1+s1+t1 are even more preferably 1.

To improve the liquid crystal alignment properties, it is preferred that $A^{21}$, $A^{22}$, $A^{23}$, $A^{24}$, and $A^{25}$ be each independently a pyridine-2,5-diyl, pyrimidine-2,5-diyl, or 1,4-phenylene group. To improve the solubility of the polymer, it is preferred that $A^{21}$, $A^{22}$, $A^{23}$, $A^{24}$, and $A^{25}$ be each independently a 1,4-naphthylene, 2,6-naphthylene, 2,5-thiophenylene, or 2,5-furanylene group. To reduce the dose of light required to align a liquid crystal, it is preferred that $A^{21}$, $A^{22}$, $A^{23}$, $A^{24}$, and $A^{25}$ be a pyridine-2,5-diyl, pyrimidine-2,5-diyl, 2,5-thiophenylene, or 1,4-phenylene group and that q1+r1+s1+t1 be 1 or 2. To allow photoalignment at a longer wavelength, it is preferred that $A^{21}$, $A^{22}$, $A^{23}$, $A^{24}$, and $A^{25}$ be a pyrimidine-2,5-diyl, 2,5-thiophenylene, 2,6-naphthylene, or 2,5-furanylene group and that q1+r1+s1+t1 be 1 to 3.

Although general formula (VIII) encompasses numerous compounds, specific preferred structures include those represented by formulas (P-a-1) to (P-e-7) below.

[Chem. 98]

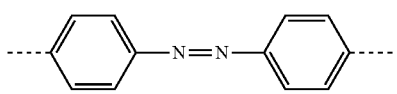
(P-a-1)

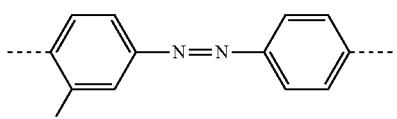
(P-a-2)

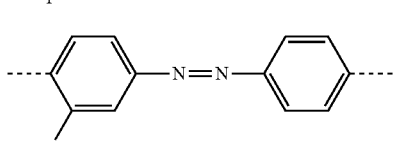
(P-a-3)

-continued

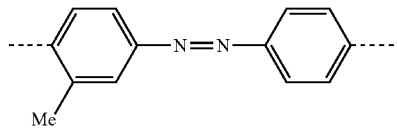
(P-a-4)

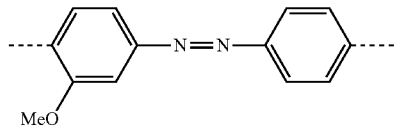
(P-a-5)

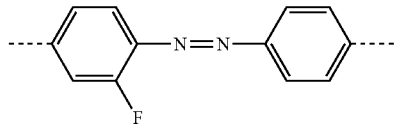
(P-a-6)

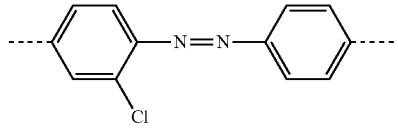
(P-a-7)

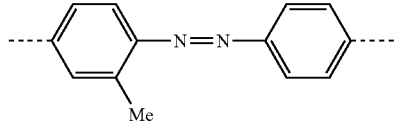
(P-a-8)

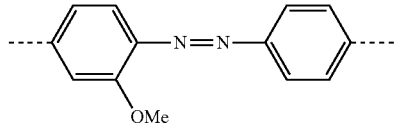
(P-a-9)

[Chem. 99]

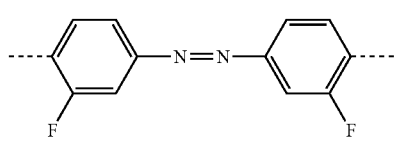
(P-b-1)

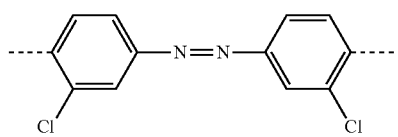
(P-b-2)

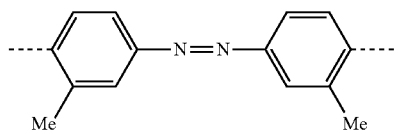
(P-b-3)

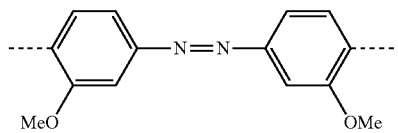
(P-b-4)

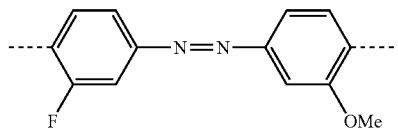
(P-b-5)

(P-b-6) 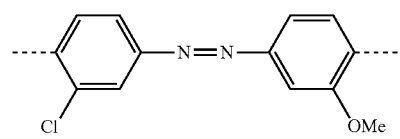
(P-b-7) 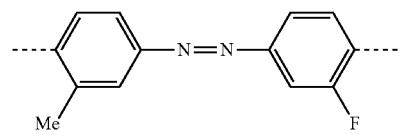
(P-b-8) 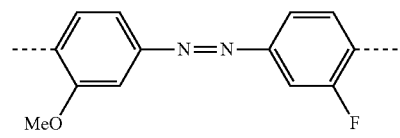
[Chem. 100]
(P-c-1) 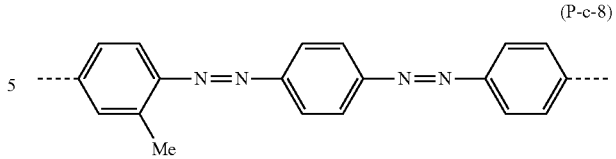
(P-c-2)
(P-c-3)
(P-c-4)
(P-c-5)
(P-c-6)
(P-c-7)
(P-c-8) 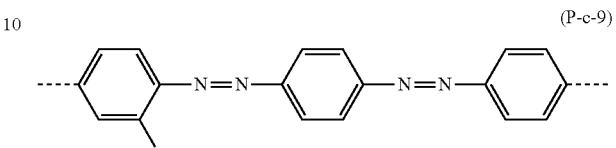
(P-c-9)
[Chem. 101]
(P-d-1) 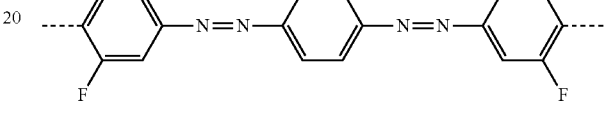
(P-d-2) 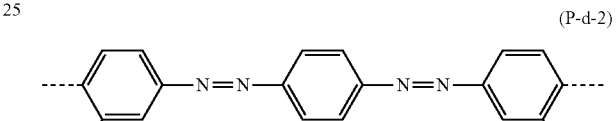
(P-d-3) 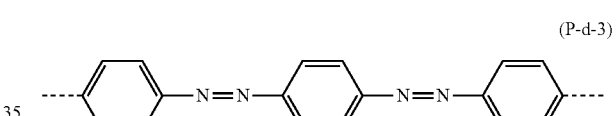
(P-d-4) 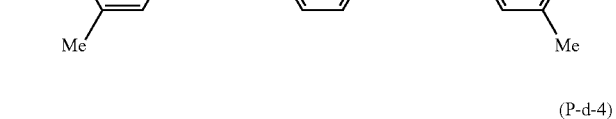
(P-d-5) 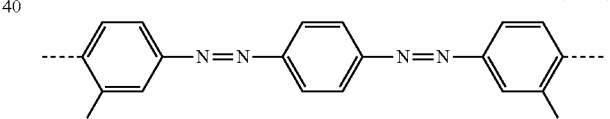
(P-d-6) 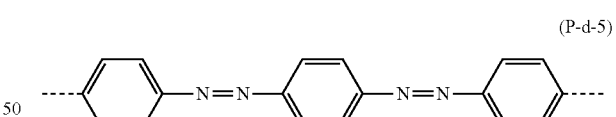
(P-d-7) 

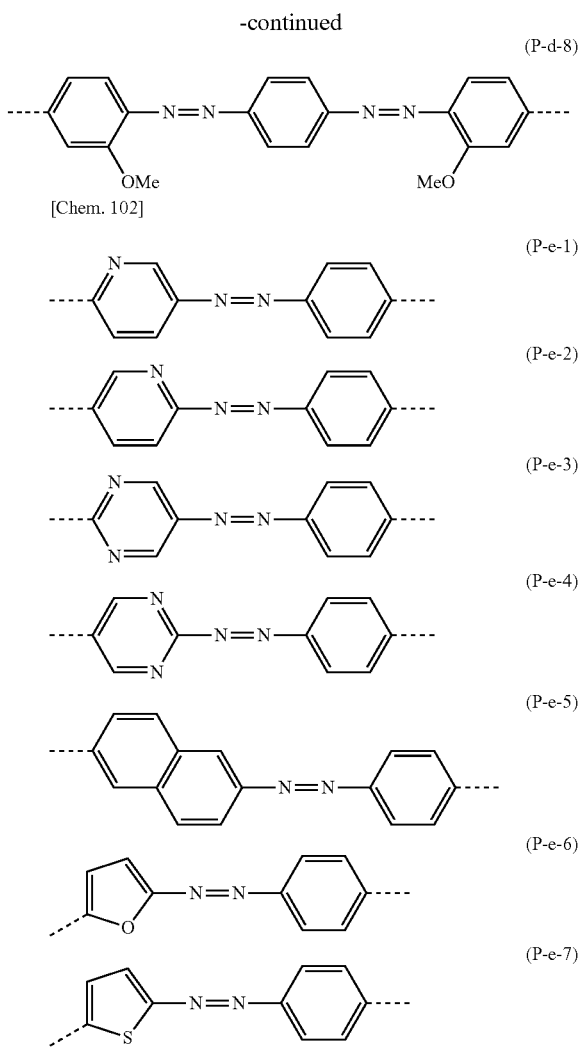

Preferred among these are compounds represented by formulas (P-a-1) to (P-a-9), formulas (P-b-1) to (P-b-8), formula (P-c-1), and formula (P-e-5).

A preferred polymer for the photoalignment layer contains a chemically isomerizable, photochemically uncrosslinkable segment that, when used alone as a photoalignment layer, has the property of aligning a liquid crystal in a direction perpendicular to the vibration direction of the polarized ultraviolet radiation used for exposure. The use of such a polymer provides strong anchoring force.

A preferred polymer for the photoalignment layer contains a photochemically crosslinkable segment that, when used alone as a photoalignment layer, has the property of aligning a liquid crystal in a direction parallel to the vibration direction of the polarized ultraviolet radiation used for exposure. The use of such a polymer provides strong anchoring force.

A preferred polymer for the photoalignment layer may contain a graft polymer or copolymer of (a) the photochemically isomerizable, photochemically uncrosslinkable segment and (b) the photochemically crosslinkable segment.

Preparation of Preferred Polymers for Photoalignment Layer According to Invention The preparation of preferred polymers for the photoalignment layer according to the present invention will now be described. The blend ratio of a composition containing a compound that forms (a) the photochemically isomerizable, photochemically uncrosslinkable segment (hereinafter referred to as "monomer composition (a)") to a composition containing a compound that forms (b) the photochemically crosslinkable segment (hereinafter referred to as "monomer composition (b)") is preferably selected such that the photochemically isomerizable segment is present in the polymer in an amount of 0.1- to 30-fold moles per 100-fold moles of the photochemically crosslinkable segment present in the polymer. More preferably, the photochemically isomerizable segment is present in the polymer in an amount of 2- to 10-fold moles per 100-fold moles of the photochemically crosslinkable segment present in the polymer. These compounds are also preferably liquid crystal compounds.

A preferred polymer for the photoalignment layer according to the present invention may be prepared using an optional polymerization initiator selected depending on the type of polymerization of the polymerizable functional groups. Instances of known polymerization initiators are disclosed, for example, in Kobunshi No Gosei To Hanno (Synthesis and Reactions of Polymers) (The Society of Polymer Science, Japan, Kyoritsu Shuppan Co., Ltd.).

Examples of thermal polymerization initiators for radical polymerization include azo compounds such as azobisisobutyronitrile and peroxides such as benzoyl peroxide.

Examples of photopolymerization initiators include aromatic ketones such as benzophenone, Michler's ketone, xanthone, and thioxanthone; quinones such as 2-ethylanthraquinone; acetophenones such as acetophenone, trichloroacetophenone, 2-hydroxy-2-methylpropiophenone, 1-hydroxycyclohexyl phenyl ketone, benzoin ether, 2,2-diethoxyacetophenone, and 2,2-dimethoxy-2-phenylacetophenone; diketones such as benzil and methyl benzoylformate; acyl oxime esters such as 1-phenyl-1,2-propanedione-2-(o-benzoyl) oxime; acylphosphine oxides such as 2,4,6-trimethylbenzoyldiphenylphosphine oxide; sulfur compounds such as tetramethylthiuram and dithiocarbamate; organic peroxides such as benzoyl peroxide; and azo compounds such as azobisisobutyronitrile. Examples of thermal polymerization initiators for cationic polymerization include aromatic sulfonium salts. Examples of photopolymerization initiators include organic sulfonium salts, iodonium salts, and phosphonium compounds.

The polymerization initiator is preferably added to the mixture of the monomer compositions (a) and (b) in an amount of 0.1% to 10% by mass, more preferably 0.1% to 6% by mass, even more preferably 0.1% to 3% by mass. Like polysiloxanes, a target polymer may be synthesized by addition reaction on the polymer main chain.

A preferred polymer for the photoalignment layer according to the present invention may be prepared by performing a polymerization reaction in a reaction vessel such as a glass or stainless steel vessel in advance and then purifying the resulting polymer. The polymerization reaction may be performed in a solution of the monomers used as raw materials in a solvent. Examples of preferred solvents include benzene, toluene, xylene, ethylbenzene, pentane, hexane, heptane, octane, cyclohexane, cycloheptane, methanol, ethanol, 1-propanol, 2-propanol, ethylene glycol, ethylene glycol monomethyl ether, ethylene glycol dimethyl ether, 2-butanone, acetone, tetrahydrofuran, y-butyrolactone, N-methyl-pyrrolidone, dimethyl sulfoxide, and dimethylformamide. Two or more organic solvents may be used in combination.

The polymer according to the present invention may also be prepared by dissolving the monomer compositions (a) and (b) in a solvent, applying the solution to a substrate, drying the coating to remove the solvent, and performing a polymerization reaction by heating or exposure to light.

Method for Forming Liquid Crystal Alignment Layer

A preferred polymer for the photoalignment layer according to the present invention, when exposed to light, achieves the capability to control the orientation of liquid crystal molecules and the stability of alignment to heat and light. The present invention can provide a liquid crystal alignment layer for horizontally and vertically aligned liquid crystal display devices and a horizontally or vertically aligned liquid crystal display device including such a layer. An example method for forming a liquid crystal alignment layer from a preferred polymer for the photoalignment layer according to the present invention includes dissolving the polymer in a solvent, applying the solution to a substrate, and exposing the coating to light to form a liquid crystal alignment layer with orientation control capability. The solvent used for dissolving the polymer is preferably one that dissolves, but does not react with, the preferred polymer for the photoalignment layer according to the present invention and other optional ingredients. Examples of such solvents include 1,1,2-trichloroethane, N-methylpyrrolidone, butoxyethanol, γ-butyrolactone, ethylene glycol, polyethylene glycol monomethyl ether, propylene glycol, 2-pyrrolidone, N,N-dimethylformamide, phenoxyethanol, tetrahydrofuran, dimethyl sulfoxide, methyl isobutyl ketone, and cyclohexanone. Two or more organic solvents may be used in combination.

Another example method for forming the liquid crystal alignment layer according to the present invention includes dissolving the monomer compositions (a) and (b) in a solvent, applying the solution to a substrate, heating the coating or exposing it to light to form a polymer, and exposing the polymer to light to form a liquid crystal alignment layer with orientation control capability.

The solvent used for dissolving the monomer compositions may be similar to the solvent used for dissolving the polymer. The preparation of the polymer and the induction of orientation control capability may be simultaneously performed by exposure to light or may be separately performed, for example, by a combination of heating and exposure to light or by a combination of two or more types of light with different wavelengths. In any of the methods for forming the liquid crystal alignment layer, the photoalignment layer may be formed on a substrate having an alignment layer formed thereon in advance to impart the capability of the polymer according to the present invention to control the direction and angle of orientation to the substrate.

Examples of materials for the substrate include glass, silicon, polyethylene terephthalate, polybutylene terephthalate, polyethersulfone, polycarbonate, and triacetylcellulose.

These substrates may have electrode layers such as Cr, Al, ITO ($In_2O_3$—$SnO_2$), and NESA ($SnO_2$) layers when used in liquid crystal display devices. These electrode layers are patterned, for example, by photoetching or through a mask during the formation of the electrode layers.

These substrates may also have other layers such as color filter layers.

A solution containing a preferred polymer for the photoalignment layer according to the present invention may be applied to the substrate by processes such as spin coating, die coating, gravure coating, flexography, and inkjet printing.

The solution used for coating preferably has a solid content of 0.5% to 10% by weight. More preferably, the solid content is selected from this range by taking into account, for example, the process used to apply the solution to the substrate, viscosity, and volatility.

After the solution is applied to the substrate, the coated surface is preferably heated to remove the solvent. The coated surface is preferably dried at 50° C. to 300° C., more preferably 80° C. to 200° C., for 2 to 200 minutes, more preferably 2 to 100 minutes.

If a preferred polymer for the photoalignment layer according to the present invention is prepared using the monomer compositions (a) and (b), they may be thermally polymerized in the heating step to form a polymer on the substrate. In this case, the monomer composition (a) or (b) preferably contains a polymerization initiator. Alternatively, the polymer may be prepared by photopolymerization with nonpolarized light after the solvent is removed in the heating step. Thermal polymerization and photopolymerization may also be used in combination.

If the polymer according to the present invention is prepared on the substrate by thermal polymerization, heating may be performed at any temperature sufficient to allow polymerization to proceed. A temperature of about 50° C. to 250° C. is generally preferred, and a temperature of about 70° C. to 200° C. is more preferred. A polymerization initiator may or may not be added to the composition.

If a preferred polymer for the photoalignment layer according to the present invention is prepared on the substrate by photopolymerization, nonpolarized ultraviolet radiation is preferably used for exposure.

A polymerization initiator is also preferably incorporated into the composition.

The dose of the nonpolarized ultraviolet radiation is preferably 20 $mJ/cm^2$ to 8 $J/cm^2$, more preferably 40 $mJ/cm^2$ to 5 $J/cm^2$.

The intensity of the nonpolarized ultraviolet radiation is preferably 10 to 1,000 $mW/cm^2$, more preferably 20 to 500 $mW/cm^2$.

The peak wavelength of the nonpolarized ultraviolet radiation is preferably 250 to 450 nm.

The coating formed as described above may then be exposed to linearly polarized light in a direction normal to the coated surface or to nonpolarized or linearly polarized light in an oblique direction, or both, to perform photoisomerization and photocrosslinking reactions and thereby induce orientation control capability. To achieve the desired pretilt angle, it is preferred that the coating be exposed to linearly polarized light in an oblique direction. By "exposed in an oblique direction" as used herein, it is meant that the light exposure direction and the substrate plane make an angle of 1° to 89°. The pretilt angle is generally preferably 70° to 89.8° for liquid crystal alignment layers for vertical alignment and is generally preferably 0° to 20° for liquid crystal alignment layers for horizontal alignment.

The light used to expose the coating may be, for example, ultraviolet or visible light containing light with a wavelength of 150 to 800 nm, preferably ultraviolet radiation with a wavelength of 270 to 450 nm.

Examples of light sources include xenon lamps, high-pressure mercury lamps, ultra-high-pressure mercury lamps, and metal halide lamps. Light from these light sources may be passed through a polarizing filter or prism to obtain linearly polarized light. Ultraviolet or visible light emitted from such light sources may be passed through a filter such as an interference filter or color filter to limit the wavelength range used for exposure.

The thickness of the liquid crystal alignment layer to be formed is preferably about 10 to 250 nm, more preferably about 10 to 100 nm.

Method for Manufacturing Liquid Crystal Display Device

The liquid crystal alignment layer formed as described above may be used to manufacture a liquid crystal cell including a liquid crystal composition held between a pair of substrates and a liquid crystal display device including such a liquid crystal cell, for example, as follows.

A liquid crystal cell may be manufactured by providing two substrates, each having the liquid crystal alignment layer according to the present invention formed thereon, and placing a liquid crystal between the two substrates. Alternatively, the liquid crystal alignment layer may be formed only on one of the two substrates.

Example methods for manufacturing liquid crystal cells are illustrated below. A liquid crystal cell may be manufactured by placing two substrates such that the liquid crystal alignment layers thereof face each other, bonding the peripheries of the two substrates with a sealant while maintaining a certain gap (cell gap) therebetween, injecting a liquid crystal into the cell gap defined by the surfaces of the substrates and the sealant, and sealing the injection hole.

A liquid crystal cell may also be manufactured by a process known as one-drop fill (ODF). For example, a liquid crystal cell may be manufactured by applying an ultraviolet-curable sealant to a predetermined area of a substrate having the liquid crystal alignment layer formed thereon, dispensing droplets of a liquid crystal onto the liquid crystal alignment layer, bonding another substrate such that the liquid crystal alignment layers thereof face each other, and exposing the entire surfaces of the substrates to ultraviolet light to cure the sealant.

In any of the methods for manufacturing a liquid crystal cell, it is desirable to remove flow-induced orientation after injection by heating the liquid crystal to a temperature at which it displays an isotropic phase and then slowly cooling it to room temperature.

The sealant may be, for example, an epoxy resin.

To maintain a constant cell gap, spacers such as silica gel, alumina, or acrylic beads may be provided before the two substrates are bonded together. These spacers may be dispersed over the alignment coating or may be mixed in the sealant before the two substrates are bonded together.

The liquid crystal may be, for example, a nematic liquid crystal. The liquid crystal preferably has a negative dielectric anisotropy for vertically aligned liquid crystal cells. The liquid crystal preferably has a positive dielectric anisotropy for horizontally aligned liquid crystal cells. Examples of liquid crystals that can be used include dicyanobenzene liquid crystals, pyridazine liquid crystals, Schiff-base liquid crystals, azoxy liquid crystals, naphthalene liquid crystals, biphenyl liquid crystals, and phenylcyclohexane liquid crystals.

Polarizers may be bonded to the outer surfaces of the thus-manufactured liquid crystal cell to obtain a liquid crystal display device.

Examples of polarizers include "H-sheet" polarizers, which are polyvinyl alcohol sheets doped with iodine while being stretched, and those held between cellulose acetate protective layers.

Method for Manufacturing Optically Anisotropic Element

The liquid crystal alignment layer formed as described above may be used to manufacture an optically anisotropic element useful as an optically anisotropic film for applications such as optical compensation of liquid crystal display devices, for example, as follows. Specifically, the present invention can provide an optically anisotropic element made of a polymer of a polymerizable liquid crystal composition in which polymerizable liquid crystal molecules are aligned by the polymer according to the present invention.

If an optically anisotropic element is manufactured by applying the polymerizable liquid crystal composition to the liquid crystal alignment layer, commonly known and used coating processes may be used, including bar coating, spin coating, roller coating, gravure coating, spray coating, die coating, cap coating, and dipping. To improve the ease of application, a commonly known and used organic solvent may be added to the polymerizable liquid crystal composition. In this case, the polymerizable liquid crystal composition is applied to the liquid crystal alignment layer and is then dried to remove the organic solvent, for example, by air drying, heat drying, vacuum drying, or vacuum heat drying.

To prepare an optically anisotropic element using the liquid crystal alignment layer according to the present invention, the polymerizable liquid crystal composition is applied to the liquid crystal alignment layer described above and is then polymerized in an aligned state. Examples of methods for polymerizing the polymerizable liquid crystal composition in the present invention include exposure to radiation and thermal polymerization.

If the process of polymerizing the polymerizable liquid crystal composition involves exposure to radiation, photo-polymerization by exposure to light such as ultraviolet radiation is preferred for its process simplicity. If the process of polymerizing the polymerizable liquid crystal composition involves photopolymerization, it may be performed as in the formation of the liquid crystal alignment layer by photopolymerization. The intensity of the ultraviolet radiation used to expose the polymerizable liquid crystal composition is preferably 1 $W/m^2$ to 10 $kW/m^2$, more preferably 5 $W/m^2$ to 2 $kW/m^2$.

The polymerization of the polymerizable liquid crystal composition by heating is preferably performed at or below a temperature at which the polymerizable liquid crystal composition displays a liquid crystal phase. In particular, if a thermal polymerization initiator that releases radicals when heated is used, it preferably has a cleavage temperature within the above temperature range.

A thermal polymerization initiator and a photopolymerization initiator may also be used in combination. Although the heating temperature depends on the liquid crystal-to-isotropic phase transition temperature of the polymerizable liquid crystal composition, the heating temperature preferably falls below a temperature at which heterogeneous polymerization is induced by heat. Specifically, the heating temperature is preferably 20° C. to 300° C., more preferably 30° C. to 200° C., even more preferably 30° C. to 120° C. For example, if the polymerizable group is a (meth)acryloyloxy group, the heating temperature preferably falls below 90° C.

The optical axis of the optically anisotropic element according to the present invention may be adjusted by controlling the pretilt angle with the photoalignment layer. Specifically, a pretilt angle of 0° to 45° is preferred to achieve an angle of 0° to 45° between the optical axis and the substrate plane, whereas a pretilt angle of 45° to 90° is preferred to achieve an angle of 45° to 90° between the optical axis and the substrate plane.

An example process of manufacturing a liquid crystal alignment layer and an optically anisotropic element is illustrated below. The first step is to form a layer of the polymer on a substrate. The second step is to expose the layer of the polymer to anisotropic light to form a liquid crystal alignment layer with orientation control capability. The third step is to form a polymerizable liquid crystal composition layer on the liquid crystal alignment layer. The fourth step is to polymerize the polymerizable liquid crystal composition layer to form an optically anisotropic element. In the fourth step, polymerization and crosslinking reactions may proceed simultaneously in the liquid crystal alignment layer. This manufacturing process, in which the layer of the polymer is directly exposed to light, provides a liquid crystal alignment layer with a higher liquid crystal alignment capability.

Another manufacturing process is illustrated below.

The first step is to form a layer of the polymer on a substrate. The second step is form a polymerizable liquid crystal composition layer on the layer of the polymer. The third step is to expose the layer of the polymer to anisotropic light to form a liquid crystal alignment layer with orientation control capability. The fourth step is to polymerize the polymerizable liquid crystal composition layer to form an optically anisotropic element. In this manufacturing process, the third and fourth steps may be simultaneously performed, for example, by exposure to light, which results in a reduced number of steps.

In some cases, several optically anisotropic elements may be stacked on top of each other. In such cases, the above steps may be repeated to form a stack of optically anisotropic elements. After an optically anisotropic element is formed on a liquid crystal alignment layer, another liquid crystal alignment layer and another optically anisotropic element may be stacked on the optically anisotropic element. Alternatively, after an optically anisotropic element is formed on a liquid crystal alignment layer, another optically anisotropic element may be stacked on the optically anisotropic element. Such optically anisotropic elements composed of a plurality of optically anisotropic layers can be used for applications such as simultaneously achieving the optical compensation of the liquid crystal layer and polarizers of a liquid crystal display device, simultaneously achieving the optical compensation of the liquid crystal layer of a liquid crystal display device and an enhancement in luminance, and simultaneously achieving the optical compensation of the polarizers of a liquid crystal display device and an enhancement in luminance.

An optically anisotropic element including a plurality of regions with different orientations may be manufactured by polymerizing only predetermined regions by exposure to ultraviolet radiation through a mask, changing the orientation of the unpolymerized regions by applying, for example, an electric field, magnetic field, or temperature, and polymerizing the unpolymerized regions.

An optically anisotropic element including a plurality of regions with different orientations may also be manufactured by polymerizing only predetermined regions by exposure to ultraviolet radiation through a mask while controlling the orientation of the unpolymerized monomer compositions (a) and (b) by applying, for example, an electric field, magnetic field, or temperature.

The resulting optically anisotropic element may be subjected to heat aging to stabilize the resistance of the optically anisotropic element to solvents and heat. In this case, the optically anisotropic element is preferably heated at or above the glass transition temperature of the polymerizable liquid crystal composition layer. The heating temperature is generally preferably 50° C. to 300° C., more preferably 80° C. to 240° C., even more preferably 100° C. to 220° C.

The optically anisotropic layer of the optically anisotropic element manufactured as described above may be separated from the substrate and used alone as an optically anisotropic element or may be used as-manufactured without being separated from the substrate. In particular, this optically anisotropic element has little risk of contaminating other elements and is therefore useful as a substrate on which other layers are to be formed or as a substrate to be bonded to another substrate.

Preparation of Polymerizable Liquid Crystal Composition

A polymerizable liquid crystal composition for the manufacture of optically anisotropic elements in the present invention contains a polymerizable liquid crystal that displays liquid crystal properties alone or in a composition with other liquid crystal compounds. Examples of such polymerizable liquid crystal compounds include calamitic polymerizable liquid crystal compounds containing a rigid segment, known as a mesogen, composed of a plurality of connected structures such as 1,4-phenylene or 1,4-cyclohexylene groups and a polymerizable functional group such as a (meth)acryloyloxy, vinyloxy, or epoxy group, such as those disclosed in Handbook of Liquid Crystals (D. Demus, J. W. Goodby, G. W. Gray, H. W. Spiess, and V. Vill, Wiley-VCH, 1998), Ekisho No Kagaku (Chemistry of Liquid Crystals) (Kikan Kagaku Sosetsu (Quarterly Review of Chemistry) No. 22) (The Chemical Society of Japan, 1994), and Japanese Unexamined Patent Application Publication Nos. 7-294735, 8-3111, 8-29618, 11-80090, 11-148079, 2000-178233, 2002-308831, and 2002-145830; calamitic polymerizable liquid crystal compounds containing a maleimide group, such as those disclosed in Japanese Unexamined Patent Application Publication Nos. 2004-2373 and 2004-99446; calamitic liquid crystal compounds containing an allyl ether group, such as those disclosed in Japanese Unexamined Patent Application Publication No. 2004-149522; and discotic polymerizable compounds such as those disclosed in Handbook of Liquid Crystals (D. Demus, J. W. Goodby, G. W. Gray, H. W. Spiess, and V. Vill, Wiley-VCH, 1998), Ekisho No Kagaku (Chemistry of Liquid Crystals) (Kikan Kagaku Sosetsu (Quarterly Review of Chemistry) No. 22) (The Chemical Society of Japan, 1994), and Japanese Unexamined Patent Application Publication No. 07-146409. Among these, calamitic liquid crystal compounds containing a polymerizable group are preferred since they can be used to readily prepare a polymerizable liquid crystal composition having a low liquid crystal temperature range around room temperature.

Although any solvent may be used in the polymerizable liquid crystal composition, solvents in which the compound has good solubility may be used. Examples of such solvents include aromatic hydrocarbons such as toluene, xylene, and mesitylene; esters such as methyl acetate, ethyl acetate, and propyl acetate; ketones such as methyl ethyl ketone, methyl isobutyl ketone, and cyclohexanone; ethers such as tetrahydrofuran, 1,2-dimethoxyethane, and anisole; amides such as N,N-dimethylformamide and N-methyl-2-pyrrolidone; and other solvents such as γ-butyrolactone and chlorobenzene. These solvents may be used alone or in a mixture of two or more. Additives may also be added.

Liquid crystal compounds containing no polymerizable group may optionally be added to the polymerizable liquid crystal composition. However, the addition of such liquid crystal compounds in excess amounts may result in the liquid crystal compounds leaking from the resulting optically anisotropic element and thus contaminating the element stacked thereon, and may also decrease the heat resistance of the optically anisotropic element. These liquid crystal compounds, if added, are preferably added in an amount of 30% by mass or less, more preferably 15% by mass or less, even more preferably 5% by mass or less, of the total mass of the polymerizable liquid crystal compounds.

Compounds that contain a polymerizable group but are not polymerizable liquid crystal compounds may also be added to the polymerizable liquid crystal composition. Any compound that is commonly known in the art as a polymerizable monomer or oligomer may be used. These compounds, if added, are preferably added in an amount of 5% by mass or less, more preferably 3% by mass or less, of the polymerizable liquid crystal composition according to the present invention.

Optically active compounds, i.e., chiral compounds, may also be added to the polymerizable liquid crystal composition. Chiral compounds themselves need not display a liquid crystal phase and may or may not contain a polymerizable group. The helix direction of chiral compounds may be selected depending on the application of the polymer.

Specific examples include cholesterol pelargonate and cholesterol stearate, which contain a cholesteryl group as a chiral group; CB-15 and C-15 from BDH, S-1082 from Merck, and CM-19, CM-20, and CM from Chisso Corporation, which contain a 2-methylbutyl group as a chiral group; and S-811 from Merck and CM-21 and CM-22 from Chisso Corporation, which contain a 1-methylheptyl group as a chiral group.

Chiral compounds, if added, are preferably added in such an amount that the thickness (d) of the resulting polymer divided by the helix pitch (P) of the polymer (d/P) is 0.1 to 100, more preferably 0.1 to 20, depending on the application of the polymer of the polymerizable liquid crystal composition.

Stabilizers may also be added to the polymerizable liquid crystal composition to improve the storage stability thereof. Examples of stabilizers include hydroquinone, hydroquinone monoalkyl ethers, tert-butylcatechols, pyrogallols, thiophenols, nitro compounds, β-naphthylamines, and β-naphthols. Stabilizes, if added, are preferably added in an amount of 1% by mass or less, more preferably 0.5% by mass or less, of the polymerizable liquid crystal composition according to the present invention.

If an optically anisotropic element prepared from the polymer and the polymerizable liquid crystal composition according to the present invention is used for applications such as raw materials for polarizing films and alignment layers, printing inks and coatings, and protective layers, other ingredients may be added to the polymerizable liquid crystal composition used in the present invention depending on the purpose. Examples of such ingredients include metals, metal complexes, dyes, pigments, fluorescent materials, phosphorescent materials, surfactants, leveling agents, thixotropic agents, gelling agents, polysaccharides, ultraviolet absorbers, infrared absorbers, antioxidants, ion exchange resins, and metal oxides such as titanium oxide.

EXAMPLES

The present invention is further illustrated by the following examples, although these examples are not intended to limit the invention. The structures of compounds were identified by techniques such as nuclear magnetic resonance (NMR) spectroscopy and mass spectroscopy (MS). Parts and percentages are by mass unless otherwise specified.

Test Method for AC Image-Sticking

AC image-sticking was tested using an in-plane switching (IPS) liquid crystal cell having a cell gap of 4 μm and including interdigital electrodes with a line width of 10 μm and a space width of 10 μm. As shown in FIG. 1, the liquid crystal was oriented at an angle of 10° with respect to the interdigital electrodes having the partial structure as shown when no voltage is applied.

A liquid crystal material was injected into the liquid crystal cell, followed by aging at 92° C. for 2 minutes. Polarizers were then bonded to the upper and lower sides of the liquid crystal cell. The upper and lower polarizers were arranged in a crossed configuration, with one of the transmission axes of the upper and lower polarizers being parallel to the orientation of the liquid crystal when no voltage is applied. T1 was defined as the transmittance of the liquid crystal cell as determined when an AC voltage of 4 V (rectangular wave with a frequency of 64 Hz) was applied at room temperature. T2 was defined as the transmittance of the liquid crystal cell as determined when an AC voltage of 4 V (rectangular wave with a frequency of 60 Hz) was applied at room temperature after an AC voltage of 10 V (rectangular wave with a frequency of 60 Hz) was applied at a temperature of 60° C. for 64 hours. An AC image-sticking evaluation parameter was defined as T2 divided by T1. The evaluation parameter is 1 in the ideal state, where there is no AC image-sticking, and is more than 1 when there is a deviation from the ideal state.

Reference Example 1

Polymer (ex-1) below was synthesized according to WO2013/002260.

[Chem. 103]

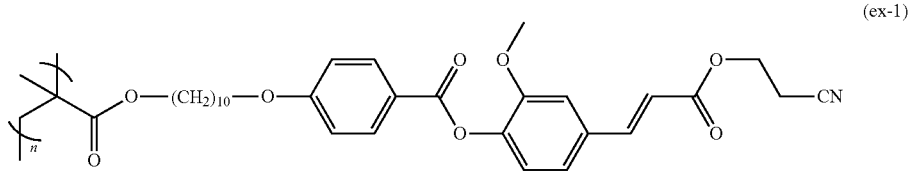

(ex-1)

GPC showed that this polymer had a weight average molecular weight of about 260,000.

Reference Example 2

Polymer (ex-2) below was synthesized.

[Chem. 104]

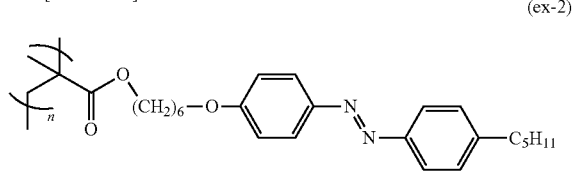

(ex-2)

GPC showed that this polymer had a weight average molecular weight of about 30,000.

Reference Example 3-1

Polymer (ex-5) below was synthesized.

[Chem. 105]
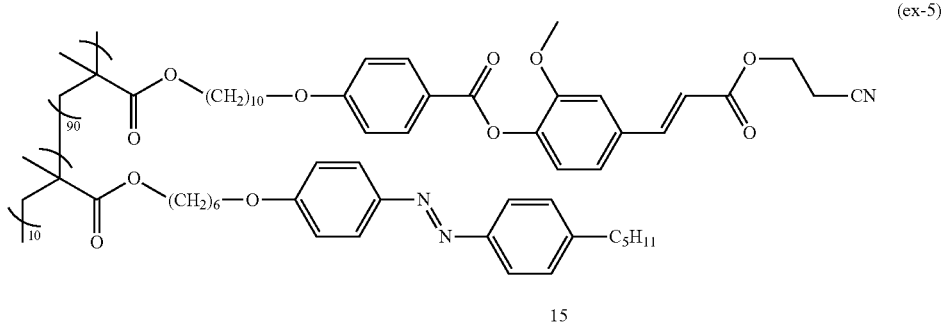
(ex-5)
GPC showed that this polymer had a weight average molecular weight of about 370,000.
Other Synthesis Examples
Similarly, the following three polymers were synthesized according to WO2013/002260.
[Chem. 106]
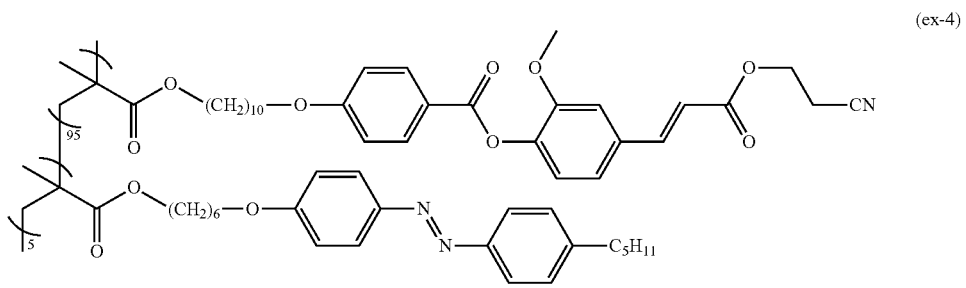
(ex-4)
[Chem. 107]
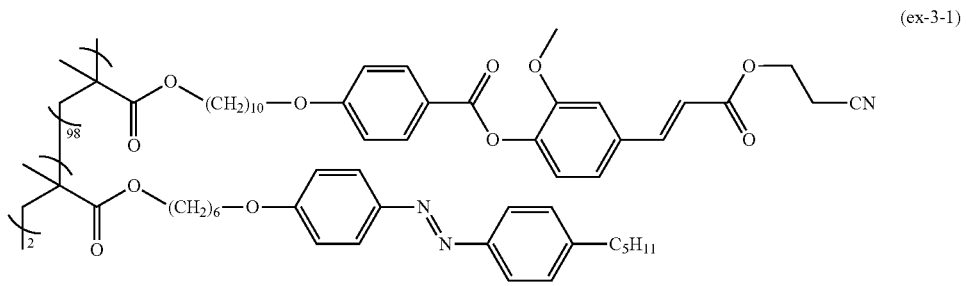
(ex-3-1)
[Chem. 108]
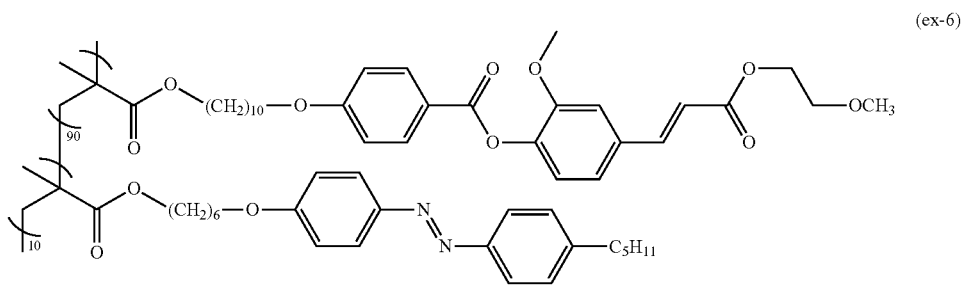
(ex-6)

Reference Example 3

Polymer (ex-3-2) below was synthesized.

[Chem. 109]

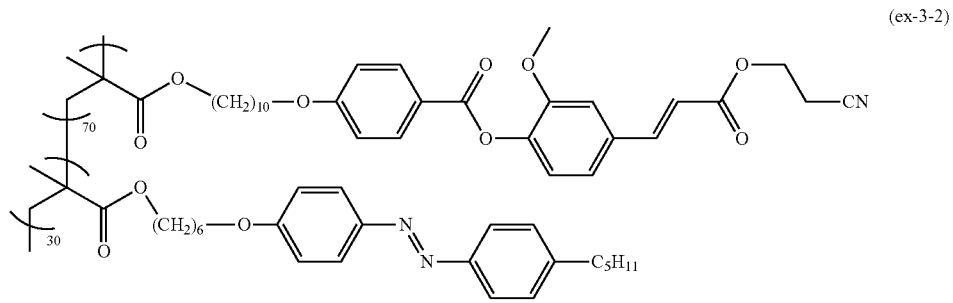

GPC showed that this polymer had a weight average molecular weight of about 390,000.

Reference Example 4

The compounds shown in Table 1 below were mixed in the proportion shown in the table to prepare Liquid Crystal Composition A. The results of a thermal analysis showed that Liquid Crystal Composition A had a nematic-to-isotropic liquid phase transition temperature (clearing point) of 85.6° C. This liquid crystal composition also had an extraordinary refractive index $n_e$ of 1.596 at a wavelength of 589 nm, an ordinary refractive index $n_o$ of 1.491 at a wavelength of 589 nm, a dielectric anisotropy of +7.0, and a $K_{22}$ of 7.4 pN.

TABLE 1

| Liquid crystal compound | Content (% by mass) |
|---|---|
|  | 9 |
|  | 37 |
|  | 2 |
|  | 12 |
|  | 12 |

TABLE 1-continued

| Liquid crystal compound | Content (% by mass) |
|---|---|
| 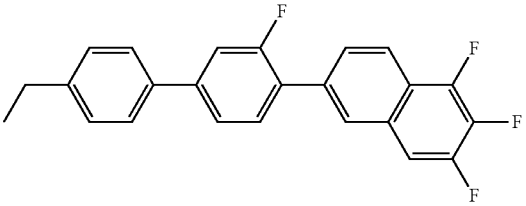 [SMILES: CCc1ccc(-c2ccc(-c3ccc4c(F)c(F)c(F)cc4c3)c(F)c2)cc1] | 4 |
| 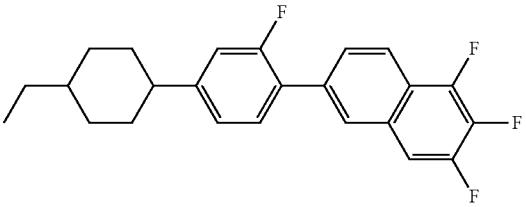 [SMILES: CCC1CCC(c2ccc(-c3ccc4c(F)c(F)c(F)cc4c3)c(F)c2)CC1] | 6 |
| 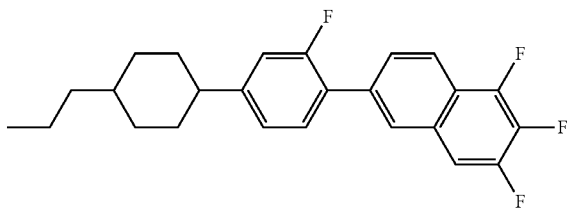 [SMILES: CCCC1CCC(c2ccc(-c3ccc4c(F)c(F)c(F)cc4c3)c(F)c2)CC1] | 13 |
| 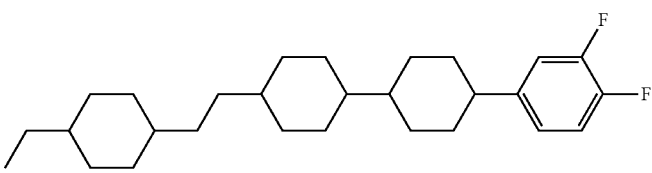 [SMILES: CCC1CCC(CCC2CCC(C3CCC(c4ccc(F)c(F)c4)CC3)CC2)CC1] | 5 |

Reference Example 5

Polymer (ex-1) was dissolved in a mixture of N-methyl-pyrrolidinone and 2-butoxyethanol in a ratio (by mass) of 50:50 to obtain a solution with a solid content of 5%. This solution was applied to a glass substrate having no electrode and a glass substrate having interdigital electrodes (with a line width of 10 μm and a space width of 10 μm) by spin coating and was dried by heating at 80° C. for 3 minutes and then at 150° C. for 5 minutes to form coatings of Polymer (ex-1) with a thickness of 100 nm on the glass substrates. These coatings were exposed to polarized ultraviolet radiation at a wavelength of 313 nm, an intensity of 20 mW/cm², and a dose of 150 mJ/cm² to form photoalignment layers on the glass substrates. The glass substrate having no electrode and the glass substrate having the interdigital electrodes, on both of which the photoalignment layers were formed as described above, were used to fabricate an IPS liquid crystal cell. The structure of the IPS liquid crystal cell was as described in the "Test Method for AC Image-Sticking" section above. The sealant used to fabricate the IPS liquid crystal cell was cured by heating at 150° C. for 1 hour. This liquid crystal cell was tested as described in the "Test Method for AC Image-Sticking" section above using Liquid Crystal Composition A prepared in Reference Example 4. The evaluation parameter was 1.21. The orientation of the liquid crystal was parallel to the vibration direction of the polarized UV radiation.

Reference Example 6

Figure 2:
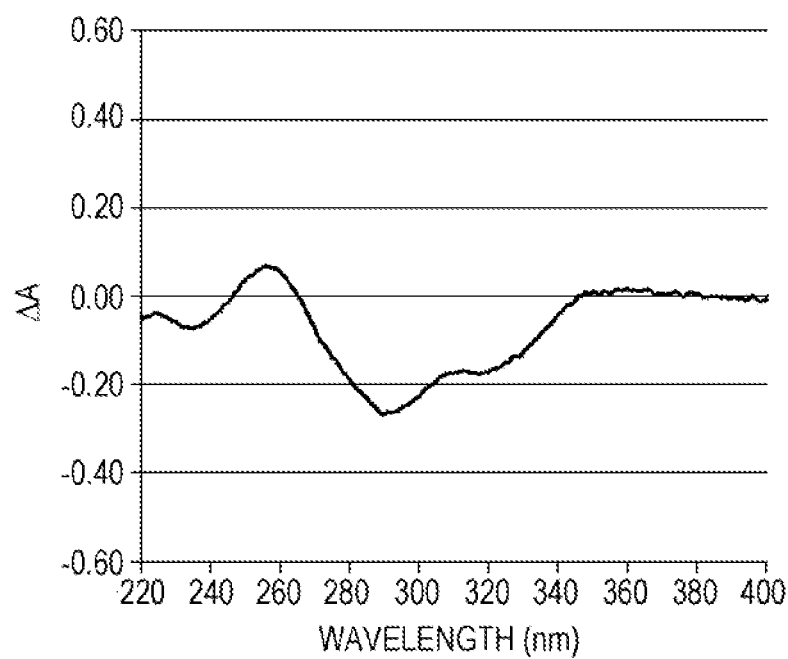
FIG. 2 shows the results of a polarized UV absorption spectrum measurement on a photoalignment layer.

Polymer (ex-1) was dissolved in a mixture of N-methyl-pyrrolidinone and 2-butoxyethanol in a ratio (by mass) of 50:50 to obtain a solution with a solid content of 5%. This solution was applied to a quartz glass substrate with a thickness of 1 mm by spin coating and was dried by heating at 80° C. for 3 minutes and then at 150° C. for 5 minutes to form a coating of Polymer (ex-1) with a thickness of 100 nm on the glass substrate. This coating was exposed to polarized ultraviolet radiation at a wavelength of 313 nm, an intensity of 20 mW/cm², and a dose of 150 mJ/cm² to form a photoalignment layer on the glass substrate. This photoalignment layer was tested for its polarized UV absorption spectrum. FIG. 2 shows ΔA (A1−A2), where A1 is the UV absorption in a direction parallel to the vibration direction of the polarized UV radiation, and A2 is the UV absorption in a direction perpendicular to the vibration direction of the polarized UV radiation). ΔA was expressed per micrometer of thickness.

FIG. 2 shows ΔA (=A1−A2, where A1 is the absorbance in a direction parallel to the vibration direction of the polarized UV radiation, and A2 is the absorbance in a direction perpendicular to the vibration direction of the polarized UV radiation) for the photoalignment layer of Polymer (ex-1) exposed to polarized UV radiation at a wavelength of 313 nm and a dose of 150 mJ/cm².

The positive peak around a wavelength of 260 nm indicates that cinnamate dimers of Polymer (ex-1) oriented parallel to the vibration direction of the polarized UV radiation (Chemical Structure 1 below) were predominant over those otherwise oriented.

[Chem. 110]

Chemical Structure 1

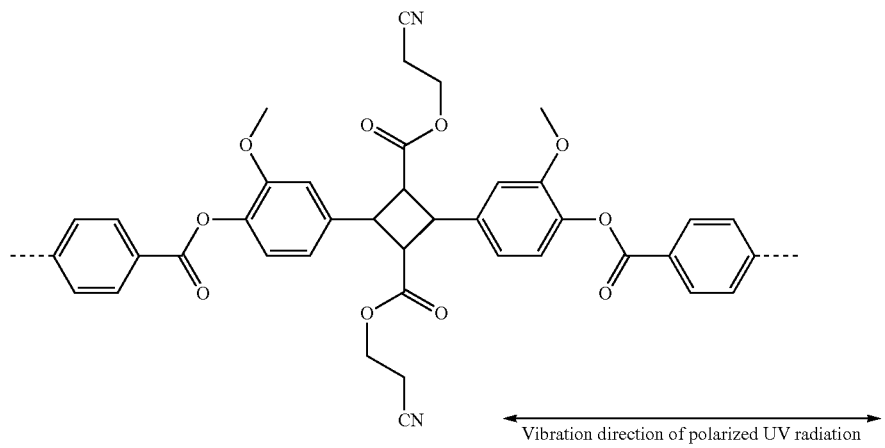

Vibration direction of polarized UV radiation

The negative peak around a wavelength of 317 nm indicates that cinnamate moieties of Polymer (ex-1) oriented perpendicular to the vibration direction of the polarized UV radiation (Chemical Structure 2 below) were predominant over those otherwise oriented.

[Chem. 111]

Chemical Structure 2

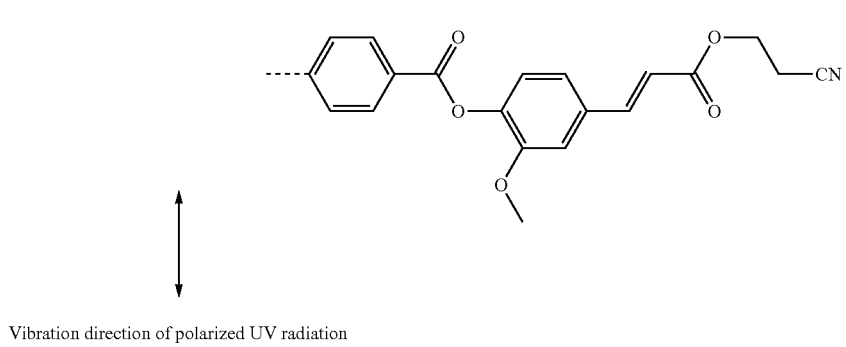

Vibration direction of polarized UV radiation

Figure 3:
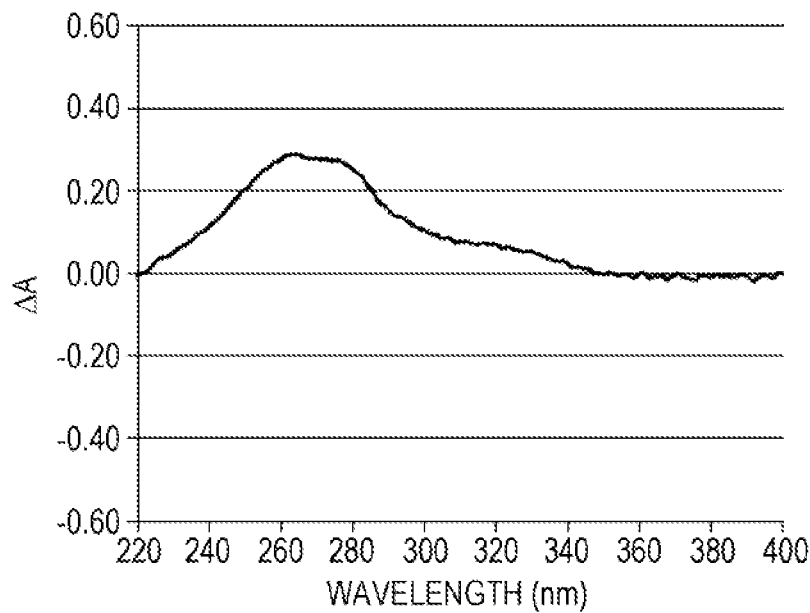
FIG. 3 shows the results of a polarized UV absorption spectrum measurement on a photoalignment layer.

This photoalignment layer was heated at 150° C. for 1 hour and was then tested for its polarized UV absorption spectrum. FIG. 3 shows ΔA (A1−A2), where A1 is the UV absorption in a direction parallel to the vibration direction of the polarized UV radiation, and A2 is the UV absorption in a direction perpendicular to the vibration direction of the polarized UV radiation). ΔA was expressed per micrometer of thickness.

FIG. 3 shows ΔA (=A1−A2, where A1 is the absorbance in a direction parallel to the vibration direction of the polarized UV radiation, and A2 is the absorbance in a direction perpendicular to the vibration direction of the polarized UV radiation) for the photoalignment layer of Polymer (ex-1) exposed to polarized UV radiation at a wavelength of 313 nm and a dose of 150 mJ/cm² and heated at 150° C. for 1 hour.

A comparison between the polarized UV spectra before and after heating shows that cinnamate moieties of Polymer (ex-1) oriented parallel to the vibration direction of the polarized UV radiation became predominant over those otherwise oriented after heating, indicating that reorientation occurred.

Reference Example 7

An IPS liquid crystal cell was fabricated as in Reference Example 5 except that Polymer (ex-1) was replaced with Polymer (ex-2). The orientation of the liquid crystal was perpendicular to the vibration direction of the polarized UV radiation.

Example 1

The AC image-sticking evaluation parameter was tested as in Reference Example 5 except that Polymer (ex-1) was replaced with Polymer (ex-3-1). The evaluation parameter was 1.02. The orientation of the liquid crystal was parallel to the vibration direction of the polarized UV radiation.

Example 2

Figure 4:
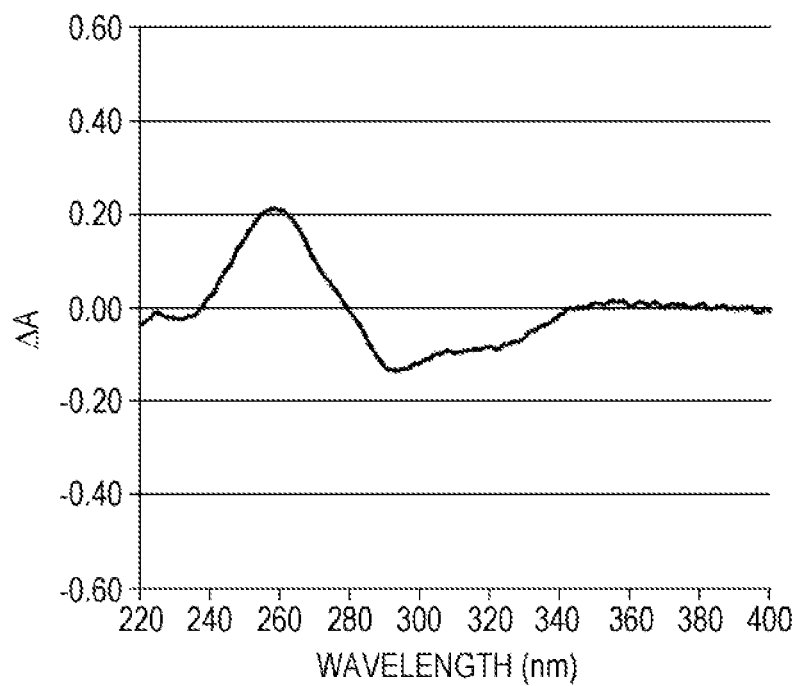
FIG. 4 shows the results of a polarized UV absorption spectrum measurement on a photoalignment layer.

Polymer (ex-3-1) was dissolved in a mixture of N-methylpyrrolidinone and 2-butoxyethanol in a ratio (by mass) of 50:50 to obtain a solution with a solid content of 5%. This solution was applied to a quartz glass substrate with a thickness of 1 mm by spin coating and was dried by heating at 80° C. for 3 minutes and then at 150° C. for 5 minutes to form a coating of Polymer (ex-3-1) with a thickness of 100 nm on the glass substrate. This coating was exposed to polarized ultraviolet radiation at a wavelength of 313 nm, an intensity of 20 mW/cm$^2$, and a dose of 150 mJ/cm$^2$ to form a photoalignment layer on the glass substrate. This photoalignment layer was tested for its polarized UV absorption spectrum. FIG. 4 shows ΔA (A1−A2), where A1 is the UV absorption in a direction parallel to the vibration direction of the polarized UV radiation, and A2 is the UV absorption in a direction perpendicular to the vibration direction of the polarized UV radiation). ΔA was expressed per micrometer of thickness.

FIG. 4 shows ΔA (=A1−A2, where A1 is the absorbance in a direction parallel to the vibration direction of the polarized UV radiation, and A2 is the absorbance in a direction parallel to the vibration direction of the polarized UV radiation) for the photoalignment layer of Polymer (ex-3-1) exposed to polarized UV radiation at a wavelength of 313 nm and a dose of 150 mJ/cm$^2$.

The positive peak around a wavelength of 260 nm indicates that cinnamate dimers of Polymer (ex-3-1) oriented parallel to the vibration direction of the polarized UV radiation (Chemical Structure 1 below) were predominant over those otherwise oriented. This peak was higher than that of Polymer (ex-1), demonstrating a higher level of order.

[Chem. 112]

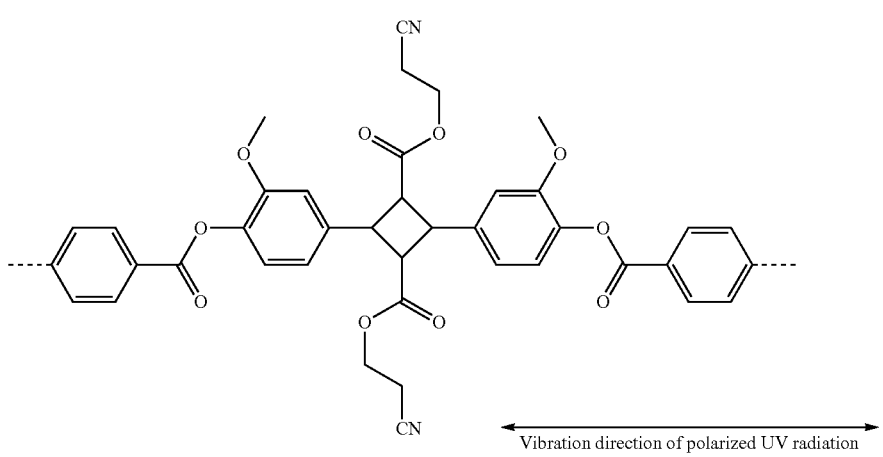

Chemical Structure 1

Vibration direction of polarized UV radiation

The negative peak around a wavelength of 317 nm indicates that cinnamate moieties of Polymer (ex-1) oriented perpendicular to the vibration direction of the polarized UV radiation (Chemical Structure 2) were predominant over those otherwise oriented (Chemical Structure 2).

[Chem. 113]

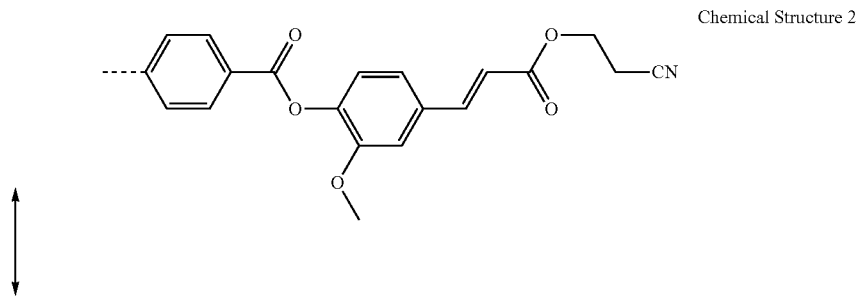

Chemical Structure 2

Vibration direction of polarized UV radiation

Figure 5:
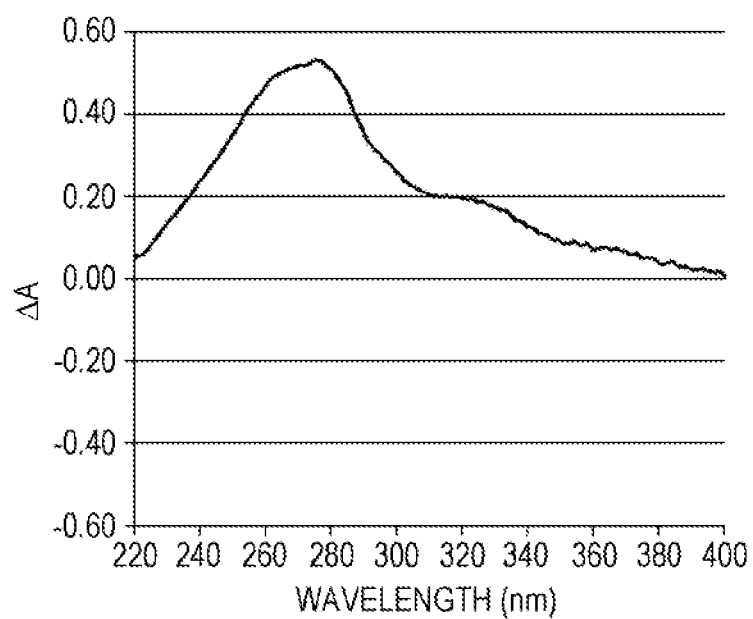
FIG. 5 shows the results of a polarized UV absorption spectrum measurement on a photoalignment layer.

This photoalignment layer was heated at 150° C. for 1 hour and was then tested for its polarized UV absorption spectrum. FIG. 5 shows ΔA (A1−A2), where A1 is the UV absorption in a direction parallel to the vibration direction of the polarized UV radiation, and A2 is the UV absorption in a direction perpendicular to the vibration direction of the polarized UV radiation). ΔA was expressed per micrometer of thickness.

FIG. 5 shows ΔA (=A1−A2, where A1 is the absorbance in a direction parallel to the vibration direction of the polarized UV radiation, and A2 is the absorbance in a direction parallel to the vibration direction of the polarized UV radiation) for the photoalignment layer of Polymer (ex-3-1) exposed to polarized UV radiation at a wavelength of 313 nm and a dose of 150 mJ/cm$^2$ and heated at 150° C. for 1 hour.

A comparison between the polarized UV spectra before and after heating shows that cinnamate moieties of Polymer (ex-3-1) oriented parallel to the vibration direction of the polarized UV radiation became predominant over those otherwise oriented after heating, indicating that reorientation occurred.

A comparison between the spectra of Polymers (ex-3-1) and (ex-1) shows that both the cinnamate dimers and the cinnamate moieties (residual cinnamate moieties that did not dimerize when exposed to polarized UV radiation) of Polymer (ex-3-1) had a higher level of order than those of Polymer (ex-1). This high level of order probably contributed to reduced AC image-sticking (i.e., a lower evaluation parameter).

It was also found that a copolymer containing cinnamate moieties, which, when exposed to polarized UV radiation, align a liquid crystal in a direction parallel to the vibration direction of the polarized radiation, and azo moieties, which, when exposed to polarized UV radiation, align a liquid crystal in a direction perpendicular to the vibration direction of the polarized radiation, allows for a higher level of order and less AC image-sticking after exposure to polarized UV radiation and heating than those containing no azo moiety.

Example 3

The AC image-sticking evaluation parameter was tested as in Reference Example 5 except that Polymer (ex-1) was replaced with Polymer (ex-3-2). The evaluation parameter was 1.05. The orientation of the liquid crystal was parallel to the vibration direction of the polarized UV radiation.

Example 4

Figure 6:
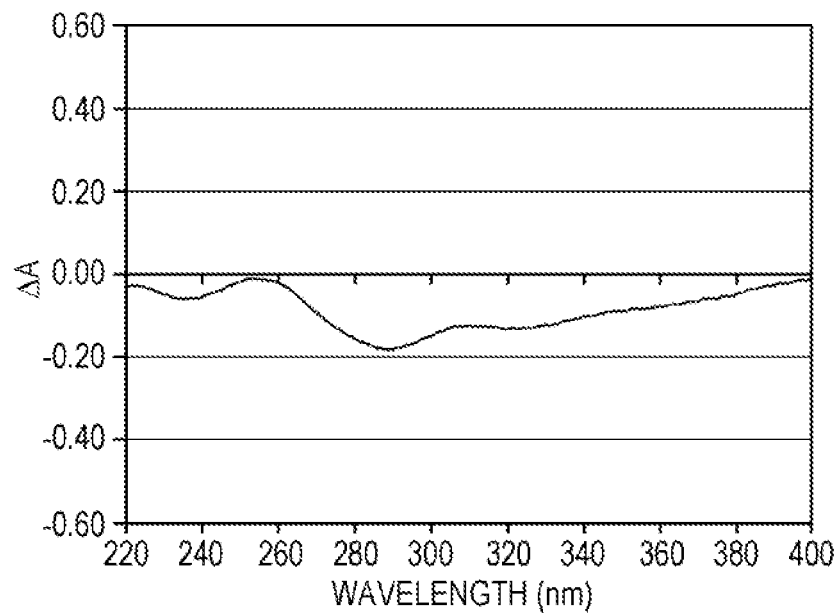
FIG. 6 shows the results of a polarized UV absorption spectrum measurement on a photoalignment layer.

Polymer (ex-3-2) was dissolved in a mixture of N-methylpyrrolidinone and 2-butoxyethanol in a ratio (by mass) of 50:50 to obtain a solution with a solid content of 5%. This solution was applied to a quartz glass substrate with a thickness of 1 mm by spin coating and was dried by heating at 80° C. for 3 minutes and then at 150° C. for 5 minutes to form a coating of Polymer (ex-3-2) with a thickness of 100 nm on the glass substrate. This coating was exposed to polarized ultraviolet radiation at a wavelength of 313 nm, an intensity of 20 mW/cm$^2$, and a dose of 150 mJ/cm$^2$ to form a photoalignment layer on the glass substrate. This photoalignment layer was tested for its polarized UV absorption spectrum. FIG. 6 shows ΔA (A1−A2), where A1 is the UV absorption in a direction parallel to the vibration direction of the polarized UV radiation, and A2 is the UV absorption in a direction perpendicular to the vibration direction of the polarized UV radiation). ΔA was expressed per micrometer of thickness.

FIG. 6 shows ΔA (=A1−A2, where A1 is the absorbance in a direction parallel to the vibration direction of the polarized UV radiation, and A2 is the absorbance in a direction perpendicular to the vibration direction of the polarized UV radiation) for the photoalignment layer of Polymer (ex-3-2) exposed to polarized UV radiation at a wavelength of 313 nm and a dose of 150 mJ/cm$^2$.

The peak with a value of nearly zero around a wavelength of 260 nm indicates that the cinnamate dimers of Polymer (ex-3-2) were nearly evenly oriented.

[Chem. 114]

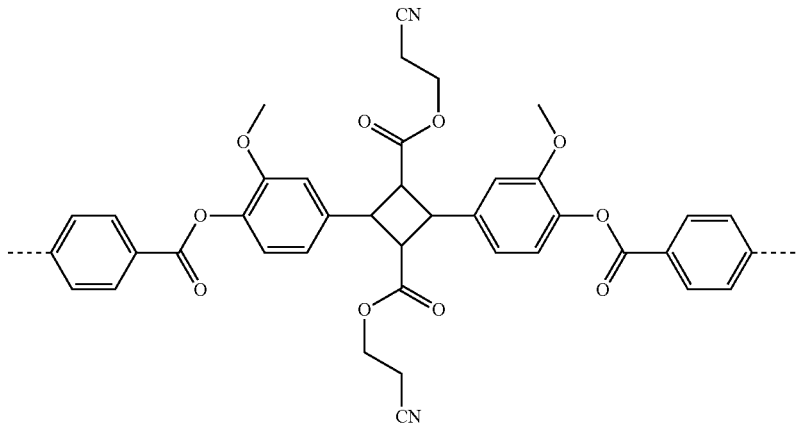

Chemical Structure 1

The negative peak around a wavelength of 317 nm indicates that cinnamate moieties of Polymer (ex-3-2) oriented perpendicular to the vibration direction of the polarized UV radiation (Chemical Structure 2) were predominant over those otherwise oriented.

[Chem. 115]

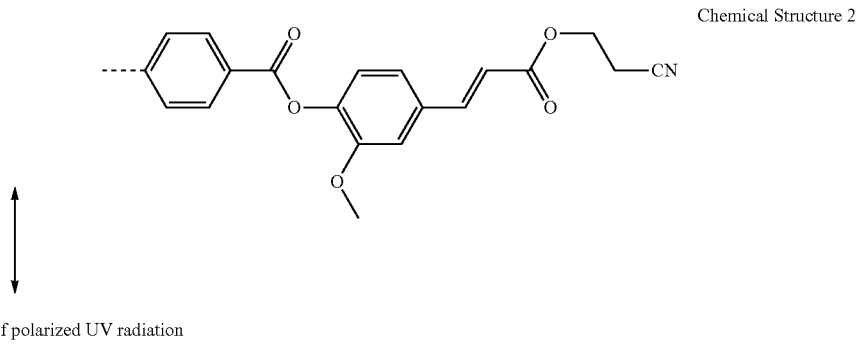

Chemical Structure 2

Vibration direction of polarized UV radiation

The negative peak around a wavelength of 360 nm indicates that azobenzene moieties of Polymer (ex-3-2) oriented perpendicular to the vibration direction of the polarized UV radiation (Chemical Structure 3) were predominant over those otherwise oriented.

[Chem. 116]

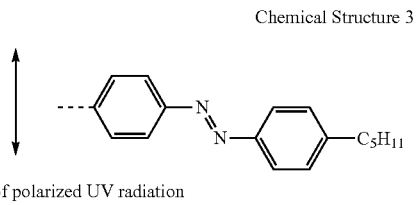

Chemical Structure 3

Vibration direction of polarized UV radiation

Figure 7:
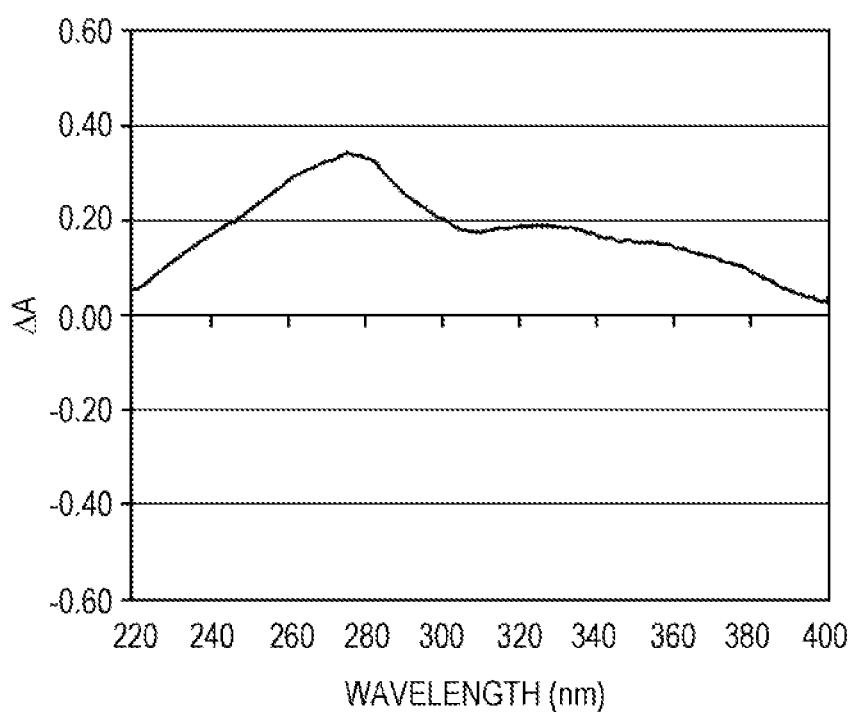
FIG. 7 shows the results of a polarized UV absorption spectrum measurement on a photoalignment layer.

This photoalignment layer was heated at 150° C. for 1 hour and was then tested for its polarized UV absorption spectrum. FIG. 7 shows ΔA (A1−A2), where A1 is the UV absorption in a direction parallel to the vibration direction of the polarized UV radiation, and A2 is the UV absorption in a direction perpendicular to the vibration direction of the polarized UV radiation). ΔA was expressed per micrometer of thickness.

FIG. 7 shows ΔA (=A1−A2, where A1 is the absorbance in a direction parallel to the vibration direction of the polarized UV radiation, and A2 is the absorbance in a direction perpendicular to the vibration direction of the polarized UV radiation) for the photoalignment layer of Polymer (ex-3-2) exposed to polarized UV radiation at a wavelength of 313 nm and a dose of 150 mJ/cm² and heated at 150° C. for 1 hour.

A comparison between the polarized UV spectra before and after heating shows that cinnamate dimers, cinnamate moieties, and azobenzene backbones of Polymer (ex-3-2) oriented parallel to the vibration direction of the polarized UV radiation became predominant over those otherwise oriented after heating, indicating that reorientation occurred.

The azobenzene moieties probably had strong anchoring force and thus contributed to reduced AC image-sticking (i.e., a lower evaluation parameter) when oriented in the same direction as the cinnamate dimers and the cinnamate moieties (i.e., in a direction parallel to the vibration direction of the polarized UV radiation).

Comparative Example 1

Polymer (ex-3-1) was dissolved in a mixture of N-methylpyrrolidinone and 2-butoxyethanol in a ratio (by mass) of 50:50 to obtain a solution with a solid content of 5%. This solution was applied to a glass substrate having no electrode and a glass substrate having interdigital electrodes (with a line width of 10 μm and a space width of 10 μm) by spin coating and was dried by heating at 80° C. for 3 minutes and then at 150° C. for 5 minutes to form coatings of Polymer (ex-3-1) with a thickness of 100 nm on the glass substrates. These coatings were exposed to polarized ultraviolet radiation at a wavelength of 313 nm, an intensity of 20 mW/cm², and a dose of 150 mJ/cm² to form photoalignment layers on the glass substrates. The glass substrate having no electrode and the glass substrate having the interdigital electrodes, on both of which the photoalignment layers were formed as described above, were used to fabricate an IPS liquid crystal cell. The structure of the IPS liquid crystal cell was as described in the "Test Method for AC Image-Sticking" section above. The UV-curable sealant used to fabricate the IPS liquid crystal cell was cured by exposure to ultraviolet radiation at an intensity of 40 mW/cm², a wavelength of 360 nm, and a dose of 500 mJ/cm². The exposure was performed at room temperature through a mask so that the area other than the sealant was not exposed to the ultraviolet radiation. This liquid crystal cell was tested as described in the "Test Method for AC Image-Sticking" section above using Liquid Crystal Composition A prepared in Reference Example 4. The evaluation parameter was 1.33. The orientation of the liquid crystal was parallel to the vibration direction of the polarized UV radiation.

Comparative Example 2

Polymer (ex-3-1) was dissolved in a mixture of N-methylpyrrolidinone and 2-butoxyethanol in a ratio (by mass) of 50:50 to obtain a solution with a solid content of 5%. This solution was applied to a glass substrate having no electrode and a glass substrate having interdigital electrodes (with a line width of 10 μm and a space width of 10 μm) by spin coating and was dried by heating at 80° C. for 3 minutes and then at 150° C. for 5 minutes to form coatings of Polymer (ex-3-1) with a thickness of 100 nm on the glass substrates. These coatings were exposed to polarized ultraviolet radiation at a wavelength of 313 nm, an intensity of 20 mW/cm², and a dose of 150 mJ/cm² to form photoalignment layers on the glass substrates. The glass substrate having no electrode and the glass substrate having the interdigital electrodes, on both of which the photoalignment layers were formed as described above, were used to fabricate an IPS liquid crystal cell. The structure of the IPS liquid crystal cell was as described in the "Test Method for AC Image-Sticking"

section above. The UV-curable sealant used to fabricate the IPS liquid crystal cell was cured by exposure to ultraviolet radiation at an intensity of 40 mW/cm$^2$, a wavelength of 360 nm, and a dose of 500 mJ/cm$^2$. The exposure was performed at room temperature through a mask so that the area other than the sealant was not exposed to the ultraviolet radiation. The liquid crystal cell was then heated at 40° C. for 1 hour. After this liquid crystal cell was cooled to room temperature, it was tested as described in the "Test Method for AC Image-Sticking" section above using Liquid Crystal Composition A prepared in Reference Example 4. The evaluation parameter was 1.27. The orientation of the liquid crystal was parallel to the vibration direction of the polarized UV radiation.

Comparative Example 3

A liquid crystal cell was fabricated as in Comparative Example 2 except that the heating temperature after the curing of the sealant was changed to 60° C. The evaluation parameter was 1.25. The orientation of the liquid crystal was parallel to the vibration direction of the polarized UV radiation.

Example 5

A liquid crystal cell was fabricated as in Comparative Example 2 except that the heating temperature after the curing of the sealant was changed to 80° C. The evaluation parameter was 1.04. The orientation of the liquid crystal was parallel to the vibration direction of the polarized UV radiation.

Example 6

A liquid crystal cell was fabricated as in Comparative Example 2 except that the heating temperature after the curing of the sealant was changed to 100° C. The evaluation parameter was 1.03. The orientation of the liquid crystal was parallel to the vibration direction of the polarized UV radiation.

Example 7

A liquid crystal cell was fabricated as in Comparative Example 2 except that the heating temperature after the curing of the sealant was changed to 120° C. The evaluation parameter was 1.03. The orientation of the liquid crystal was parallel to the vibration direction of the polarized UV radiation.

The test results for the examples where Polymer (ex-3-1) was used as the material are summarized in the following table.

TABLE 2

| | Heating temperature after exposure to polarized UV radiation (° C.) | Evaluation parameter of IPS liquid crystal cell | Maximum ΔA (in wavelength range of 230 to 280 nm) | ΔA (at wavelength of 360 nm) |
|---|---|---|---|---|
| 1 | Not heated | 1.33 (Comparative Example 1) | 0.21 | 0.02 |
| 2 | 40 | 1.27 (Comparative Example 2) | 0.21 | 0.02 |
| 3 | 60 | 1.25 (Comparative Example 3) | 0.21 | 0.02 |
| 4 | 80 | 1.04 (Example 5) | 0.36 | 0.03 |
| 5 | 100 | 1.03 (Example 6) | 0.39 | 0.04 |
| 6 | 120 | 1.03 (Example 7) | 0.44 | 0.05 |
| 7 | 150 | 1.02 (Example 1) | 0.53 | 0.06 |

The results show that the liquid crystal cells heated at 80° C. or higher had a maximum ΔA of 0.35 or more (in a wavelength range of 230 to 280 nm) and that ΔA (at a wavelength of 360 nm) tended to increase with increasing temperature. The results also show that the liquid crystal cells heated at 80° C. or higher had an evaluation parameter of 1.04 or less, which indicates a good condition with little image-sticking.

Example 8

The AC image-sticking evaluation parameter was tested as in Reference Example 5 except that Polymer (ex-1) was replaced with Polymer (ex-4). The evaluation parameter was 1.02. The orientation of the liquid crystal was parallel to the vibration direction of the polarized UV radiation.

Example 9

The AC image-sticking evaluation parameter was tested as in Reference Example 5 except that Polymer (ex-1) was replaced with Polymer (ex-5). The evaluation parameter was 1.00. The orientation of the liquid crystal was parallel to the vibration direction of the polarized UV radiation.

Example 10

The AC image-sticking evaluation parameter was tested as in Reference Example 5 except that Polymer (ex-1) was replaced with Polymer (ex-6). The evaluation parameter was 1.02. The orientation of the liquid crystal was parallel to the vibration direction of the polarized UV radiation.

The results for Examples 8 to 10, the maximum ΔA (in a wavelength range of 230 to 280 nm), and ΔA (at a wavelength of 360 nm) are summarized in the following table.

TABLE 3

| | Material | Evaluation parameter of IPS liquid crystal cell | Maximum ΔA (in wavelength range of 230 to 280 nm) | ΔA (at wavelength of 360 nm) |
|---|---|---|---|---|
| 1 | ex-4 | 1.02 (Example 8) | 0.50 | 0.05 |
| 2 | ex-5 | 1.00 (Example 9) | 0.55 | 0.16 |
| 3 | ex-6 | 1.01 (Example 10) | 0.51 | 0.16 |

INDUSTRIAL APPLICABILITY

The use of a photoalignment layer according to the present invention provides sufficient anchoring force and thus avoids image-sticking known as AC image-sticking in display devices.

The invention claimed is:

1. A photoalignment layer obtained by exposure to polarized UV radiation, the photoalignment layer comprising a polymer comprising (a) a photochemically isomerizable, photochemically uncrosslinkable segment and (b) a photochemically crosslinkable segment, the polymer comprising a structure represented by general formula (I):

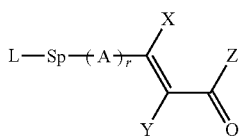

(wherein
L is a polymerizable group, and Sp is a spacer unit;
A is a group selected from the group consisting of:
(a) a trans-1,4-cyclohexylene group (wherein one or more non-adjacent methylene groups present in this group are optionally replaced with —O—, —NH—, or —S—)
(b) a 1,4-phenylene group (wherein one or more —CH═ groups present in this group are optionally replaced with —N═), and
(c) 1,4- cyclohexenylene, 2,5-thiophenylene, 2,5-furanylene, 1,4-bicyclo(2.2.2)octylene, naphthalene-1,4-diyl, naphthalene-2,6-diyl, decahydronaphthalene-2,6-diyl, and 1,2,3,4-tetrahydronaphthalene-2,6-diyl groups,
wherein groups (a), (b), and (c) may each be unsubstituted or have one or more hydrogen atoms replaced with a fluorine atom, a chlorine atom, a cyano group, a methyl group, or a methoxy group;
r is 0, 1, or 2, wherein if r is 2, each occurrence of A may be the same or different;
X and Y are each independently a hydrogen atom, a fluorine atom, a chlorine atom, a cyano group, or an alkyl group of 1 to 20 carbon atoms, wherein any hydrogen atom in the alkyl group is optionally replaced with a fluorine atom, and one or more non-adjacent $CH_2$ groups in the alkyl group are optionally replaced with —O—, —CO—O—, —O—CO—, and/or —CH═CH—; and
Z is represented by general formula (IIa) or (IIb):

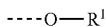

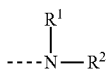

(wherein
the dashed line is a linkage to a carbon atom to which Z is linked; and
$R^1$ and $R^2$ are each independently a hydrogen atom or a linear or branched alkyl group of 1 to 30 carbon atoms, wherein one or more non-adjacent —$CH_2$— groups in $R^1$ and $R^2$ are optionally replaced with —O—, —CO—, —CO—O—, —O—CO—, —CO—NH—, —NH—CO—, —NCH$_3$—, —CH═CH—, —CF═CF—, and/or —C≡C—, one or more —$CH_2$— groups in $R^1$ and $R^2$ are each independently optionally replaced with a cycloalkyl group of 3 to 8 members, and any hydrogen atom in $R^1$ and $R^2$ is optionally replaced with an alkyl group of 1 to 20 carbon atoms, a cyano group, or a halogen atom)), wherein the photoalignment layer has a maximum ΔA (=A1-A2, wherein A1 is the absorbance in a direction parallel to a vibration direction of the polarized UV radiation, and A2 is the absorbance in a direction perpendicular to the vibration direction of the polarized UV radiation) of 0.35 or more per micrometer of layer thickness in a range of 230 to 380 mn.

2. The photoalignment layer obtained by exposure to polarized UV radiation according to claim 1, wherein the photoalignment layer has a ΔA (=A1-A2, wherein A1 is the absorbance in a direction parallel to the vibration direction of the polarized UV radiation, and A2 is the absorbance in a direction perpendicular to the vibration direction of the polarized UV radiation) of 0.03 or more per micrometer of layer thickness at 360 mn based on the photochemically isomerizable, photochemically uncrosslinkable segment.

3. A method for manufacturing the photoalignment layer according to claim 1, wherein the photoalignment layer is obtained by heating at a temperature of 80° C. or higher after the exposure to the polarized UV radiation.

4. The method for manufacturing the photoalignment layer according to claim 3, wherein the dose of the polarized UV radiation is 200 mJ/cm² or less.

5. the photoalignment layer according to claim 1, wherein, in general formula (IIa) or (IIb),
$R^1$ is a linear or branched alkyl group of 1 to 30 carbon atoms (wherein one or more non-adjacent —$CH_2$— groups in the alkyl group are replaced with —O—, —CO—, —CO—O—, —O—CO—, —CO—NH—, —NH—CO—, or —NCH$_3$—, one or more —$CH_2$— groups in the alkyl group are each independently optionally replaced with a cycloalkyl group of 3 to 8 members, and any hydrogen atom in the alkyl group is optionally replaced with an alkyl group of 1 to 20 carbon atoms, a cyano group, or a halogen atom); and
$R^2$ is a linear or branched alkyl group of 1 to 30 carbon atoms (wherein one or more —$CH_2$— groups in the alkyl group are each independently optionally replaced with a cycloalkyl group of 3 to 8 members, and any hydrogen atom in the alkyl group may he unreplaced or replaced with an alkyl group of 1 to 20 carbon atoms, a cyano group, or a halogen atom).

6. The photoalignment layer according to claim 1, wherein $R^1$ in general formula (IIa) or (IIb) is represented by general formula (IIc):

(wherein
the dashed line is a linkage to an oxygen or nitrogen atom;
$W^1$ is a methylene group (wherein any hydrogen atom in the methylene group may be unreplaced or replaced with an alkyl group of 1 to 5 carbon atoms), —CO—O—, or —CO—NH—;
$R^3$ is a hydrogen atom or an alkyl group of 1 to 5 carbon atoms; and
$R^4$ is a linear or branched alkyl group of 1 to 20 carbon atoms (wherein one or more non-adjacent —$CH_2$— groups in the alkyl group are replaced with —O—, —CO—, —CO—O—, —O—CO—, —CO—NH—, —NH—CO—, or —NCH₃—, one or more —CH₂— groups in the alkyl group are each independently optionally replaced with a cycloalkyl group of 3 to 8 members, and any hydrogen atom in the alkyl group may be unreplaced or replaced with a fluorine or chlorine atom).

7. The photoalignment layer according to claim 1, wherein, in general formula (IIa) or (IIb),
- R¹ a linear or branched alkyl group of 1 to 30 carbon atoms (wherein one or more non-adjacent —CH₂— groups in the alkyl group are replaced with —CH═CH—, —CF═CF—, and/or one or more —CH₂— groups in the alkyl group are each independently optionally replaced with a cycloalkyl group of 3 to 8 members, and any hydrogen atom in the alkyl group is optionally replaced with an alkyl group of 1 to 20 carbon atoms, a cyano group, or a halogen atom); and
- R² is a linear or branched alkyl group of 1 to 30 carbon atoms (wherein one or more —CH₂— groups in the alkyl group are each independently optionally replaced with a cycloalkyl group of 3 to 8 members, and any hydrogen atom in the alkyl group may be unreplaced or replaced with an alkyl group of 1 to 20 carbon atoms, a cyano group, or a halogen atom).

8. The photoalignment layer according to claim 1, wherein R¹ in general formula (IIa) or (IIb) is represented by general formula (IId) or (IIf):

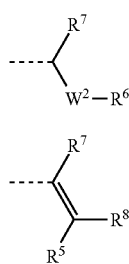

(IId)

(IIf)

(wherein
the dashed line is a linkage to an oxygen or nitrogen atom;
W² is a single bond, —CH₂—, —CO—O—, or —CO—NH—;
R⁷ is a hydrogen atom or an alkyl group of 1 to 5 carbon atoms;
R⁸ is a hydrogen atom, a linear or branched alkyl group of 1 to 20 carbon atoms (wherein one or more —CH₂— groups in the alkyl group are each independently optionally replaced with a cycloalkyl group of 3 to 8 members, and any hydrogen atom in the alkyl group may be unreplaced or replaced with a fluorine or chlorine atom);
R⁵ is an alkyl group of 1 to 20 carbon atoms, wherein any hydrogen atom in the alkyl group is optionally replaced with a fluorine atom); and
R⁶ is an alkyl group of 1 to 20 carbon atoms (wherein one or more non-adjacent —CH₂— groups in the alkyl group are replaced with —CH═CH—, —CF═CF—, and/or one or more —CH₂— groups in the alkyl group are each independently optionally replaced with a cycloalkyl group of 3 to 8 members, and any hydrogen atom in the alkyl group is optionally replaced with as fluorine or chlorine atom).

9. The photoalignment layer according to claim 1, wherein Sp in general formula (I) is represented by general formula (IVa):

(wherein
the left dashed line is a linkage to L, and the right dashed line is a linkage to A or a linkage to a carbon atom to which X is linked;
Z¹, Z², and Z³ are each independently a single bond, —(CH₂)ᵤ— (wherein u is 1 to 20), —OCH₂—, —CH₂O—, —COO—, —OCO—, —CH═CH—, —CF═CF—, —CF₂O—, —OCF₂—, —CF₂CF₂—, or —C≡C—, wherein one or more non-adjacent CH₂ groups in these substituents are independently optionally replaced with —O—, —CO—, —CO—O—, —O—CO—, —Si(CH₃)₂—O—Si(CH₃)₂—, —NR—, —NR—CO—, —CO—NR—, —NR—CO—O—, —O—CO—NR—, —NR—CO—NR—, —CH═CH—, —C≡C—, or —O—CO—O— (wherein R is independently hydrogen or an alkyl group of 1 to 5 carbon atoms);
A¹ and A² are each independently a group selected from the group consisting of:
(a) a trans-1,4-cyclohexylene group (wherein one or more non-adjacent methylene groups present in this group are optionally replaced with —O—, —NH—, or —S—),
(b) a 1,4-phenylene group (wherein one or more —CH═ groups present in this group are optionally replaced with —N═), and
(c) 1,4-cyclohexenylene, 2,5-thiophenylene, 2,5-furanylene, 1,4-bicyclo(2.2.2)octylene, naphthalene-1,4-diyl, naphthalene-2,6-diyl, decahydronaphthalene-2,6-diyl, and 1,2,3,4-tetrahydronaphthalene-2,6-diyl groups,
wherein groups (a), (b), and (c) may each be unsubstituted or have one or more hydrogen atoms replaced with a fluorine atom, a chlorine atom, a cyano group, a methyl group, or a methoxy group; and
p and q are each independently 0 or 1).

10. The photoalignment layer according to claim 1, wherein,
in general formula (IIa) or (IIb),
R¹ is a hydrogen atom or a linear or branched alkyl group of 1 to 30 carbon atoms (wherein one or more groups in the alkyl group are each independently optionally replaced with a cycloalkyl group of 3 to 8 members, and any hydrogen atom in the alkyl group is optionally replaced with an alkyl group of 1 to 20 carbon atoms, a cyano group, or a halogen atom); and
R² is a linear or branched alkyl group of 1 to 30 carbon atoms (wherein one or more —CH₂— groups in the alkyl group are each independently optionally replaced with a cycloalkyl group of 3 to 8 members, and any hydrogen atom in the alkyl group may be unreplaced or replaced with an alkyl group of 1 to 20 carbon atoms, a cyano group, or a halogen atom), and
in general formula (I), Sp is represented by general formula (IVc):

(wherein
Z¹, Z², Z³, and A² are as defined in general formula (IVa);
A⁷ is a group selected from the group consisting of 1,4-phenylene (wherein three or more —CH═ groups present in this group are replaced with —N═), 1,4-cyclohexenylene, 2,5-thiophenylene, 2,5-furanylene, 1,4-bicyclo(2.2.2)octylene, naphthalene-1,4-diyl, naphthalene-2,6-diyl, decahydronaphthalene-2,6-diyl, and 1,2,3,4-tetrahydronaphthalene-2,6-diyl groups that may each be unsubstituted or have one or more hydrogen atoms replaced with a fluorine atom, a chlorine atom a cyano group, a methyl group, or a methoxy group; and p is 1, and q is 1 or 2, wherein if q is 2, each occurrence of $A^2$ and $Z^3$ may be the same or different).

11. The photoalignment layer according to claim 1, wherein,
in general formula (IIa) or (IIb),
$R^1$ is a linear or branched alkyl group of 1 to 30 carbon atoms (wherein one or more —CH$_2$— groups in the alkyl group are each independently replaced with a cycloalkyl group of 3 to 8 members, and any hydrogen atom in the alkyl group is optionally replaced with an alkyl group of 1 to 20 carbon atoms, a cyano group, or a halogen atom); and
$R^2$ is a linear or branched alkyl group of 1 to 30 carbon atoms (wherein one or more —CH$_2$— groups in the alkyl group are each independently optionally replaced with a cycloalkyl group of 3 to 8 members, and any hydrogen atom in the alkyl group may be unreplaced or replaced with an alkyl group of 1 to 20 carbon atoms, a cyano group, or a halogen atom), and
in general formula (I), Sp is represented by general formula (IVb):

 (IVb)

(wherein
$Z^1$, $Z^2$, $Z^3$, $A^2$, p, and q are as defined in general formula (IVa); and
$A^8$ is a trans-1,4-cyclohexylene (wherein one or more non-adjacent methylene groups present in this group are optionally replaced with —O—, —NH—, or —S—) or 1,4-phenylene (wherein one or two —CH═ groups present in this group are optionally replaced with —N═) group that may be unsubstituted or have one or more hydrogen atoms replaced with a fluorine atom, a chlorine atom, a cyano group, a methyl group, or a methoxy group).

12. The photoalignment layer according to claim 1, wherein L in general formula (I) is a raw material unit that forms a polyamic acid, a polyamic acid ester, or a polyimide.

13. The photoalignment layer according to claim 1, wherein L in general formula (I) is any substituent selected from the group consisting of substituents represented by general formulas (III-1) to (III-17):

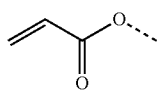 (III-1)

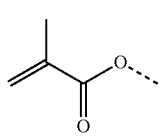 (III-2)

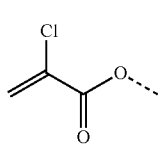 (III-3)

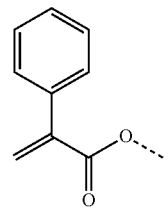 (III-4)

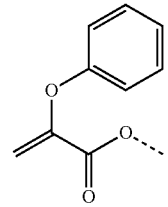 (III-5)

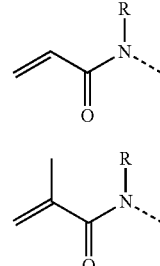 (III-6)

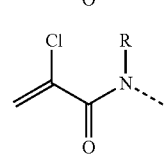 (III-7)

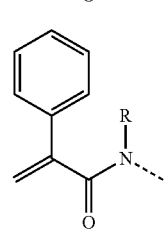 (III-8)

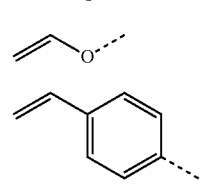 (III-9)

 (III-10)

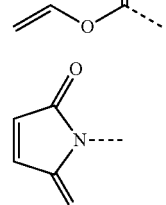 (III-11)

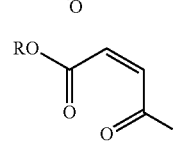 (III-12)

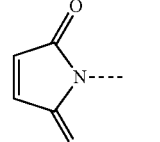 (III-13)

(III-14)

(III-15)

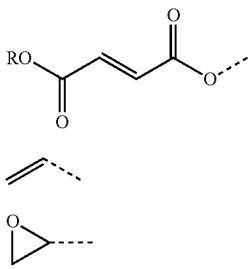

(III-16)

(III-17)

(QP)

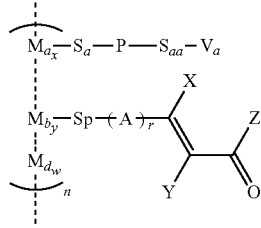

(wherein the dashed line is a linkage to Sp, and R is independently hydrogen or an alkyl group of 1 to 5 carbon atoms).

14. The photoalignment layer according to claim 1, wherein X and Y in general formula (I) are hydrogen atoms.

15. The photoalignment layer according to claim 9, wherein $A^2$ in general formulas (IVa), (IVb), and (IVc) is a trans-1,4-cyclohexylene, 2,6-naphthylene, pyridine-2,5-diyl, pyrimidine-2,5-diyl, or 1,4-phenylene group, wherein one or more hydrogen atoms in the group are optionally replaced with a fluorine atom, a chlorine atom, a methyl group, or a methoxy group; $Z^3$ a single bond or a —$(CH_2)_u$— (wherein u is 1 to 20), —$OCH_2$—, —$CH_2O$—, —COO—, —OCO—, —CH=CH—, or —C≡C— group, wherein one or more non-adjacent $CH_2$ groups in the group are independently optionally replaced with —O—, —CO—, —CO—O—, —O—CO—, —CH=CH—, or —C≡C—; and q is 1.

16. the photoalignment layer according to claim 1, wherein A in general formula (I) is as 1,4-phenylene group, wherein one or more hydrogen atoms are optionally replaced with a fluorine atom, a chlorine atom, a methyl group, or a methoxy group.

17. The photoalignment layer according to claim 9, wherein $A^2$ in general formulas (IVa), (IVb), and (IVc) is a 1,4-phenylene group, wherein one or more hydrogen atoms are optionally replaced with a fluorine atom, a chlorine atom, a methyl group, or a methoxy group.

18. The photoalignment layer according to claim 13, wherein L in general formula (I) is represented by general formula (III-1) or (III-2).

19. The photoalignment layer according to claim 10, wherein $A^7$ in general formula (IVc) is a 2,6-naphthylene group, wherein one or more hydrogen atoms in the 2,6-naphthylene group are optionally replaced with a fluorine atom, a chlorine atom, a methyl group, or a methoxy group.

20. The photoalignment layer according to claim 1, wherein the photochemically isomerizable, photochemically uncrosslinkable segment comprises a structure represented by general formula (Q):

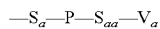   (Q)

(wherein the dashed line is a linkage to a polymer main chain; $S_a$ and $S_{aa}$ are spacer units that may be different; P is a photochemically isomerizable, photochemically uncrosslinkable moiety and $V_a$ is a side chain end).

21. The photoalignment layer according to claim 1, wherein the polymer comprises a structural unit represented by general formula (QP):

(wherein Sp, A, X, Y, Z, and r are as defined in general formula (I); $S_a$, P, $S_{aa}$, and $V_a$ are as defined in general formula (Q); Ma, Mb, and Md are monomer units of the polymer that may be different; x, y, and w are mole fractions in the copolymer and necessarily satisfy $0<x\leq 1$, $0<y\leq 1$, and $0\leq w<1$; n is 4 to 1,000,000; and Ma, Mb, and Md may be arranged in the same order as or in a different order from those in the formula and may each independently comprise one type of monomer unit or two or more different types of monomer units).

22. photoalignment layer according to claim 21, wherein $M_a$ and $M_b$ in general formula (QP) comprise one or more monomer units selected from the group consisting of monomer units represented by general formulas (QIII-A-1) to (QIII-A-17):

$(Q^{III\text{-}A\text{-}1})$

$(Q^{III\text{-}A\text{-}2})$

$(Q^{III\text{-}A\text{-}3})$

$(Q^{III\text{-}A\text{-}4})$

$(Q^{III\text{-}A\text{-}5})$ (Q^{III-A-6}) 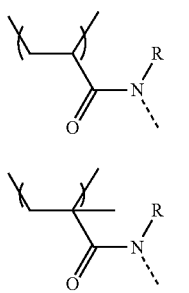

(Q^{III-A-7}) 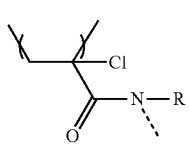

(Q^{III-A-8}) 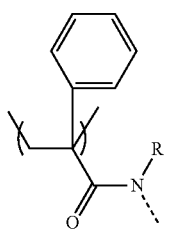

(Q^{III-A-9}) 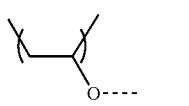

(Q^{III-A-10}) 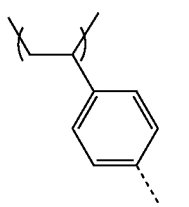

(Q^{III-A-11}) 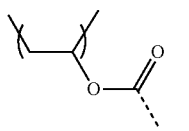

(Q^{III-A-12}) 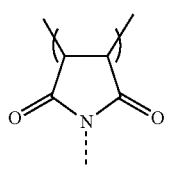

(Q^{III-A-13}) 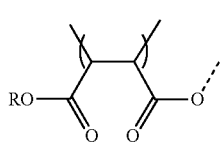

(Q^{III-A-14}) 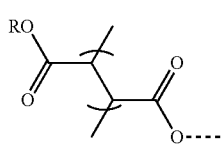

(Q^{III-A-15})

(Q^{III-A-16}) 

(Q^{III-A-17}) 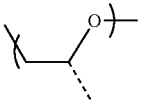

(wherein the dashed line is a linkage to $S_a$ or Sp; R is independently hydrogen or an alkyl group of 1 to 5 carbon atoms; and any hydrogen atom in each structure is optionally replaced with a fluorine atom, a chlorine atom, a methyl group, or a methoxy group).

23. the photoalignment layer according to claim 21, wherein $M_d$ in general formula (QP) comprises one or more monomer units selected from the group consisting of monomer units represented by general formulas (QIII-1) to (QIII-17):

(Q^{III-1}) 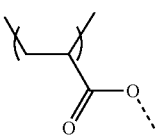

(Q^{III-2}) 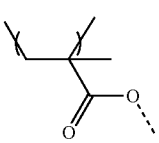

(Q^{III-3}) 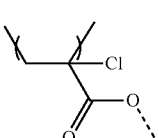

(Q^{III-4}) 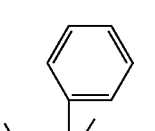

(Q^{III-5}) 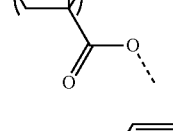

(Q^{III-6}) 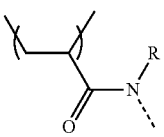

(Q$^{III-7}$) 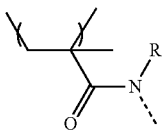

(Q$^{III-8}$) 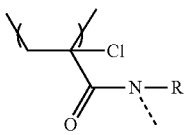

(Q$^{III-9}$) 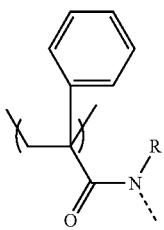

(Q$^{III-10}$) 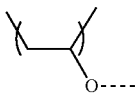

(Q$^{III-11}$) 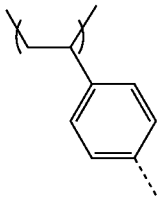

(Q$^{III-12}$) 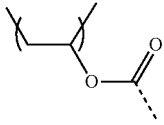

(Q$^{III-13}$) 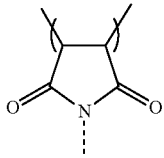

(Q$^{III-14}$) 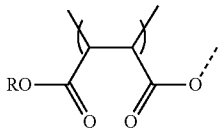

(Q$^{III-15}$) 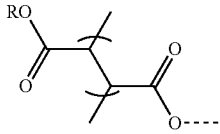

(Q$^{III-16}$)

(Q$^{III-17}$) 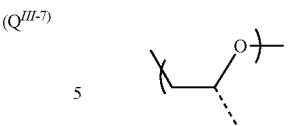

(wherein the dashed line is a linkage to a hydrogen atom or a monovalent organic group; R is independently hydrogen or an alkyl group of 1 to 5 carbon atoms; and any hydrogen atom in each structure is optionally replaced with a fluorine atom, a chlorine atom, a methyl group, or a methoxy group).

24. The photoalignment layer according, to claim 20, wherein $S_a$ and $S_{aa}$ in general formula (Q) or (QP) are represented by general formula (VI):

 (VI)

(wherein
each dashed line is a linkage to the polymer main chain, Ma, P, or Va;
$Z^{11}$, $Z^{12}$, and $Z^{13}$ are each independently a single bond, —(CH$_2$)$_u$— (wherein u is 1 to 20), —OCH$_2$—, —CH$_2$O—, —COO—, —OCO—, —CH═CH—, —CF═CF—, —CF$_2$O—, —OCF$_2$—, —CF$_2$CF$_2$—, or —C≡C—, wherein one or more non-adjacent CH$_2$ groups in these substituents are independently optionally replaced with —O—, —CO—, —CO—O—, —O—CO—, —Si(CH$_3$)$_2$—O—Si(CH$_3$)$_2$—, —NR—, —NR—CO—, —CO—NR—, —NR—CO—O—, —O—CO—NR—, —NR—CO—NR—, —CH═CH—, —C≡C—, or —O—CO—O— (wherein R is independently hydrogen or an alkyl group of 1 to 5 carbon atoms);
$A^{11}$ and $A^{12}$ are each independently a group selected from the group consisting of:
(a) trans-1,4-cyclohexylene group (wherein one or more non-adjacent methylene groups present in this group are optionally replaced with —O—, —NH—, or —S—),
(b) a 1,4-phenylene group (wherein one or more —CH═ groups present in this group are optionally replaced with —N═), and
(c) 1,4-cyclohexenylene, 2,5-thiophenylene, 2,5-furanylene, 1,4-bicyclo(2.2.2)octylene, naphthalene-1,4-diyl, naphthalene-2,6-diyl, decahydronaphthalene-2,6-diyl, and 1,2,3,4-tetrahydronaplthalene-2,6-diyl groups,
wherein groups (a), (b), and (c) may each be unsubstituted or have one or more hydrogen atoms replaced with a fluorine atom, a chlorine atom, a cyano group, a methyl group, or a methoxy group; and
p and q are each independently 0 or 1).

25. The photoalignment layer according to claim 20, wherein Va in general formula (Q) or (QP) is represented by general formula (VII):

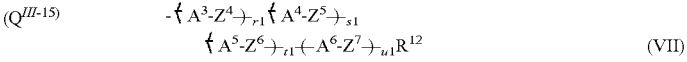 (VII)

(wherein
the dashed line is a linkage to $S_{aa}$;
$Z^4$, $Z^5$, $Z^6$, and $Z^7$ are each independently a single bond, —(CH$_2$)$_u$— (wherein u is 1 to 20), —OCH$_2$—, —CH$_2$O—, —COO—, —OCO—, —CH═CH—, —CF═CF—, —CF$_2$O—, —OCF$_2$—, —CF$_2$CF$_2$—, or —C≡C—, wherein one or more non-adjacent CH$_2$ groups in these substituents are independently optionally replaced with —O—, —CO—, —CO—O—, —O—CO—, —Si(CH₃)₂—O—Si(CH₃)₂—, —NR—, —NR—CO—, —CO—NR—, —NR—CO—O—, —O—CO—NR—, —NR—CO—NR—, —CH=CH—, or —O—CO—O— (wherein R is independently hydrogen or an alkyl group of 1 to 5 carbon atoms);

A³, A⁴, A⁵, and A⁶ are each independently a group selected from the group consisting of:
(a) a trans-1,4-cyclohexylene group (wherein one or more non-adjacent methylene groups present in this group are optionally replaced with —O—, —NH—, or —S—),
(b) a 1,4-phenylene group (wherein one or more —CH= groups present in this group are optionally replaced with —N=), and
(c) 1,4-cyclohexenylene, 2,5-thiophenylene, 2,5-furanylene, 1,4-bicyclo(2.2.2)octylene, naphthalene-1,4-diyl, naphthalene-2,6-diyl, decahydronaphthalene-2,6-diyl, and 1,2,3,4-tetrahydronaphthalene-2,6-diyl groups,
wherein groups (a), (b), and (c) may each be unsubstituted or have one or more hydrogen atoms replaced with a fluorine atom, a chlorine atom, a cyano group, a methyl group, or a methoxy group;

r1, s1, t1, and u1 are each independently 0 or 1; and
R¹² is hydrogen, fluorine, chlorine, a cyano group, or an alkyl group of 1 to 20 carbon atoms, wherein any hydrogen atom in the alkyl group is optionally replaced with a fluorine atom, and one or more non-adjacent CH₂ groups in the alkyl group are optionally replaced with —O—, —CO—O—, —O—CO—, and/or —CH=CH—).

26. The photoalignment layer according to claim 20, wherein P in general formula (Q) or (QP) is represented by general formula (VIII):

  (VIII)

(wherein
each dashed line is a linkage to S_a or S_{aa};
A²¹, A²², A²³, A²⁴, and A²⁵ are each independently a 1,4-naphthylene, 2,6-naphthylene, 2,5-pyridyl, 2,5-pyrimidyl, 2,5-thiophenylene, 2,5-furanylene, or 1,4-phenylene group that is unsubstituted or mono- or polysubstituted with a fluorine atom, a chlorine atom, a bromine atom, a methyl group, a methoxy group, a nitro group, or —NR²¹R²² or with a linear or branched alkyl residue of 1 to 10 carbon atoms that is unsubstituted or mono- or polysubstituted with fluorine, wherein one or more non-adjacent CH₂ groups are independently optionally replaced with Q, wherein Q is —O—, —CO—, —CO—O—, —O—CO—, —Si(CH₃)₂—O—Si(CH₃)₂—, —NR—, —NR—CO—, —CO—NR—, —NR—CO—O—, —O—CO—NR—, —NR—CO—NR—, —CH=CH—, —C≡C—, or —O—CO—O—, wherein R, R²¹, and R²² are independently a hydrogen atom or an alkyl group of 1 to 5 carbon atoms; and p1, q1, r1, s1, and t1 are each independently 0 or 1, with the proviso that 0<q1+r1+s1+t1).

27. The photoalignment layer according to claim 26, wherein the monovalent organic group in general formulas (QIII-1) to (QIII-17) is represented by general formula (QIV);

$$-S_a-V_a \qquad (QIV)$$

(wherein the dashed line is a linkage to M_d; S_a is a structure represented by general formula (VI); and V_a is a structure represented by general formula (VII)).

28. The photoalignment layer according to claim 1, wherein the photochemically isomerizable, photochemically uncrosslinkable segment, when used alone as a photoalignment layer, has the property of aligning a liquid crystal in a direction perpendicular to a vibration direction of polarized ultraviolet radiation used for exposure.

29. The photoalignment layer according to claim 1, wherein the photochemically crosslinkable segment, when used alone as a photoalignment layer, has the property of aligning a liquid crystal in a direction parallel to a vibration direction of polarized ultraviolet radiation used for exposure.

30. The method for manufacturing the photoalignment layer according to claim 3, wherein the dose of the polarized UV radiation is 150 mJ/cm² or less.

31. A liquid crystal display device comprising the photoalignment layer according to claim 1.

32. An optically anisotropic element comprising the photoalignment layer according to claim 1.

* * * * *